(12) United States Patent
Williams

(10) Patent No.: US 7,777,459 B2
(45) Date of Patent: *Aug. 17, 2010

(54) HIGH-EFFICIENCY DC/DC VOLTAGE CONVERTER INCLUDING CAPACITIVE SWITCHING PRE-CONVERTER AND DOWN INDUCTIVE SWITCHING POST-REGULATOR

(75) Inventor: Richard K. Williams, Cupertino, CA (US)

(73) Assignee: Advanced Analogic Technologies, Inc., Santa Clara, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 11/890,994

(22) Filed: Aug. 8, 2007

(65) Prior Publication Data
US 2009/0059630 A1    Mar. 5, 2009

Related U.S. Application Data

(60) Provisional application No. 60/877,952, filed on Dec. 30, 2006, provisional application No. 60/877,720, filed on Dec. 30, 2006.

(51) Int. Cl.
*G05F 1/618*    (2006.01)
(52) U.S. Cl. .................. 323/266; 323/271
(58) Field of Classification Search .......... 323/225, 323/266, 268, 271, 285
See application file for complete search history.

(56) References Cited

U.S. PATENT DOCUMENTS

| | | | |
|---|---|---|---|
| 3,943,428 A | 3/1976 | Whidden | 363/60 |
| 4,533,986 A | 8/1985 | Jones | 363/17 |
| 4,553,986 A | 11/1985 | Ciliberti et al. | 95/116 |
| 4,743,835 A | 5/1988 | Bosse et al. | 323/266 |
| 4,761,722 A | 8/1988 | Pruitt | 363/17 |
| 4,974,141 A | 11/1990 | Severinsky et al. | 363/81 |
| 5,066,900 A | 11/1991 | Bassett | 323/224 |
| 5,235,504 A | 8/1993 | Sood | 363/53 |
| 5,446,367 A | 8/1995 | Pinney | 323/266 |
| 5,557,193 A | 9/1996 | Kajimoto | 323/282 |
| 5,773,966 A * | 6/1998 | Steigerwald | 323/284 |
| 5,886,512 A | 3/1999 | Becerra | 323/282 |
| 6,023,418 A | 2/2000 | Engira | 363/63 |
| 6,272,025 B1 | 8/2001 | Riggio et al. | 363/24 |
| 6,400,579 B2 * | 6/2002 | Cuk | 363/16 |
| 6,428,918 B1 | 8/2002 | Fuglevand et al. | 429/13 |
| 6,504,423 B2 | 1/2003 | Riggio et al. | 327/560 |
| 6,580,258 B2 | 6/2003 | Wilcox et al. | 323/282 |
| 6,617,832 B1 | 9/2003 | Kobayashi | 323/266 |
| 6,650,552 B2 | 11/2003 | Takagi et al. | 363/17 |
| 6,798,177 B1 * | 9/2004 | Liu et al. | 323/222 |
| 6,903,536 B2 | 6/2005 | Yang | 323/266 |

(Continued)

*Primary Examiner*—Gary L Laxton
(74) *Attorney, Agent, or Firm*—Patentability Associates

(57) ABSTRACT

A DC/DC converter includes a pre-converter stage, which may include a charge pump, and a post-regulator stage, which may include a Buck converter. The duty factor of the post-regulator stage is controlled by a feedback path that extends from the output terminal of the DC/DC converter to an input terminal in the post-regulator stage. The pre-converter steps the input DC voltage up or down by a positive or negative integral or fractional value, and the post-regulator steps the voltage down by a variable amount depending on the duty factor at which the post-regulator is driven. The converter overcomes the problems of noise glitches, poor regulation, and instability, even near unity input-to-output voltage conversion ratios.

27 Claims, 49 Drawing Sheets

U.S. PATENT DOCUMENTS

| | | | |
|---|---|---|---|
| 6,937,487 B1 * | 8/2005 | Bron ............................ 363/60 |
| 7,071,660 B2 | 7/2006 | Xu et al. ...................... 323/266 |
| 7,078,882 B2 | 7/2006 | Weng et al. .................. 323/224 |
| 7,161,335 B2 * | 1/2007 | Wei et al. ..................... 323/266 |
| 7,317,302 B1 * | 1/2008 | Collins ........................ 323/222 |
| 7,336,059 B2 | 2/2008 | Steigerwald et al. ......... 323/288 |
| 7,359,219 B2 | 4/2008 | Erdl et al. ..................... 363/16 |
| 7,408,330 B2 * | 8/2008 | Zhao ............................ 323/266 |
| 7,466,111 B2 | 12/2008 | Komaki et al. ............... 323/224 |
| 7,560,915 B2 | 7/2009 | Ito et al. ....................... 323/282 |
| 2005/0099164 A1 | 5/2005 | Yang ............................ 323/266 |
| 2008/0157732 A1 | 7/2008 | Williams ...................... 323/282 |
| 2008/0157733 A1 | 7/2008 | Williams ...................... 323/266 |
| 2008/0158915 A1 | 7/2008 | Williams ...................... 323/266 |

* cited by examiner

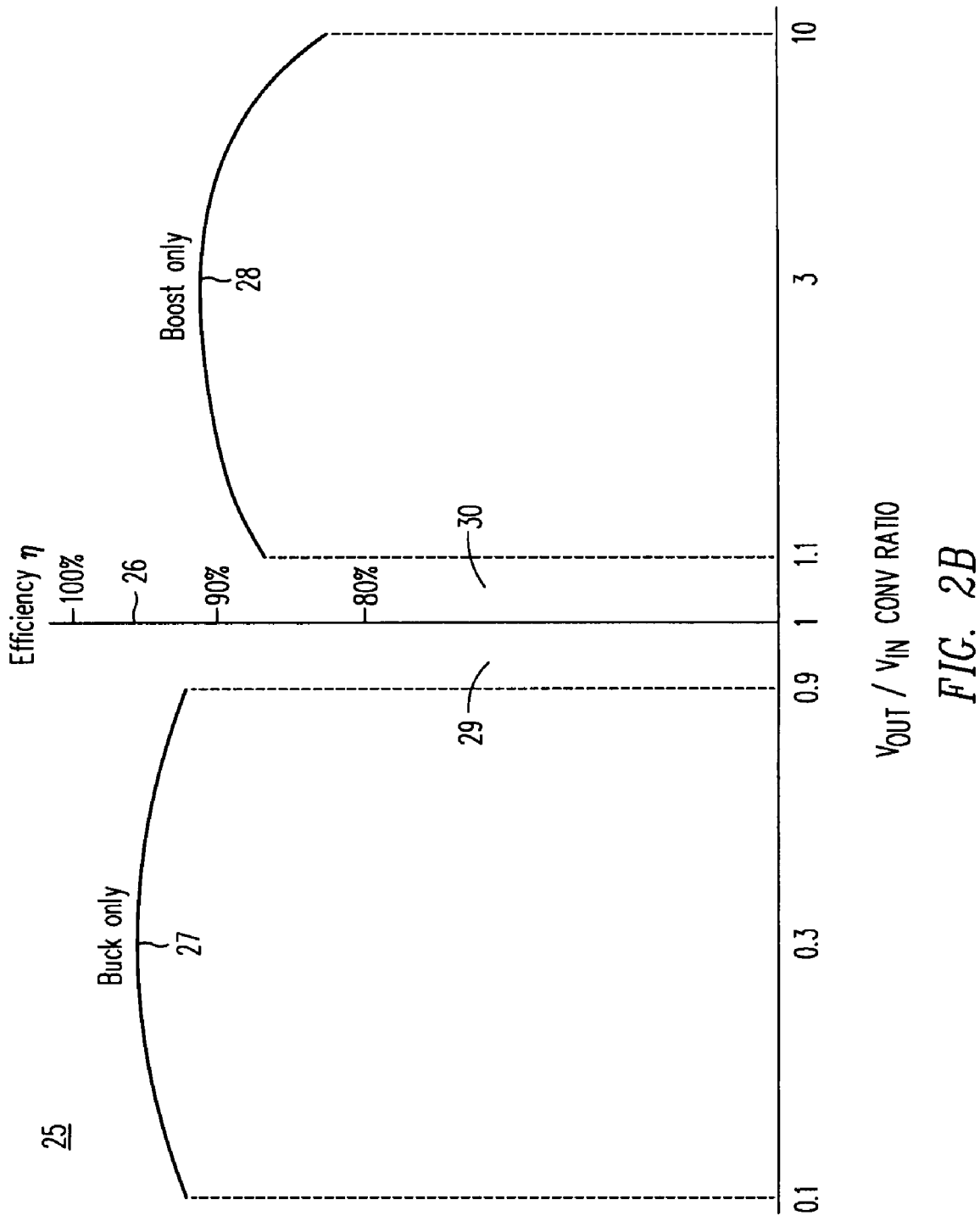

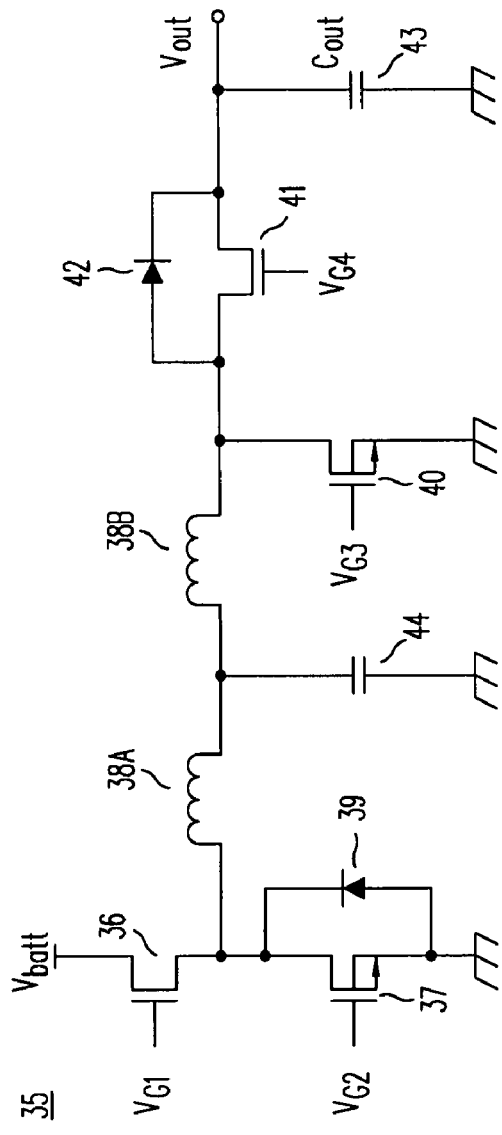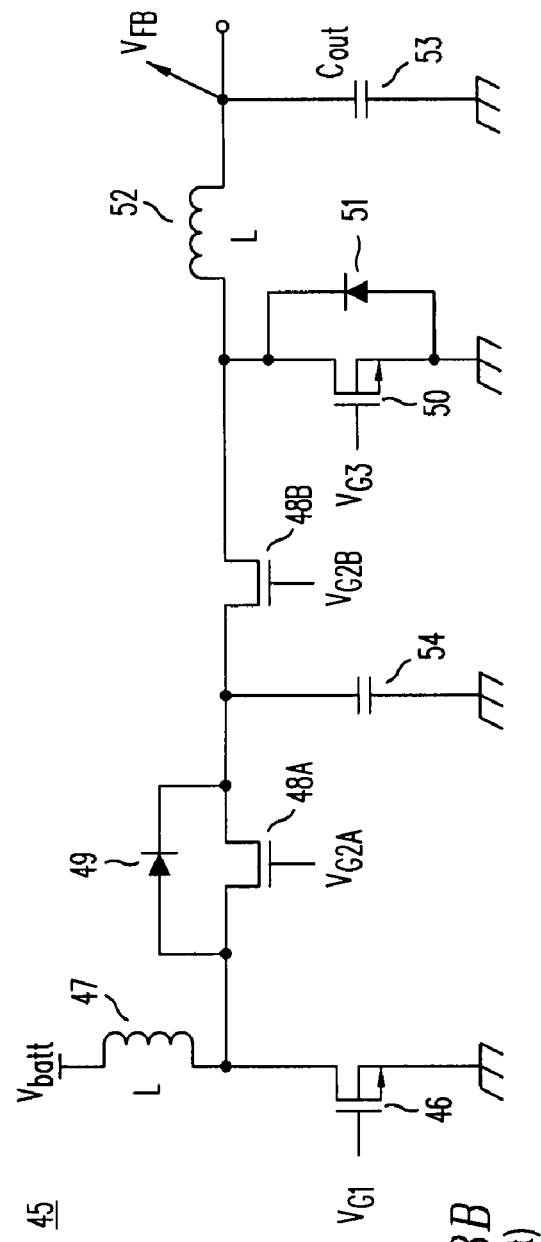
FIG. 3A
(Prior Art)
FIG. 3B
(Prior Art)

$V_{out} = 2V_{batt}$

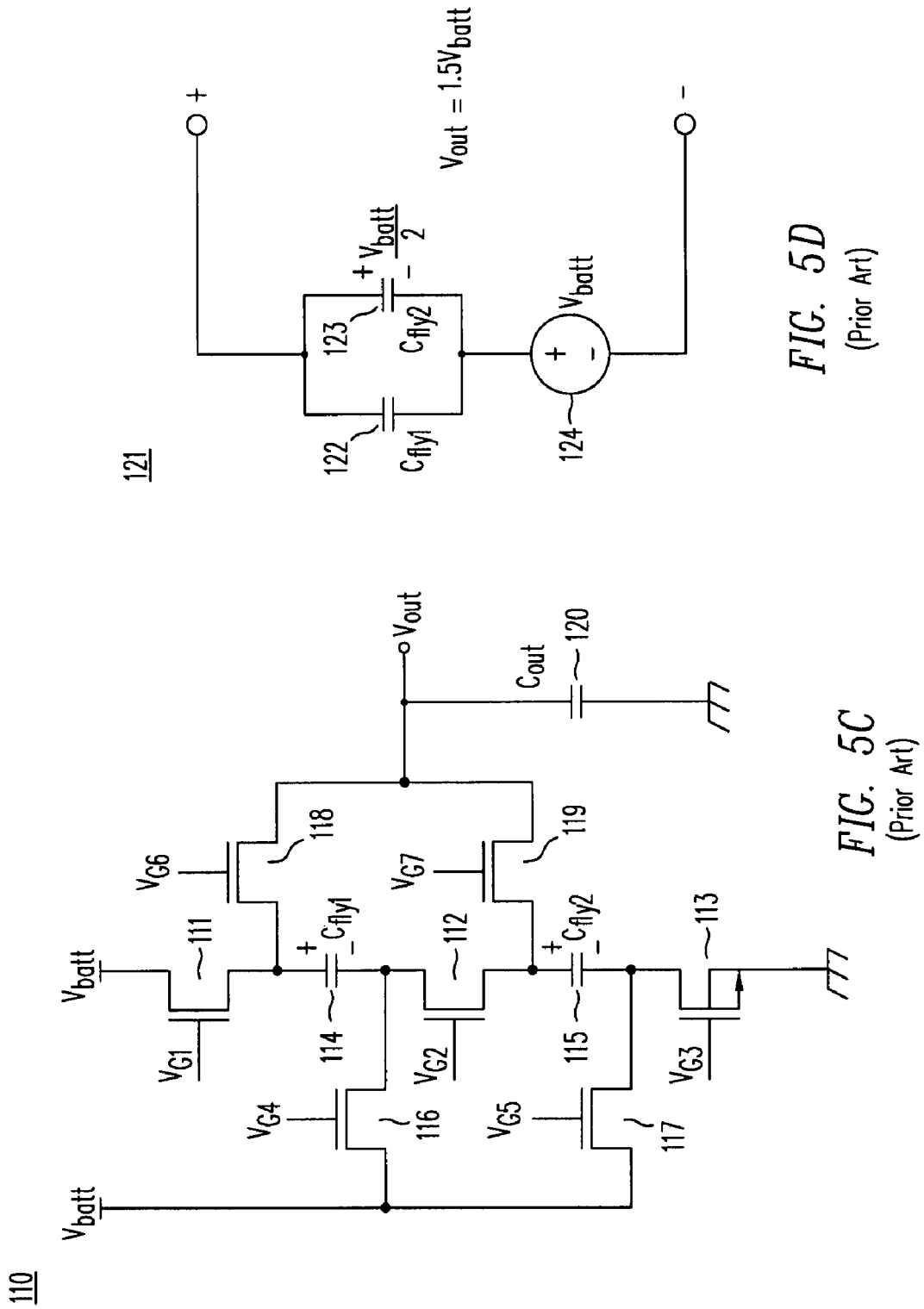

HIGH-EFFICIENCY DC/DC VOLTAGE CONVERTER INCLUDING CAPACITIVE SWITCHING PRE-CONVERTER AND DOWN INDUCTIVE SWITCHING POST-REGULATOR

CROSS-REFERENCE TO RELATED APPLICATIONS

This application claims the priority of Provisional Applications Nos. 60/877,952 and 60/877,720, both filed on Dec. 30, 2006, each of which is incorporated herein by reference in its entirety.

FIELD OF THE INVENTION

This invention pertains to the design, operation and performance of switching power supplies for use in DC/DC conversion and voltage regulation, and to the semiconductor components used in such converters.

BACKGROUND OF THE INVENTION

Voltage regulation is commonly required to prevent variation in the supply voltage powering various microelectronic components such as digital ICs, semiconductor memories, display modules, hard disk drives, RF circuitry, microprocessors, digital signal processors and analog ICs, especially in battery-powered applications such as cell phones, notebook computers and consumer products.

Since the battery or DC input voltage of a product often must be stepped-up to a higher DC voltage, or stepped-down to a lower DC voltage, such converters are referred to as DC-to-DC converters. Step-down converters, commonly referred to as Buck converters, are used whenever a battery's voltage is greater than the desired load voltage. Step-down converters may comprise inductive switching converters, capacitive charge pumps, and linear converters. Conversely, step-up converters, commonly referred to boost converters, are used whenever a battery's voltage is lower than the voltage needed to power its load. Step-up converters may comprise inductive switching converters or capacitive charge pumps.

Another type of converter may operate as either a step-up or a step-down converter, depending on whether the power input to the converter has a voltage above or below its output voltage. Commonly referred to Buck-boost converters, such circuitry is needed whenever a converter's input and output voltages are similar, such that variations in the input voltage preclude the use of a simple boost or Buck converter.

One example an application requiring both step-up and step-down conversion is supplying a regulated 3.3V output from a lithium ion (LiIon) battery. Since a LiIon battery exhibits a terminal voltage which decays from 4.2V when fully charged to below 3V when discharged, the converter must be able to step-down initially and step-up later.

Inductive Switching Converters

Of the above voltage converters, the inductive switching converter can achieve superior performance over the widest range of currents, input voltages and output voltages. The principles of inductive switching converter operation are described in application Ser. No. 11/890,818, titled "High-Efficiency DC/DC Voltage Converter Including Down Inductive Switching Pre-Regulator And Capacitive Switching Post-Converter," filed contemporaneously herewith and incorporated herein by reference. Two examples of non-isolated inductive switching converters, a synchronous Buck step-down converter and synchronous boost step-up converter, are shown in FIGS. 1A and 1B.

Synchronous Buck converter 1 of FIG. 1A comprises a power MOSFET 3, an inductor 5, a synchronous rectifier power MOSFET 4, with a rectifier diode 8, and a capacitor 6. Operation of MOSFET 3 is controlled by a pulse-width modulation (PWM) control circuit 2, driving the gate of MOSFET 3. The gate drive may vary in polarity and voltage depending on whether MOSFET 3 is N-channel or P-channel. Synchronous rectifier MOSFET 4, generally an N-channel MOSFET, is driven out of phase with MOSFET 3, but MOSFET 4 is not necessarily on the entire time when MOSFET 3 is off. In general, MOSFET 4 conducts only during times when diode 8 is conducting.

While the control circuit controlling the operation of converter 1 is referred to as PWM control, implying a fixed-frequency variable-pulse-width operation, it may alternatively operate in a variable frequency mode where the clock period is allowed to vary, or alternatively alternating between varying and fixed frequency modes depending on load and input conditions.

The energy input from the power source, battery or power input into DC/DC converter 1 is switched or gated through MOSFET 3. With its positive terminal connected to the battery or input, MOSFET 3 acts like a "high-side" switch controlling the current in inductor 5. Diode 7 is a P-N junction parasitic to MOSFET 3, in parallel to its drain and source, which remains reverse-biased in normal operation. Since diode 7 does not carry current in normal operation, it is illustrated by dotted lines.

By controlling the current in the inductor 5 by controlling the on-time of MOSFET 3, the energy stored in the magnetic field of inductor 5 can be adjusted dynamically to control the voltage on output filter capacitor 6. The output voltage $V_{out}$ is fed back to the input of PWM control circuit 2, which controls the current $I_L$ in inductor 5 through the repeated switching of MOSFET 3. The electrical load connected to the output of converter 1 is not shown.

Driven out of phase with MOSFET 3, synchronous rectifier MOSFET 4 conducts some portion of the time when MOSFET 3 is off. With its positive terminal connected to the inductor, i.e. to the node where the intermediate voltage $V_x$ is present, and its negative terminal connected to the circuit ground, MOSFET 4 acts like a "low-side" switch, shunting the current flowing through diode 8. Diode 8 is a P-N junction parasitic to synchronous rectifier MOSFET 4, in parallel to its drain and source. Diode 8 conducts substantial current only during intervals when both MOSFETs 3 and 4 are off.

Both MOSFETs 3 and 4 are off during every switching transition to prevent shorting of the input power source. The so-called break-before-make (BBM) operation prevents shoot-through conduction by guaranteeing that both MOSFETs 3 and 4 do not conduct simultaneously so as to short or "crow-bar" the input terminal of converter 1 to ground.

During this brief BBM interval, diode 8 must carry the load current $I_L$ flowing through inductor 5. Unwanted noise can occur during the transitions associated with BBM operation.

If we define the duty factor D of converter 1 as the percentage of the time that energy flows from the battery or power source into DC/DC converter 1, i.e., the time during which MOSFET 3 is on, then the output-to-input voltage ratio of Buck converter 1 is equal to its duty factor:

$$\frac{V_{out}}{V_{in}} = D \equiv \frac{t_{sw}}{T}$$

This relationship for a Buck or synchronous Buck converter is illustrated by curve 17 in FIG. 2A in graph 15. Notice the Buck converter cannot smoothly reach a zero or unity transfer characteristic without exhibiting some discontinuities 19 and 21 at the extremes of D. This phenomenon occurs due to switching delays in the power MOSFETS and the control and gate drive circuitry of converter 1.

As long as the Buck converter's power MOSFET is still switching, $t_{sw}$ is limited to some portion of the clock period T, e.g. 5%<D<95%, essentially due to turn-on and turn-off delay within the MOSFET switch and its control loop. For example at a 95% duty factor and a 3 MHz clock, the off time for the high-side MOSFET 3 is only 5% of the 333 nsec period, or just 16 nsec. This means that MOSFET 3 must turn off and back in only 16 nsec—too rapidly to regulate over a 95% output-to-input conversion ratio. The minimum off-time problem impacts both synchronous and non-synchronous Buck converters. The problem is, however, further exacerbated in a synchronous DC/DC converter since no time remains for the synchronous rectifier MOSFET to turn on and then off again and still exhibit BBM operation.

Referring again to graph 15 in FIG. 2A, above some maximum duty factor $D_{max}$, there is not adequate time to maintain switching operation, and converter 1 must jump from $D_{max}$ to a 100% duty factor, as shown by discontinuity 21. Above $D_{max}$, converter 1 turns on the high-side MOSFET 3 and leaves it on for the entire period T. The abrupt transition 21 causes a glitch in the output voltage of converter 1. Moreover, at a 100% duty factor, $V_{out}=V_{in}$, as shown by line 16, and all regulation is lost as long as the switching is halted.

Synchronous boost converter 10 shown in FIG. 1B includes a low-side power MOSFET 12, a battery connected inductor 13, an output capacitor 15, and a "floating" synchronous rectifier MOSFET 14 with a parallel rectifier diode 16. The gates of the MOSFETs 12 and 14 are driven by break-before-make circuitry (not shown) and controlled by a PWM controller 11 in response to voltage feedback $V_{FB}$ from the output of converter 10, which is present across filter capacitor 15. BBM operation is needed to prevent shorting out filter capacitor 15.

The synchronous rectifier MOSFET 14, which may be an N-channel or a P-channel MOSFET, is considered "floating" in the sense that neith its source nor its drain terminal is permanently connected to any supply rail, i.e. to ground or $V_{batt}$. Diode 16 is a P-N diode intrinsic to synchronous rectifier MOSFET 14, regardless of whether synchronous rectifier MOSFET 14 is a P-channel or an N-channel device. A Schottky diode may be included in parallel with MOSFET 16 but with series inductance may not operate fast enough to divert current from forward-biased intrinsic diode 16. Diode 17 is a P-N junction diode intrinsic to N-channel low-side MOSFET 12 and remains reverse-biased under normal operation. Since diode 17 does not conduct under normal operation, it is shown as dotted lines.

If we again define the duty factor D as the time that energy flows from the battery or power source into DC/DC converter 10, i.e. the time during which low-side MOSFET switch is on and inductor 13 is being magnetized, then the output-to-input voltage ratio of boost converter 10 is equal to the inverse of 1 minus its duty factor, i.e.

$$\frac{V_{out}}{V_{in}} = \frac{1}{1-D} = \frac{1}{1-t_{sw}/T}$$

This relationship for a boost or synchronous boost converter is illustrated by curve 18 in FIG. 2A also in graph 15. Notice that boost converter 10 cannot smoothly reach a unity transfer characteristic without exhibiting some discontinuity at the lower extreme of D. This phenomenon occurs due to switching delays in the power MOSFET 12 and its control and gate drive circuitry.

As long as power MOSFET 12 of boost converter 10 is still switching, $t_{sw}$ is limited to some portion of the clock period T, e.g. 5%<D<95%, essentially due to turn-on and turn-off delay within MOSFET 12 and its control loop. For example at a 5% duty factor and a 3 MHz clock frequency, the off time for MOSFET 12 is only 5% of the 333 nsec period, or just 16 nsec. This means that MOSFET 12 must turn on and back off in only 16 nsec—too rapidly to regulate below a 5% output-to-input conversion ratio. The minimum on time problem impacts both synchronous and non-synchronous boost converters.

Referring again to graph 15 in FIG. 2A, below some minimum duty factor $D_{min}$, there is not adequate time to maintain switching operation and converter 10 must jump from $D_{min}$ to 0% duty factor, as shown by discontinuity 20. Below $D_{min}$, converter 10 turns on the synchronous rectifier MOSFET 14 and leaves it on for the entire period T. The abrupt transition 20 causes a glitch in the output voltage of boost converter 10. Moreover, at a 100% duty factor, $V_{out}=V_{in}$, as shown by line 16, all regulation is lost as long as the switching is halted.

So in both synchronous Buck converter 1 and synchronous boost converter 10, operating near a unity transfer characteristic, i.e. when $V_{out} \approx V_{in}$, shown by line 16, is problematic.

The efficiency η of a voltage converter can be given by $$\eta = \frac{P_{out}}{P_{in}} = \frac{I_{out} \cdot V_{out}}{I_{in} \cdot V_{in}}$$

An analysis of inductive switching converter efficiencies is provided in the above-referenced application Ser. No. 11/890,818.

Graph 25 of FIG. 2B illustrates examples of typical conversion efficiencies for synchronous Buck and synchronous boost converters as a function of the converter's voltage conversion ratio $V_{out}/V_{in}$. As shown, line 26 illustrates the unity conversion condition, where $V_{out}=V_{in}$. Conversion ratios less than unity, on the left side of line 26, represent step-down conversion. Efficiency curve 27 represents an example of a Buck converter performing step-down voltage conversion. Conversion ratios greater than unity, on the right side of line 26, represent step-up conversion. Efficiency curve 28 represents an example of a boost converter performing step-up voltage conversion.

In general, boost converters exhibit lower efficiencies than Buck converters for comparable load currents, as illustrated by curves 27 and 28, primarily due to the fact that boost converters exhibit higher peak currents than Buck converters. This problem is further accentuated for high $V_{out}/V_{in}$ voltage conversion ratios, especially for output voltages approaching ten times the input voltage, as illustrated by the decline of curve 28 with increasing conversion ratios.

Furthermore, in graph 25, efficiency curve 27 for Buck converters is not shown for conversion ratios below 0.1 and above 0.9 and likewise efficiency curve 29 for boost converters is not shown for conversion ratios below 1.1 and above 10, because it requires operation at a duty factor of below 10% or above 90%, an operating condition difficult to achieve, especially at high switching frequencies.

Buck-Boost Switching Converter (Prior Art)

The problem of non-isolated DC/DC switching converter operation near unity transfer is especially difficult in applications when the input voltage may vary above or below the desired output voltage. Examples of this application include the output of noisy AC adapters or in circuitry which must operate as a battery back-up during emergency conditions when a main source of power has failed.

Another scenario where a unity conversion ratio is required occurs when a battery's operating voltage range extends above and below the desired output voltage.

For example, the discharge of a LiIon battery starts at 4.2V at full charge, initially decays rapidly to around 3.6V, then decays slowly from 3.6V to 3.4V, and finally drops quickly to its cutoff at or below 3V. In the event that a DC/DC converter is needed to produce a well-regulated 3.3V output during this entire discharge period, a sub-unity conversion ratio of (3.3V/4.2V), i.e. a ratio of 0.79, is needed at the outset, indicating that a Buck converter is required. At the battery's end-of-life, the conversion ratio exceeds unity, becoming 3.3V/3V, i.e. a conversion ratio of 1.1, and this requires a boost converter to provide the desired 3.3V output voltage. Such an application demanding both step-up and step-down conversion requires a Buck-boost, or up-down converter.

In the case where the user wants to avoid the complexities of up-down conversion, one possible approach is to use only a Buck converter and give up some battery life by cutting the battery off early, e.g. at 3.3V. In practice, however, when considering battery manufacturing variations and converter drop-out and duty factor limitations, too much battery life is sacrificed to rely on a Buck-only converter solution.

If up-down conversion cannot be avoided, one possible solution involves Buck-boost conversion. A Buck-boost converter can easily be derived from combining synchronous Buck and boost converters into a merged circuit. In the circuit diagram of FIG. 3A, for example, a Buck-boost converter 35 comprises a synchronous Buck converter, comprising a P-channel or N-channel MOSFET 36, an inductor 38A, an N-channel synchronous rectifier MOSFET 37, an intrinsic rectifier diode 39, and a capacitor 44, is used to power a synchronous boost converter, comprising a low-side N-channel MOSFET 40, an inductor 38B, a synchronous rectifier MOSFET 41, an intrinsic rectifier diode 42, and a filter capacitor 43. Cascade Buck-boost converter 35 first steps down and regulates the input voltage to an intermediate voltage lower than the desired output voltage, and then steps this intermediate voltage up to produce $V_{out}$.

Conversely, in FIG. 3B a synchronous boost-Buck converter 45 comprises a boost converter, comprising a low-side N-channel MOSFET 46, an inductor 47, an N-channel or P-channel synchronous rectifier MOSFET 48A, an intrinsic diode 49, and a capacitor 54, which is used to power a synchronous Buck converter, comprising a MOSFET 48B, an inductor 52, an N-channel synchronous rectifier MOSFET 50, an intrinsic rectifier diode 51, and a filter capacitor 53, the combined cascade boost-Buck converter collectively driving a load (not shown). In this approach, the input voltage is first stepped-up to an intermediate voltage higher than the desired output voltage, and then is stepped back down to produce $V_{out}$.

The overall efficiency of either Buck-boost converter 35 or boost-Buck converter 45 is given by the product of the boost converter's efficiency $\eta_{boost}$ multiplied by the Buck converter's efficiency $\eta_{Buck}$, mathematically as $\eta_{cascade} = \eta_{Buck} * \eta_{boost}$. Even if both converters are 85% efficient, the combined cascade converter reaches only a roughly 70% overall efficiency, significantly lower than the efficiency of a Buck converter or a boost converter operated alone. The overall loss in either a Buck-boost or boost-Buck cascade converter is worse than the loss in either a synchronous Buck converter or a synchronous boost converter, because there are more transistors in series between the input and output terminals, and because all the transistors are switching all the time.

As shown, boost-Buck converter 45 of FIG. 3B includes series-connected MOSFETs 48A and 48B with intermediate capacitor 54. Since in steady-state operation, the current in series-connected MOSFETs must be equal, MOSFET 48B is redundant and can be eliminated without impacting circuit operation. Even if this is done, boost-Buck converter 45 requires two inductors 47 and 52, a characteristic highly undesirable from a user's point-of-view.

Similarly, Buck-boost converter 35 of FIG. 3A includes inductors 38A and 38B with intermediate capacitor 44. Since in steady state operation the current in inductors 38A and 38B is the same, inductor 38B is redundant and may be eliminated without changing the function of the circuit. In fact, capacitor 44 may also be eliminated without significantly altering the operation of Buck-boost converter 35.

The resulting simplified Buck-boost converter 55, illustrated in FIG. 3C, comprises a single-inductor 59; four MOSFETs 57, 56, 60, and 61; diodes 58 and 62 and filter capacitor 63. The PWM control circuitry and break-before-make and gate buffer circuits are not shown. Depending on its terminal conditions, such a converter can operate in three distinct modes, Buck, boost, and Buck-boost.

In FIG. 3D, equivalent circuit diagram 65 represents the operation of Buck-boost converter 55 as a Buck converter, where MOSFETs 57 and 56 are switched out-of-phase under PWM control while MOSFET 61 remains turned-on, represented by resistor 67, and MOSFET 60 is turned off, represented by open circuit 66. The overall power loss in Buck-booster converter 55 is greater than in a synchronous Buck converter because it now includes the conduction loss in MOSFET 61, i.e. power lost continuously in resistor 67. As a result of this increased power loss, Buck-boost converter 55 operating in its Buck mode has a lower efficiency than conventional Buck converter 1 shown in FIG. 1A.

In FIG. 3E, equivalent circuit diagram 70 represents the operation of Buck-boost converter 55 as a boost converter, where MOSFETs 60 and 61 are switched out-of-phase under PWM control while MOSFET 57 remains turned-on, represented by resistor 71, and MOSFET 56 is turned off, represented by open circuit 72. The overall power loss in Buck-boost converter is greater than in a synchronous boost converter because it now includes the conduction loss in MOSFET 57, i.e. power lost continuously in resistor 71. As a result of this increased power loss, Buck-boost converter 55 operating in its boost mode has a lower efficiency than conventional boost converter 10 shown in FIG. 1B.

The loss of efficiency using Buck-boost converter 55 is illustrated in FIG. 4 in the plot of efficiency η for various output-to-input voltage conversion ratios $V_{out}/V_{in}$. For convenience, the efficiency curves 27 and 28 from FIG. 2B for conventional Buck and boost converters are repeated as curves 81 and 82, respectively, in FIG. 4.

Curve 83 illustrates the efficiency of Buck-boost converter 55 operating in Buck-only mode, shown in equivalent circuit 65. Because of the series resistance associated with on-state MOSFET 61, the efficiency of Buck-boost converter 55 in the Buck only mode is lower than that of the simple Buck converter (curve 81). This loss of efficiency can range from a few percent to over 10%, depending on operating conditions. Curve 85 illustrates the efficiency of Buck-boost converter 55 operating in full Buck-boost mode where all four switches are switching constantly. In this mode Buck-boost converter 55 exhibits even greater losses and poorer efficiency than Buck-boost converter 55 operating in Buck mode (curve 83).

Curve 84 illustrates the efficiency of Buck-boost converter 55 operating in boost-only mode, shown in equivalent circuit 70. Because of the series resistance associated with on-state MOSFET 57, the efficiency of Buck-boost converter 55 in the boost-only mode is lower than that of a simple boost converter (curve 82). This loss of efficiency can range from a few percent to over 10%, depending on operating conditions. Curve 86 illustrates the efficiency of Buck-boost converter 55 operating in full Buck-boost mode, where all four MOSFETs are switching constantly. In this mode, Buck-boost converter 55 exhibits even greater losses and poorer efficiency than Buck-boost converter 55 operating in boost mode (curve 84).

Operating near unity conversion ratios, where the output voltage is slightly above or below its input voltage, i.e. where $V_{out} \approx V_{in}$, Buck-boost converter 55 must operate in the Buck-boost mode, where all four MOSFETs are switching constantly. The resulting efficiency (curve 87) can be 10% to 20% lower than the efficiency of conventional Buck and boost converters (curves 81 and 82).

The efficiency penalty for a voltage converter to be able to operate over a wide range of voltage conversion ratios using the prior-art Buck-boost converter is substantial. Moreover, the converter must change its operating mode whenever operating near unity voltage conversion ratios.

Charge Pump Converters

An alternative to the switched-inductor converter is a charge pump, a voltage conversion circuit using only switches and capacitors to perform voltage translation through repeated charge redistribution, i.e. the continuous charging and discharging of a capacitor network driven by a clock or oscillator.

The advantage of a charge pump is that at specific voltage conversion ratios, it can exhibit extremely high conversion efficiencies approaching 100%. The disadvantage is that it can only efficiently generate voltages that are exact integer multiples of the number of flying capacitors used in its converter circuit. Voltages other than select multiples exhibit low efficiencies.

A common charge pump 90 is illustrated in FIG. 5A where a single capacitor 93 is employed as a "doubler", i.e. to double the input voltage. Charge pump 90 comprises four MOSFETs, 92, 91, 94 and 95, configured in a manner similar to an H-bridge except that one terminal, the source of MOSFET 95 is connected to the output terminal and reservoir capacitor 96 rather than to ground.

Operation of charge pump 90 involves repeatedly charging and discharging flying capacitor 93. During the charging phase, diagonal MOSFETs 94 and 91 are closed, charging capacitor 93 to the voltage $V_{batt}$ while MOSFETs 92 and 95 remain open. Thereafter, in the charge transfer phase, MOSFETs 94 and 91 are opened, MOSFETs 92 and 95 are closed, and energy is transferred from the flying capacitor 93 to the output reservoir capacitor 96, pumping the output voltage $V_{CP}$ to a value twice the battery voltage or $2 \cdot V_{batt}$ The purpose of the MOSFET switch network is essentially to place the flying capacitor in parallel with the battery during the charging phase and in series, i.e. stacked on top of the battery's positive terminal, during the charge transfer phase, as illustrated by equivalent circuit 100 in FIG. 5B. In FIG. 5B, a voltage source 101 represents the battery input and a capacitor 102 charged to $V_{batt}$ represents flying capacitor 93. By stacking the voltages across voltage source 101 and capacitor 102 atop one another, the output voltage of the charge pump is the sum of the voltages, hence doubling the voltage input. The cycle then repeats with another charging phase.

FIG. 5C illustrates a charge pump 110 utilizing two flying capacitors 114 and 115 and a network of seven MOSFETs 111, 112, 113, 116, 117, 118 and 119. The purpose of the MOSFET switching network is to charge capacitors 114 and 115 in series, thereby charging each capacitor to one-half the battery voltage, i.e. $V_{batt}/2$. During the charging of capacitors 114 and 115, MOSFETs 111, 112 and 113 are on and MOSFETs 116, 117, 118 and 119 are off. After the charging phase, the charged capacitors 114 and 115 are connected in parallel, and connected to the positive terminal of the battery. This connection is accomplished by turning on MOSFETs 116, 117, 118 and 119 and turning off MOSFETs 111, 112 and 113. The resulting output voltage, shown in equivalent circuit 121 of FIG. 5D, is equal to $V_{batt}+V_{batt}/2$, or $1.5V_{batt}$, as illustrated by battery voltage source 124 and the parallel combination of capacitors 122 and 123 stacked atop one another. Because the output voltage is equal to 1.5 times the input voltage, this charge pump is sometimes referred to as a "fractional" charge pump.

Actually, many different charge pump topologies are possible, but most use only one or two flying capacitors. A single flying capacitor charge pump is capable of efficiently delivering power at an output voltage equal to twice its input voltage, or alternatively, if during the charge transfer phase the capacitor is connected to the negative terminal of the battery an output voltage that is a mirror-image negative voltage of the battery, i.e. $-V_{batt}$. In the latter configuration the charge pump is also known as an inverter. The inverter case is illustrated in equivalent circuit 130 of FIG. 5E, where the battery, represented by a voltage source 131, is used to charge a capacitor 132, and then, during the charge transfer phase, the positive terminal of capacitor 132 is connected to ground, i.e. the negative terminal of battery 131. Two-capacitor, fractional charge pumps may also be used to produce an output voltage equal to one-half the input voltage, as shown in equivalent circuit 135 of FIG. 5F where each of capacitors 137 and 138 are initially charged to one-half of the voltage $B_{batt}$ provided by voltage source 136 are then referenced to the negative battery potential (ground) to provide a positive potential equal to $+0.5V_{batt}$, as shown, or alternatively to provide a negative, inverted potential equal to $-0.5V_{batt}$ (not shown).

One problem with charge pump converters is they operate efficiently only at conversion ratios equal to integral multiples of the number of flying capacitors; in other words, they are not true voltage converters. Specifically, if a desired load voltage $V_{out}$ is below the voltage $V_{CP}$ that the capacitor network produces, the converter cannot adapt. To obtain a voltage-differential between the charge pump's output voltage $V_{CP}$ and the output voltage of the converter $V_{out}$ requires a resistor or current source to support the voltage mismatch, and the voltage across that lossy element results in lost power and reduced efficiency. An analysis of charge pump efficiencies is described in application Ser. No. 11/890,941, titled "High-Efficiency DC/DC Voltage Converter Including Capacitive Switching Pre-Converter And Up Inductive Switching Post-Regulator," filed contemporaneously herewith and incorporated herein by reference.

The efficiency of single-mode charge pumps is illustrated in graph 150 of FIG. 6A for charge pumps having various multipliers, including a doubler (curve 151), an inverter (curve 152), and fractional charge pumps (curves 153, 154 and 155). Curve 156 represents a direct battery connection, identical to a linear converter's maximum theoretical efficiency, i.e. assuming no quiescent operating current. In each case, as the input to output ratio approaches an integer multiple of $\pm\frac{1}{2}V_{batt}$, the efficiency increases. The charge pump is not capable of delivering an output voltage above that voltage, and to obtain a higher output voltage a charge pump having a different voltage multiplier, i.e. a different operating mode, must be employed.

Each curve shown in graph 150 represents a specific charge pump circuit, e.g. including those shown previously in FIGS. 5A-5F. Unless a load operates at an exact half-volt integral multiple of the input voltage, however, the efficiency of the charge pump converter using one or two capacitors will suffer. This behavior is especially problematic for battery powered products where the battery voltage changes markedly as the cell discharges. In the case of LiIon batteries, for example, the voltage can decay more than 1V during discharge, representing a 25% change. Therefore, even if the peak efficiency may be high at one specific operating condition and battery voltage, the overall efficiency of the converter averaged over the battery discharge curve is poor. Weighted average efficiencies can be lower than 60% using a single-mode charge pump.

One way to improve the average efficiency of a charge pump voltage converter is to switch modes between 1X, 1.5X and 2X automatically within one circuit. This feature is particularly useful to supply a fixed voltage over a wide input range. The efficiency of a mode-changing charge pump is illustrated in FIG. 6B, where as the battery decays the tri-mode converter circuit switches from 1X-battery-direct mode having an efficiency shown by curve 163, to a 1.5X-fractional-mode with efficiency shown by curve 162, and again to 2X-doubler-mode having an efficiency shown by curve 161. By switching modes in this zigzag pattern, the efficiency of the charge pump converter is improved because the output is not pumped to an excessively high value compared to the load.

Unfortunately, conditions still exist where the efficiency suffers substantially. The mode transitions exhibit dramatic shifts in efficiency (curve 163) at a conversion ratio of one, and again for curve 162 at a 1.5X conversation ratio. The mode transitions may also result in sudden current and voltage discontinuities, or produce instability or noise. To determine what conversion ratio is required, graph 160 also includes curves 166, 165, and 164 relating the required input voltage range (right hand axis) and conversion ratios to produce an output voltage of 3V, 3.5V and 4V, respectively.

Specifically, the charge pump converter in 1.5X mode does not perform well at conditions slightly above a unity conversion ratio, unfortunately manifesting even lower efficiencies than the above-mentioned inductive Buck-boost converter.

Dropout in Prior Art converters

Whenever the input voltage and the output voltage of a voltage converter approach one another within the range of several hundred milli-volts, e.g. $V_{out}=V_{in}\pm 200$ mV, the quality of the converter's regulating ability suffers. Loss of regulation quality may be manifest in several ways, either by a one-time or repeated glitch or discontinuity in output voltage, by increased ripple, or by complete loss of regulation within some narrow voltage band. The phenomenon of degraded regulation whenever $V_{out}$ approaches $V_{in}$ is referred to as "dropout", meaning the converter drops out of regulation.

The Buck converter of FIG. 1A and the boost converter of FIG. 1B both momentarily lose regulation as their switching duty factor jumps from $D_{max}$ or $D_{min}$ to 100% and they lose regulation completely while D=100%, since the input is essentially resistively connected to the output during the dropout condition.

While a Buck-boost converter does not exhibit permanent dropout, it can easily suffer a voltage glitch during mode transitions, whenever the converter switches its Buck mode to its Buck-boost mode, or from its Buck-boost mode to its boost mode. Mode transitions occur whenever the converter changes from a circuit having two power devices switching into one where four devices are switching, or vice versa.

To avoid the mode switching transition problem, a Buck-boost converter can be run continuously in Buck-boost mode with all four power devices switching continuously, but as shown in FIG. 4, its efficiency is then degraded under all input-output conditions and conversion ratios.

As stated above, a charge pump is incapable of regulating voltage without the use of a series-connected linear converter to provide the regulation function. Unfortunately, it is a well known phenomenon that all linear converters exhibit loss of regulation, i.e. dropout, whenever ΔV across their input and output terminals becomes too small. In essence, dropout occurs in a linear converter because the loop gain of the amplifier performing regulation drops precipitously as its transistor pass element changes from acting as a current source to acting as a variable resistor. If the pass element is a bipolar transistor, the loss of gain occurs at small values of $V_{CE}$ as the device transitions from its active operating region into saturation. In many bipolar linear converters, this dropout condition occurs at more than 400 mV.

In so-called "low dropout" linear converters or "LDOs", a MOSFET capable of operating as a current source at a lower ΔV is substituted for the bipolar pass element, but the linear converter still drops out at 200 to 300 mV as the power MOSFET pass element transitions from its saturation, i.e. constant current, region into its linear, i.e. resistive, region of operation.

In conclusion, prior-art non-isolated high-efficiency converters exhibit dropout at voltage conversion ratios approaching unity. Mode switching, loss of regulation and dropout can be avoided only by sacrificing efficiency. Isolated converters such as flyback and forward converters are able to operate at high efficiencies near unity conversion without the need switching modes, but their use of physically-large tapped inductors, coupled inductors, and transformers precludes their application in most portable products.

Summary of Prior-Art Down-Up Converters

In conclusion, no existing charge pump converter, Buck-boost switching converter or other inductive switching converter is able to both step-up and step-down DC voltages efficiently, especially for conversion ratios near unity where $V_{in}\approx V_{out}$. What is needed is an up-down converter that is efficient over a wide range of input and output voltages, and that does not need to change its operating mode as it operates near a unity voltage conversion ratio, i.e. when $V_{out}\approx V_{in}$. Furthermore, the converter should be free from dropout problems, maintaining high-quality regulation even while biased with an output voltage within 200 mV of its input, i.e. within the range $V_{out}=V_{in}\pm 200$ mV.

SUMMARY OF THE INVENTION

A DC/DC voltage converter according to this invention includes a pre-converter and a post-regulator. The pre-converter includes a switched capacitive circuit: and a post-regulator includes a switched inductive circuit. An output terminal of the pre-converter is coupled to an input terminal of the post-regulator. An input terminal of the pre-converter comprises an input terminal of the DC/DC voltage converter, and an output terminal of the post-regulator comprises an output terminal of the DC/DC voltage converter. In many embodiments the pre-converter includes a charge pump and the post-regulator includes a Buck converter.

Within this broad structure, many variations are possible within the scope of the invention. In one group of embodiments, the pre-converter includes a voltage-reducing fractional charge pump and the post-regulator includes a Buck converter. In another group of embodiments, the pre-converter includes a voltage-increasing charge pump and the post-regulator includes a Buck converter. In another group of embodiments, the pre-converter includes a voltage-inverting charge pump and the post-regulator includes a Buck converter.

DC/DC converters according to this invention are capable of operating over a wide range of voltage conversion ratios ranging from step-up to step-down conversion without the need for mode switching. Free from mode switching and dropout problems when $V_{out} \approx V_{in}$, the converter does not suffer from noise glitches, poor regulation, and instability, even near unity input-to-output voltage conversion ratios. While the converter includes switched inductor operation, it avoids the minimum pulse width problem plaguing conventional switching converters at very high and very low duty factors, including converter dropout, narrow pulses and associated high-current spikes, variable frequency operation, inadequate time to perform break-before-make transitions. In contrast, prior-art non-isolated DC/DC converters suffer from one or more of the aforementioned problems at extreme duty factors, and their use near unity voltage conversion ratios remains problematic.

The method and apparatus of this invention can be used in applications requiring up-down conversion, and avoid the problems of existing Buck-boost and flyback converters. While preferred embodiments of this invention specifically address the implementation of up-down converters, variants include improved down-only converters and DC/DC inverters capable of producing negative, i.e. below ground, supply voltages.

BRIEF DESCRIPTION OF THE DRAWINGS

FIG. 2B is a graph of efficiency versus voltage conversion ratio for conventional Buck and boost converters.

FIG. 3A is a circuit diagram of a cascaded Buck-boost converter.

FIG. 3B is a circuit diagram of a cascaded boost-Buck converter.

FIG. 5C is a circuit diagram of a 1.5X fractional circuit.

FIG. 5D is an equivalent circuit diagram of the 1.5X circuit during discharge.

DESCRIPTION OF THE INVENTION

Figure 7:
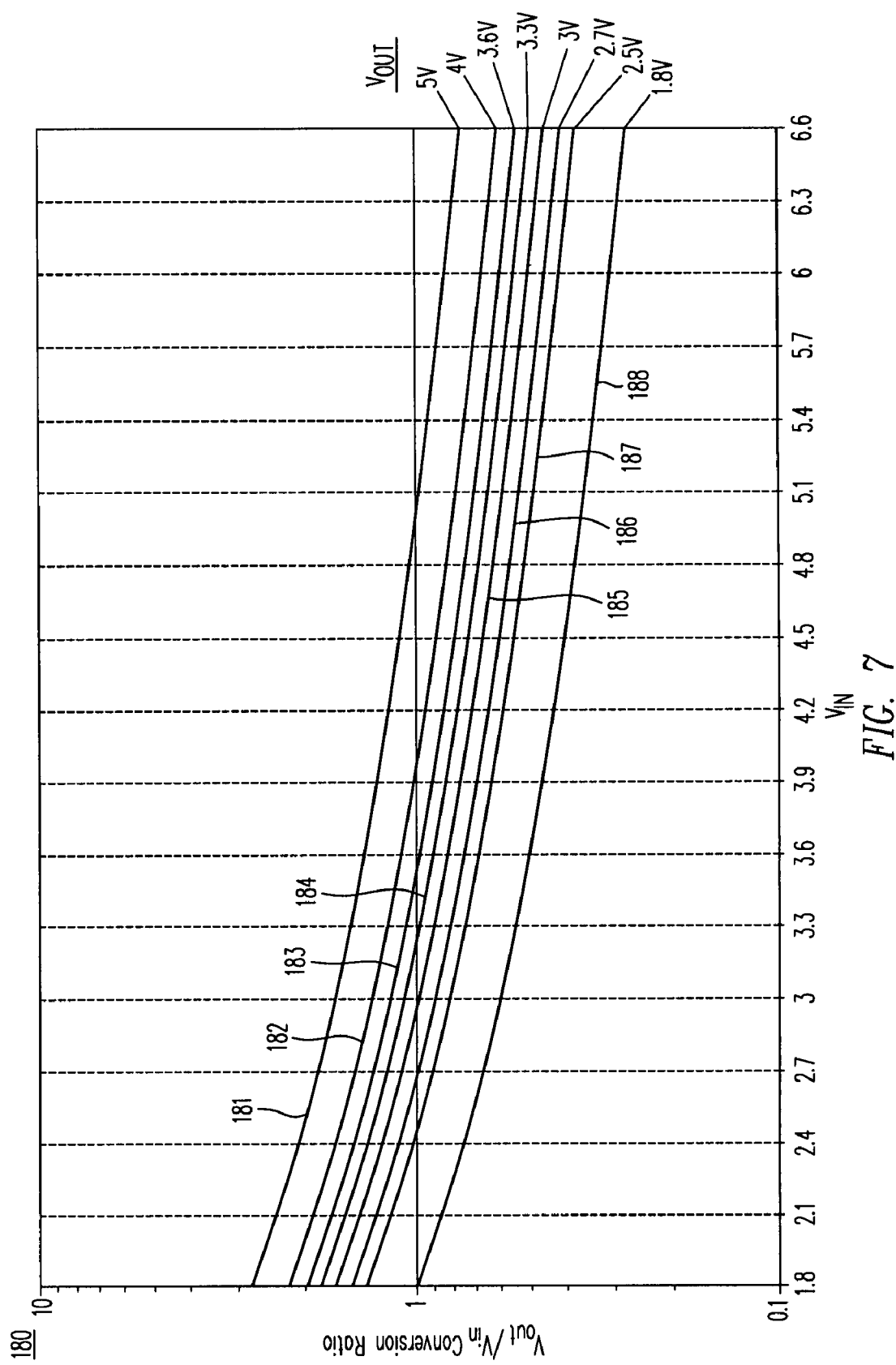
FIG. 7 is a graph of voltage conversion ratio versus input voltage for various output voltages in a DC/DC converter.

FIG. 7 graphically illustrates the requisite voltage conversion ratio $V_{out}/V_{in}$ of a DC/DC converter operating at a variety of voltage outputs and for inputs ranging from 1.8V to 6.6V. Curve 181 illustrates that for a 4.5V to 5.5V input range, regulating a 5V output to ±1% accuracy requires operation above and below a unity conversion ratio, meaning an up-down regulating converter is required to hold a tighter tolerance than the ±5% or ±10% accuracy commonly guaranteed by conventional AC/DC wall adapters.

Up-down conversion is also required when using a lithium ion battery to produce a voltage intermediate to its wide voltage range. As examples, curves 182, 183, 184 in FIG. 7 illustrate outputs at 4V, 3.6V, and 3.3V respectively. Since these load voltages fall within the LiIon battery's normal discharge voltage range of 4.2V to 3V, the converter must regulate in step-down mode, with a voltage conversion ratio below unity at the beginning of the cell's discharge cycle, and in step-up mode, with a conversion ratio above unity later as the cell voltage decays.

Curve 185 illustrates a 3V output which theoretically should require only step-down conversion, but because of the above-mentioned problem of dropout, a LiIon battery supplying a 3V output must cut off above 3.2V, thereby wasting useful battery life. New generation LiIon cells under development may allow operation down to 2.7V, requiring the need to utilize up-down conversion for 2.7 V outputs, as shown by curve 186. At a 2.5V battery condition, dropout issues may also require the use of an up-down converter even to supply a regulated 2.5V output, as shown by curve 187. If, however, up-down conversion results in a loss of efficiency exceeding the extra operating time gained by the extended battery range, then the user lifetime benefit of using a battery capable of lower voltage operation is lost entirely.

Similarly, dropout concerns make it difficult to guarantee a 1.8V regulated output shown by curve 188 from 2-cell-connected nickel-metal-hydride or nickel-cadmium, i.e. NiMH or NiCd, batteries since those their outputs range from 2.4V down to 1.8V. Stopping usage at a 2V battery condition unacceptably wastes more than half the battery's charge life.

Another situation needing an efficient low-dropout up-down converter is the use of power supplies designed to work off two NiMH dry-cells, two alkaline cells, or a single cell LiIon battery. Since the output voltage of 2-series-cell NiMH battery packs ranges from 1.8V to 2.4V, the output voltage of 2-series-cell alkaline batteries ranges from 1.8V up to 3.4V during charging, and the output of a single-cell LiIon battery ranges from 4.2V down to 3V or even 2.7V, then any output between 4.2V and 1.8V needs an up-down converter to maximize efficiency and battery life, as shown by curves 182 through 188.

If we also consider that some systems allow the DC output from the AC/DC wall adapter to be connected without a battery present, the input voltage supplied to a system's DC/DC converter input can be considerably higher than if the battery were present, and may reach as high as 6.5V. When the battery is present and the charger disconnected, the input voltage may be as low as 1.8V. In such cases, every output curve ranging from curve 181 to curve 188, i.e. from 5V down to a 1.8V output, requires an up-down converter.

Today, most electrical loads are supplied by an up-only or down-only converter, requiring the battery to be cut off prematurely to avoid the need for up-down conversion, even at the expense of wasting usable stored charge in the battery. Up-down conversion is typically avoided at all costs except in extreme situations. With the poor efficiency, mode switching, noise glitches, regulation dropout, and poor regulation offered by existing up-down converters, be they DC/DC converters, charge pumps, or linear converters; a widespread requirement up-down conversion and regulation is extremely problematic. Present up-down converters cannot meet the needs of today's efficiency-focused consumer marketplace.

A New DC/DC Converter Topology

This invention provides a new non-isolated DC/DC converter and voltage regulation topology capable of operating over a wide range of voltage conversion ratios ranging from step-up to step-down conversion, without the need for mode switching. Free from mode switching and dropout problems when $V_{out} \approx V_{in}$, the converter does not suffer from noise glitches, poor regulation, and instability, even near unity input-to-output voltage conversion ratios. While the converter includes switched inductor operation, it avoids the minimum pulse width problem plaguing conventional switching converters at very high and very low duty factors, including converter dropout, narrow pulses and associated high-current spikes, variable frequency operation, inadequate time to perform break-before-make switching, and more. In contrast, prior-art non-isolated DC/DC converters suffer one or more of these problems at extreme duty factors, and their use near unity voltage conversion ratios remains problematic.

The method and apparatus of this invention can be used in applications requiring up-down conversion and avoids the problems of existing Buck-boost and flyback converters. While preferred embodiments of this invention specifically address the implementation of up-down converters, variants include improved down-only regulating converters and DC/DC inverters capable of producing negative, i.e. below ground, supply voltages.

Collectively, the new DC/DC converters described herein comprise three new converter topologies and variants thereof, referred to herein by acronym as CLUD—switched capacitor-inductor up-down converter CLDD—switched capacitor-inductor down-down converter CLID—switched capacitor-inductor inverting-down converter (inverter)

Specifically, this invention focuses on switched capacitor-inductor regulating converters comprising a switched-capacitor step-up, step-down, or inverting pre-converter feeding an inductively implemented step-down post-regulator. As a matter of nomenclature, the first C in the acronym represents the capacitive energy storage element in the pre-converter and the L represents the energy storage element, i.e. the coil or inductor, in the converter's second, or post-regulator, stage.

The third character in the converter's name, either: D, U or I, describes whether the pre-converter is stepping the input or battery voltage down or up or inverting the input voltage, respectively, before supplying it to the post regulator. The last character D describes the post-regulator as a step-down converter, meaning the magnitude of the voltage is decreased without changing its polarity. For example, "down" for a positive voltage means providing a smaller positive voltage, while "down" for a negative voltage, the output of an inverting pre-converter, means providing a negative voltage having a smaller absolute value, i.e. one closer to zero.

These topologies, described by the acronyms CLUD, CLDD, and CLID, vary in their utility for differing applications, and as such this new switched capacitor-inductor family of DC/DC converter topologies can be collectively described as CLXD converters, the X referring to a variable U for up, D for down, and I for inverting, respectively.

The above-referenced application Ser. No. 11/890,941 describes other switched inductor-capacitor converters comprising switched capacitor step-down, step-up, or inverting pre-conversion followed by a switched inductive step-up type post-regulator, and is herein incorporated by reference. Collectively these CLXU type regulating converters include the following:

CLDU—switched capacitor-inductor up-down converter

CLUU—switched capacitor-inductor up-up converter

CLIU—switched capacitor-inductor inverting-up converter (inverter)

CLII—switched capacitor-inductor inverting-inverting converter

The above-referenced application Ser. No. 11/890,818 and application Ser. No. 11/890,956, titled "High-Efficiency DC/DC Voltage Converter Including Up Inductive Switching Pre-Regulator And Capacitive Switching Post-Converter," filed contemporaneously herewith and incorporated herein by reference, describe other switched inductor-capacitor converters designated LCXX, where pre-regulation is achieved by a switched inductor method and where post-conversion is accomplished by a switched capacitor stage.

Switched Capacitor-Inductor (CLXD) Converters

Figure 8:
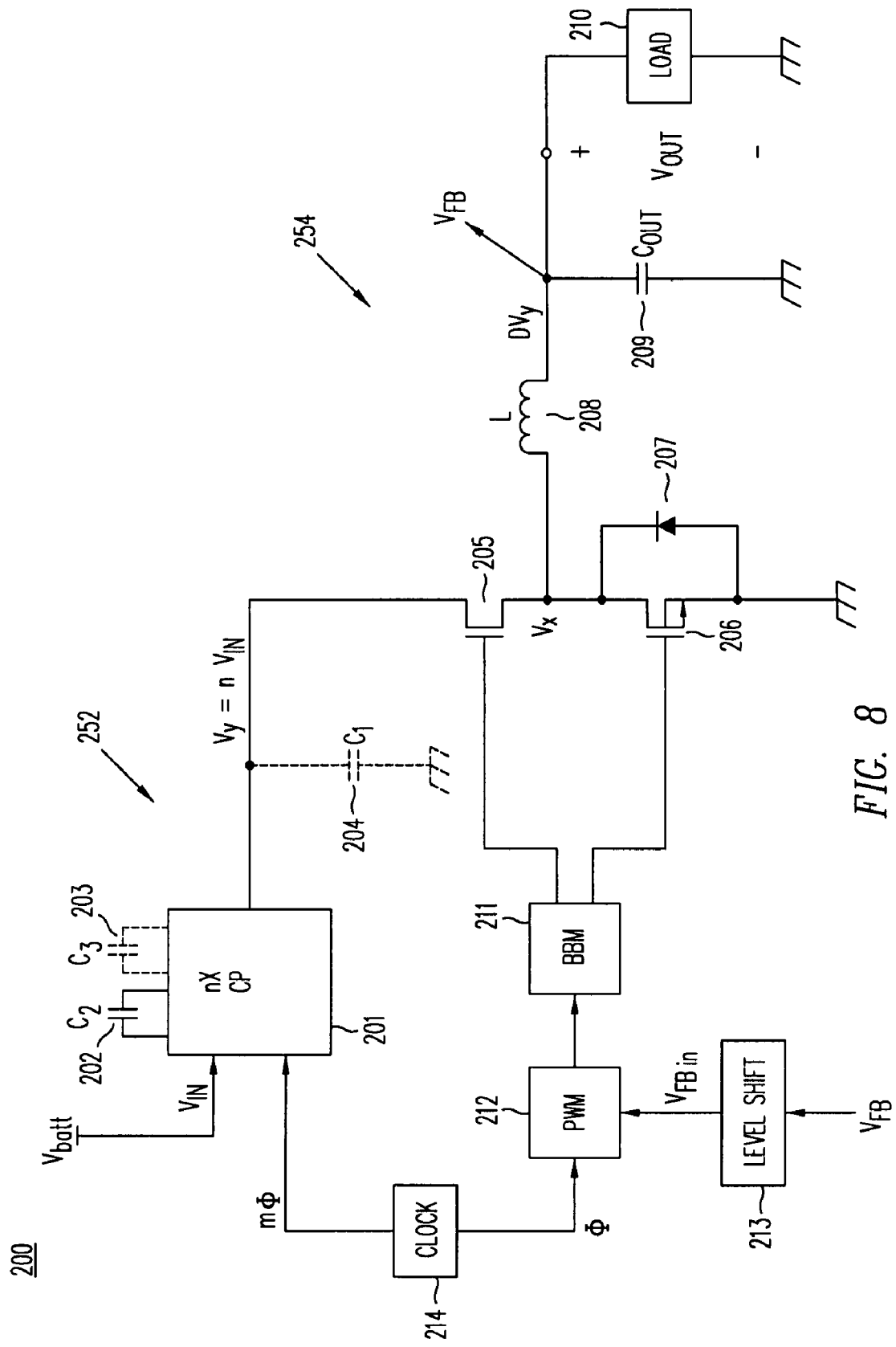
FIG. 8 is a generalized schematic circuit diagram of a switched CLXD converter according to the invention.

FIG. 8 illustrates a switched CLXD regulating converter 200 comprising a switched-capacitor pre-converter 252 with a conversion ratio n supplying a voltage $V_y$ to a post-regulator 254 comprising a step-down-type switched inductor voltage converter, where the output voltage is further used as feedback to control the operating condition and output of the post-regulator. The output voltage $V_y$ of pre-converter 252 thereby follows the input at an nX multiple for optimum efficiency while the post-regulator dynamically adjusts the output voltage to produce a well-regulated output at a desired voltage $V_{out}$.

In converter 200, a charge pump 201 in pre-converter 252 scales the input voltage $V_{batt}$ by a factor "n" to produce intermediate voltage $V_y$. Charge-pump 201, including a capacitor 202 and optionally a capacitor 203 or more, comprises a switched-capacitor network producing a variety of multipliers, including doubling, inverting, fractional, or fractional-inverting. The intermediate node biased at the voltage $V_y$, the input to the step-down switched inductor post-regulator 254, may also include a filter capacitor 204 and optionally a diode with a grounded anode (not shown).

Within converter 200, switched-inductor post-regulator 254 comprises a PWM controller 212, a break-before-make (BBM) gate buffer 211, a high-side power MOSFET 205, a low-side synchronous rectifier N-channel power MOSFET 206 with an intrinsic PN diode 207, and an inductor 208. High-side MOSFET 205 may be either an N- or a P-channel MOSFET with appropriate adjustments in gate drive voltage waveforms coming from BBM buffer 211. Filter capacitor 209 is connected across the output terminal of converter 200 to insure stability, reduce ripple, and improve transient response. In this embodiment of the invention, the step-up switched-inductor post-regulator 254 is topologically configured as a synchronous Buck converter, although any step-down switched inductor DC/DC converter may be used. For example, MOSFET 206 may be eliminated and diode 207 may be replaced by a Schottky rectifier to implement a conventional Buck converter in lieu of the synchronous Buck converter shown, or a coupled or tapped inductor may be used to implement a flyback or forward converter.

PWM controller 212 controls the on-time of high-side MOSFET 205 by varying a duty factor D in response to feedback voltage $V_{FBin}$ at the input terminal of PWM controller 212, operating at a fixed frequency $\phi$ as determined by a ramp generator clock 214. Alternatively, PWM controller 212 may operate at a variable frequency to produce either a fixed or variable on-time for high-side MOSFET 205.

Whenever high-side MOSFET 205 is on, current flows from the output terminal of pre-converter 252 through inductor 208. Inductor 208 is thereby magnetized, storing energy in the amount equal to ½LI² and resisting any rapid changes in current. At the switching frequency $\phi$, the current in inductor 208 cannot react to the rapid switching of MOSFET 205, so that inductor 208 behaves as a nearly lossless current source, whose average current changes slowly, over many clock cycles in response to the pulse widths, as modulated by PWM controller 212.

Whenever high-side MOSFET 205 is not conducting, inductor 208 drives the voltage $V_x$ below ground, forward biasing diode 207 and allowing current in inductor 208 to flow uninterruptedly, i.e. to recirculate. With MOSFETs 205 and 206 off, the power dissipated in diode 207 is $I_L \cdot V_f$, where $V_f$ is the forward voltage across P-N junction diode 207. Low-side rectifier MOSFET 206 conducts all or some portion of the time when high-side MOSFET 205 is off, shunting diode 207 and redirecting the recirculation current through the channel of low-side MOSFET 206. Since MOSFET 206 only conducts when rectifier diode 207 is conducting, it operates as a "synchronous" rectifier, even if MOSFET 205 conducts occurs only during a portion of the time when diode 207 conducts. During conduction, the voltage drop across the synchronous rectifier MOSFET 206 is given by $I_L \cdot R_{DS}(on)$ and its instantaneous power dissipation is $I_L^2 \cdot R_{DS}(on)$.

Break-before make buffer 211 insures that low-side N-channel power MOSFET 206 and high-side power MOSFET 205 never conduct simultaneously to prevent shoot-through conduction, shorting out the load. Shoot-through conduction, the crow barring of the input voltage from overlapping conduction, is an undesirable condition leading to wasted power, loss in efficiency, and potentially resulting in MOSFET device damage. While BBM intervals must be sufficiently long to prevent shoot-through, excessively long BBM intervals are, however, also undesirable since they force diode 207 to carry current for longer times and to dissipate more power.

Except for the BBM period, synchronous rectifier MOSFET 206 ideally should be turned on and conducting whenever high-side MOSFET 205 is off. In some circumstances, however, it may be advantageous to turn off the synchronous rectifier MOSFET 206 prematurely or not to turn it on at all. For example, at very low output currents, unwanted oscillations and reverse current flow may occur if MOSFET 206 is left on for an extended duration. Shutting MOSFET 206 off disables channel conduction, and diode 207, under a reverse bias condition, prevents reverse current conduction, improving the light load efficiency of converter 200.

Alternatively, as described in application Ser. No. 11/890, 947, titled "Low-Noise DC/DC Converter With Controlled Diode Conduction," filed contemporaneously herewith and incorporated herein by reference, synchronous rectifier MOSFET 206 may remain on, but controlled in a manner to limit the magnitude of its drain current when it is not being operated as a fully-on device. Alternating MOSFET 206 between a resistive switch state and a low-current constant-current mode reduces the electrical noise in converter 200.

Examining converter 200 in greater detail, charge pump 201 converts the input voltage $V_{batt}$ to an intermediate node voltage $V_y = n \cdot V_{in}$ using a switched capacitor network with flying capacitor 202 and optionally a second flying capacitor 203. The conversion ratio nX of charge pump 201 may be step-up, step down, or inverting.

In the event that pre-converter 252 is a step-up converter, e.g., a doubler or dual-capacitor fractional version where n=2 or n=1.5, DC-DC converter 200 operates as a CLUD up-down converter, which may step-up or step-down the input voltage. In this configuration, converter 200 can also regulate at unity voltage conversion ratios, i.e. where $V_{out} \approx V_{in}$.

Step-down conversion in pre-converter 252, using a fractional charge pump 201 where, for example, n=0.5, results in a CLDD converter. CLDD converters can achieve high step-down conversion ratios while maintaining a duty factor much closer to 50% than simple inductive boost converters.

Inverting pre-conversion may utilize a single capacitor circuit where n=−1 or utilize two capacitors when n=−0.5 to produce a negative voltage. Connecting the output of an inverting pre-converter to the input of a post-regulator comprising a non-inverting inductive Buck converter, results in an output voltage that is smaller, i.e. less negative, than the intermediate voltage Vy. Accordingly, such an inverter is referred to as a CLID converter since the "D" refers to "down" meaning smaller in absolute magnitude, not more negative. A CLID converter can only deliver a negative, i.e. below ground, output voltage. With a step-down post-regulator, a CLID converter cannot produce a positive voltage.

Referring again to FIG. 8, the output of converter 200, filtered by reservoir capacitor 209, supplies a load 210 with a regulated voltage $V_{out}$. In a preferred embodiment, the output voltage $V_{out}$ is used to provide a feedback voltage $V_{FB}$ to PWM controller 212, which is converted by level-shifter 213 to the voltage $V_{FBin}$, the control signal delivered to PWM circuit 212. As shown below, the value of $V_y$ output by the pre-converter 252 is self biasing and allows charge pump 201 to operate at its maximum efficiency point. The negative feedback loop facilitates tight voltage regulation in post converter 254 without significantly affecting the overall efficiency of CLXD converter 200.

In a preferred embodiment, the output voltage of level-shifter 213 is $V_{out}$, i.e. the feedback should force the value of $V_{out}$ to the target value of $V_{out}$. In the case of CLUD and CLDD converters, level-shifter 213 may comprise a network of two resistors acting as a voltage divider to match the feedback to the converter's internal voltage reference but need not account for the factor n from the pre-converter. In inverting converters, the feedback must be inverted, i.e. referenced to the converter's ground pin.

Another feature of CLXD converter 200 is the use of oscillator 214 to control the switching of MOSFETs 205 and 206 in post-regulator 254 as well as the MOSFETs (not shown) in pre-converter 252. By synchronizing post-regulator 254 and pre-converter 252 in this way, the size of intermediate filter capacitor 204 can be greatly reduced or, in some cases, eliminated altogether.

Behavioral Model of CLXD Converters

Figure 9:
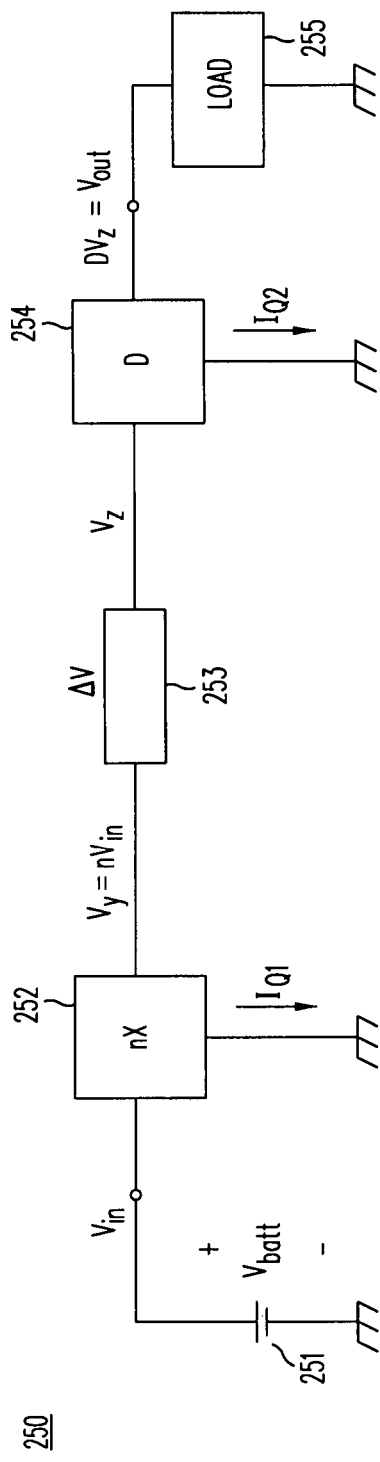
FIG. 9 is a circuit diagram of a behavioral model of the switched CLXD converter.

To better understand the operation of CLXD converter 200, behavioral model 250 of FIG. 9 can be used for control analysis and for estimating efficiency. As shown, charge pump pre-converter 252 is powered from input voltage $V_{in}$ producing an intermediate voltage $V_y$, which in turn powers switched inductor step down post-regulator 254.

The conversion ratio of pre-converter 252 is given by $$V_y = n \cdot V_{in}$$

or expressed as a voltage conversion ratio $V_y/V_{in}$ for pre-converter 252, the ratio equals $$\frac{V_y}{V_{in}} = n$$

Theoretically, since charge pumps are not voltage converters, the output voltage $V_y$ of pre-converter 252, can be adversely "loaded" by whatever it is driving. Loading means its output is forced to another voltage $V_z$ dissimilar from $V_y$, by an amount $\Delta V$, represented by lossy element 253. Because voltage $V_y$ is not normally supplying current to any load except post-regulator 254, post-regulator 254 cannot force its input $V_z$ to be substantially different than $V_y$, so that $\Delta V \approx 0$ and $V_y \approx V_z$.

Figure 2A:
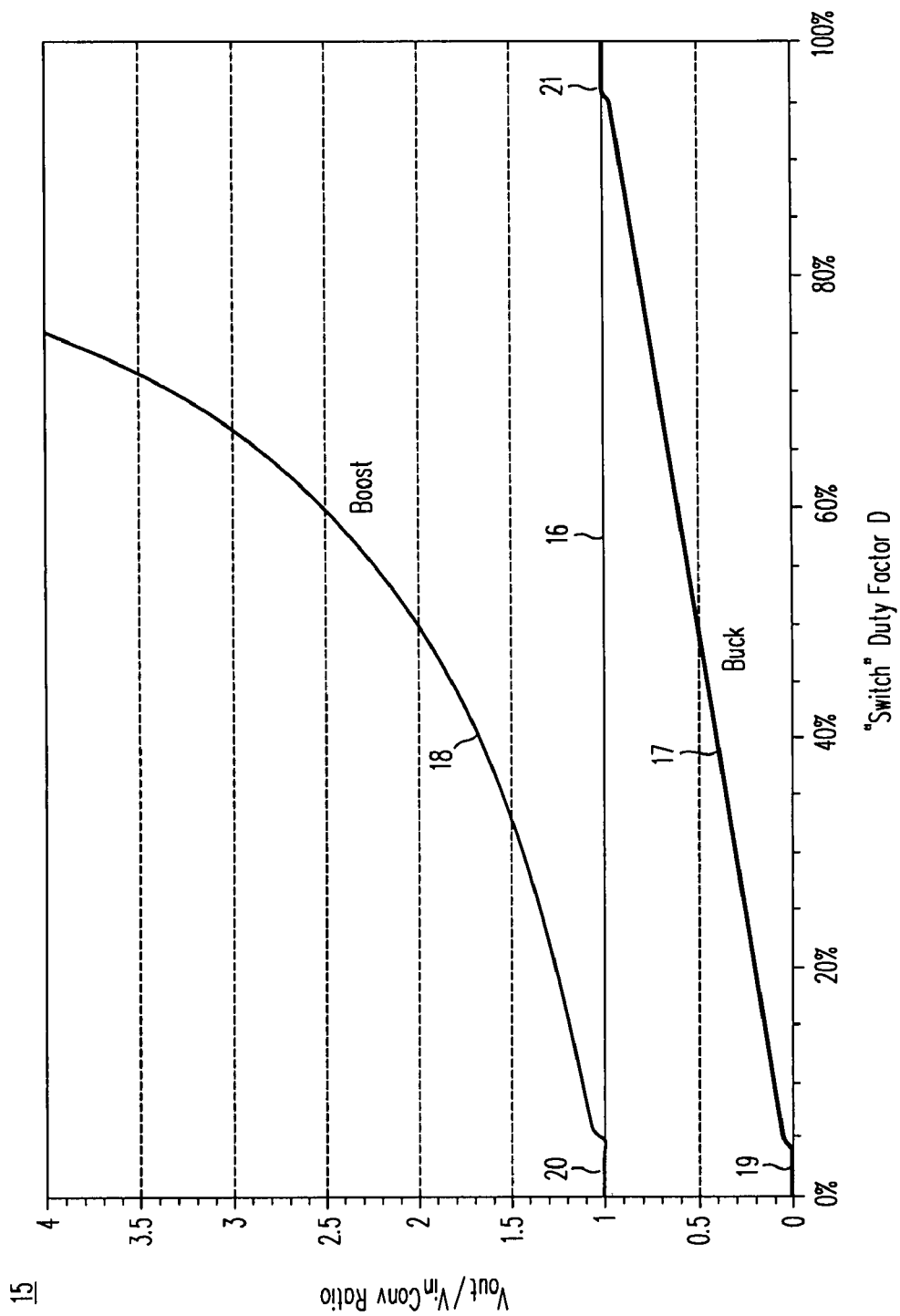
FIG. 2A is a graph of voltage conversion ratio versus duty factor for conventional Buck and boost converters.
Figure 3C:
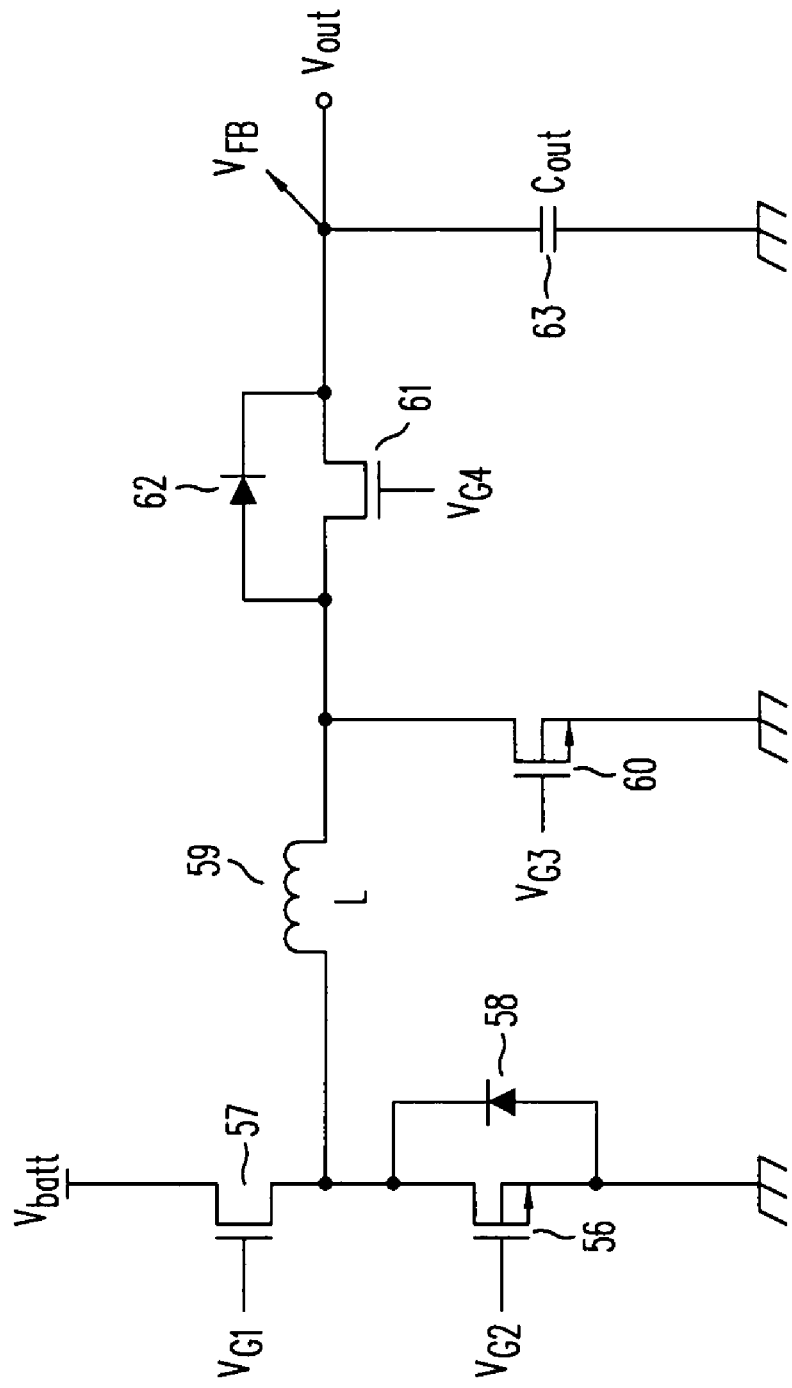
FIG. 3C is a circuit diagram of a Buck boost converter.
Figure 3D:
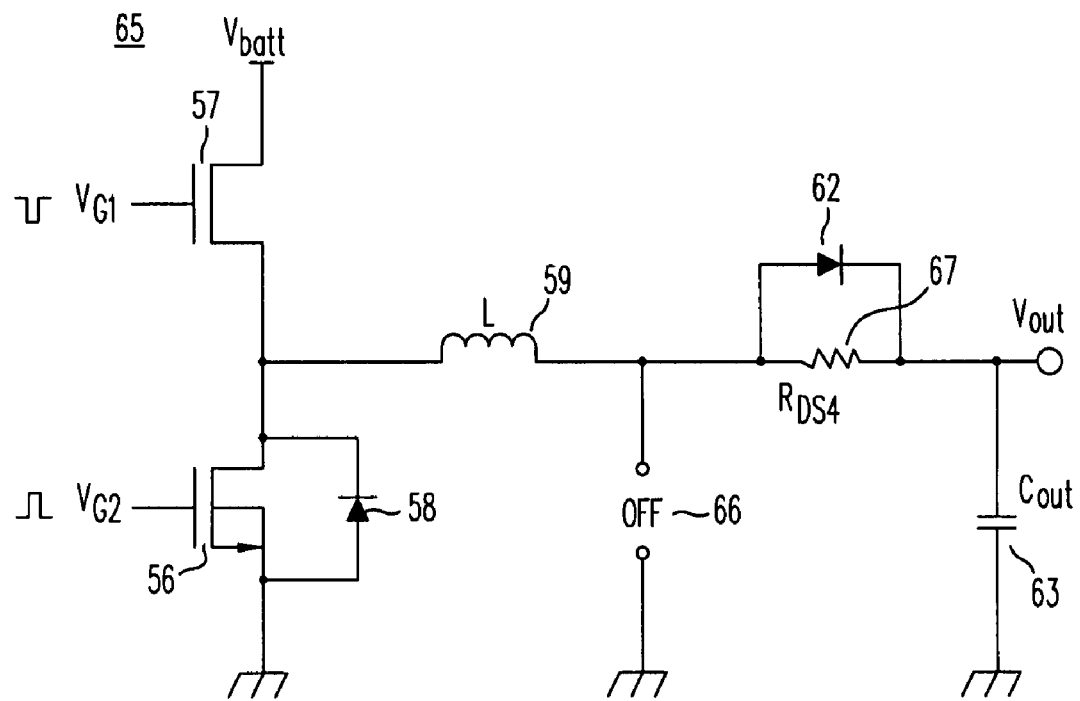
FIG. 3D is an equivalent circuit diagram of a Buck-boost converter in Buck-only mode.
Figure 3E:
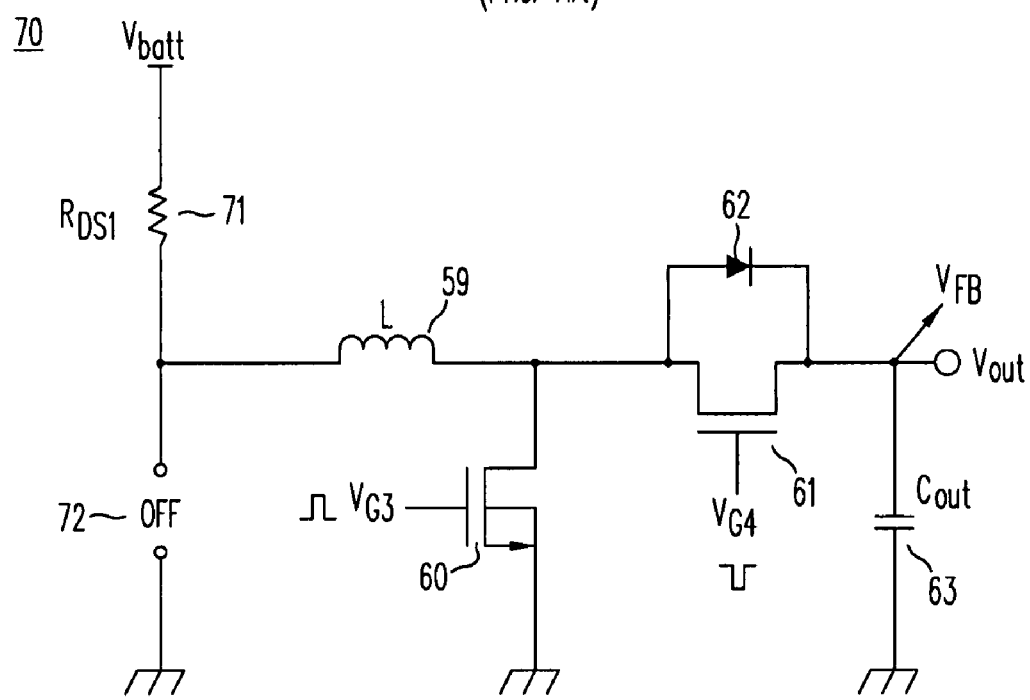
FIG. 3E is an equivalent circuit diagram of a Buck-boost converter in boost-only mode.
Figure 4:
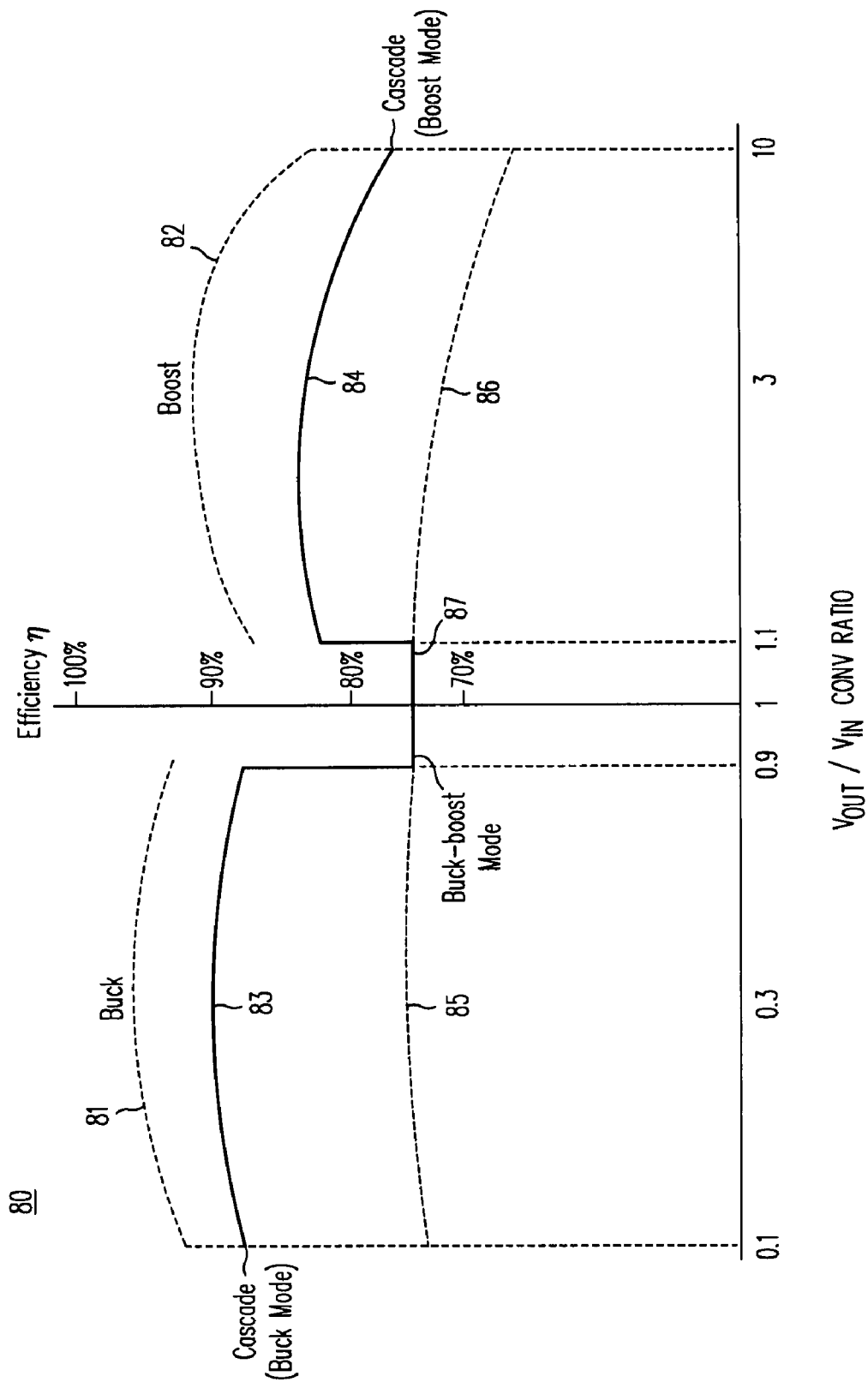
FIG. 4 is a graph of efficiency versus the voltage conversion ratio for a Buck converter, a boost converter, and Buck-boost converter.
Figure 5A:
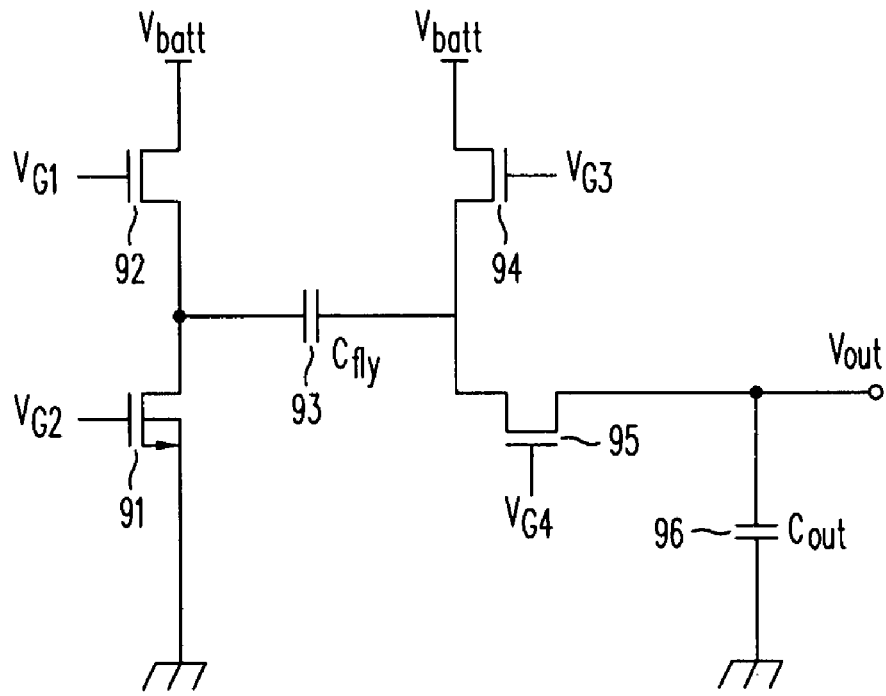
FIG. 5A is a circuit diagram of a 2X doubler circuit.
Figure 5B:
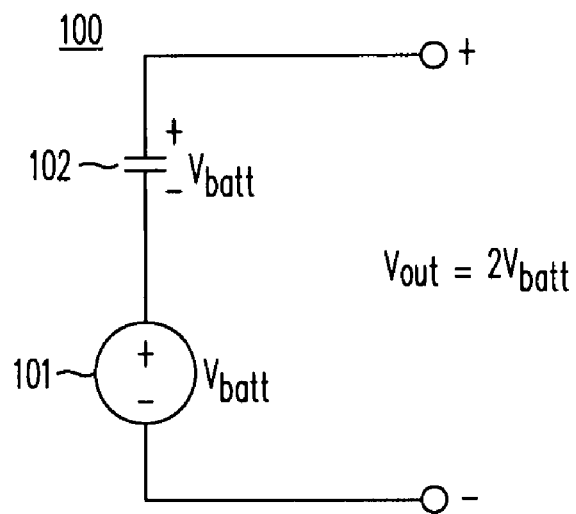
FIG. 5B is an equivalent circuit diagram of the doubler circuit during discharge.
Figure 5E:
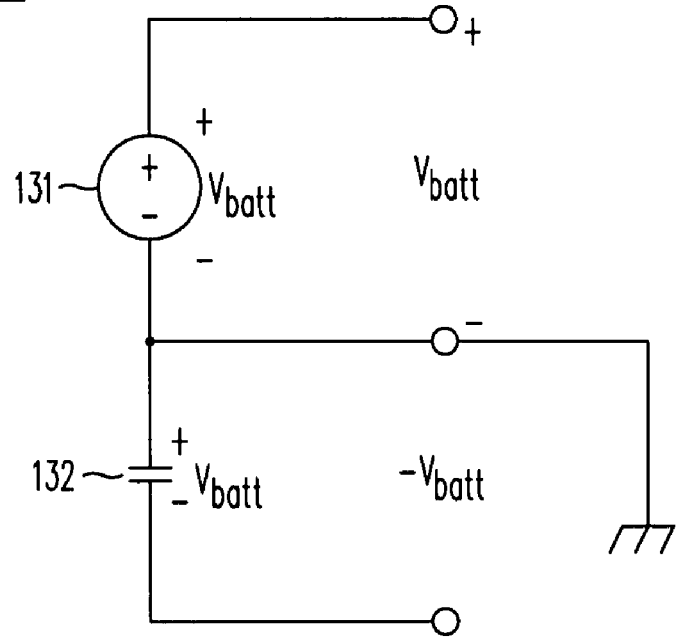
FIG. 5E is an equivalent circuit diagram of a −X inverter circuit during discharge.
Figure 5F:
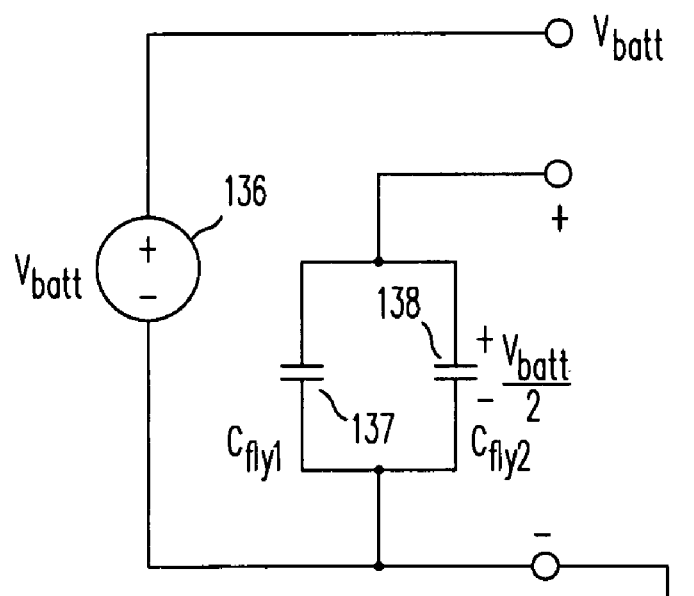
FIG. 5F is an equivalent circuit diagram of a 0.5X circuit during discharge.
Figure 6A:
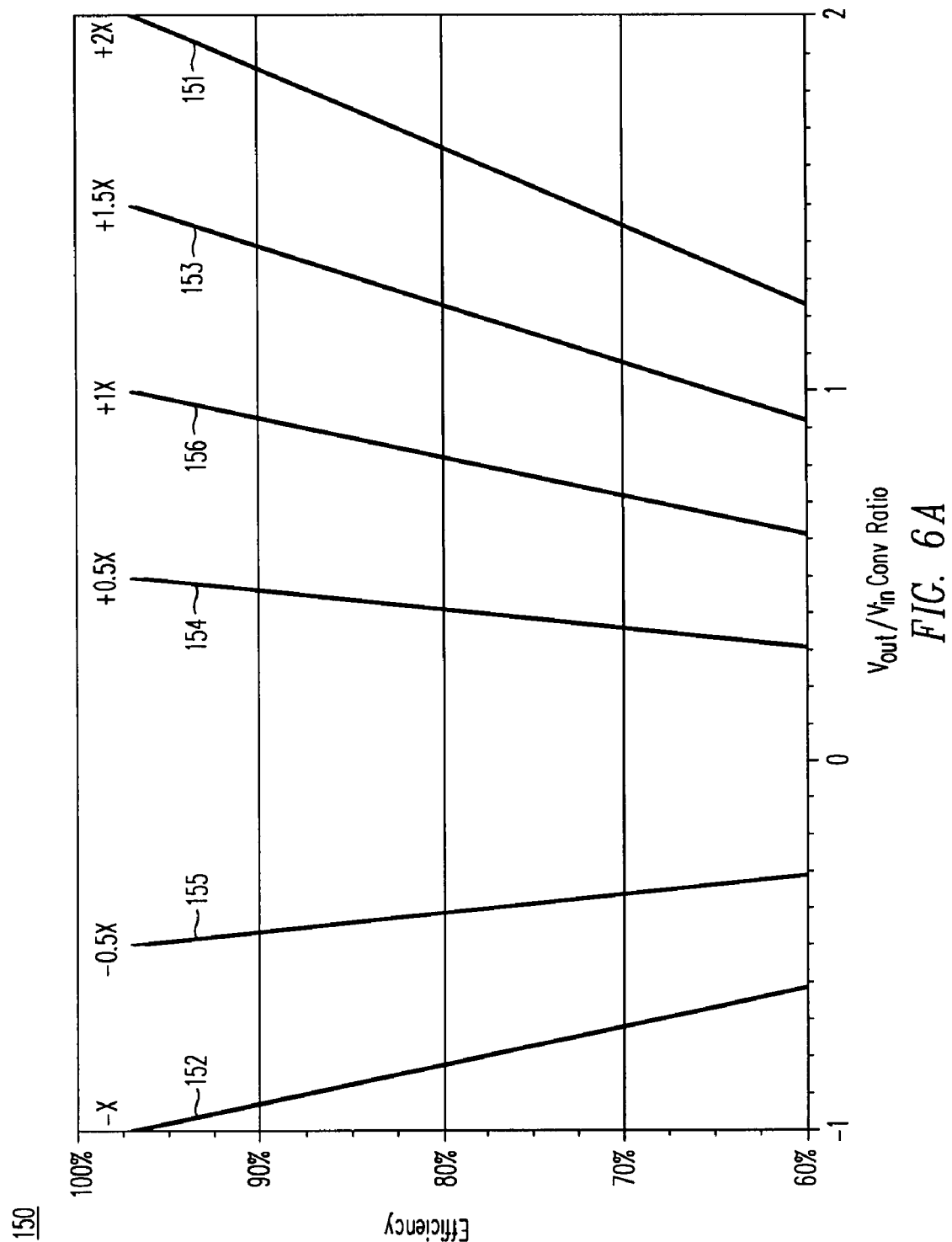
FIG. 6A is a graph of efficiency versus voltage conversion ratio for single-mode charge pumps.
Figure 6B:
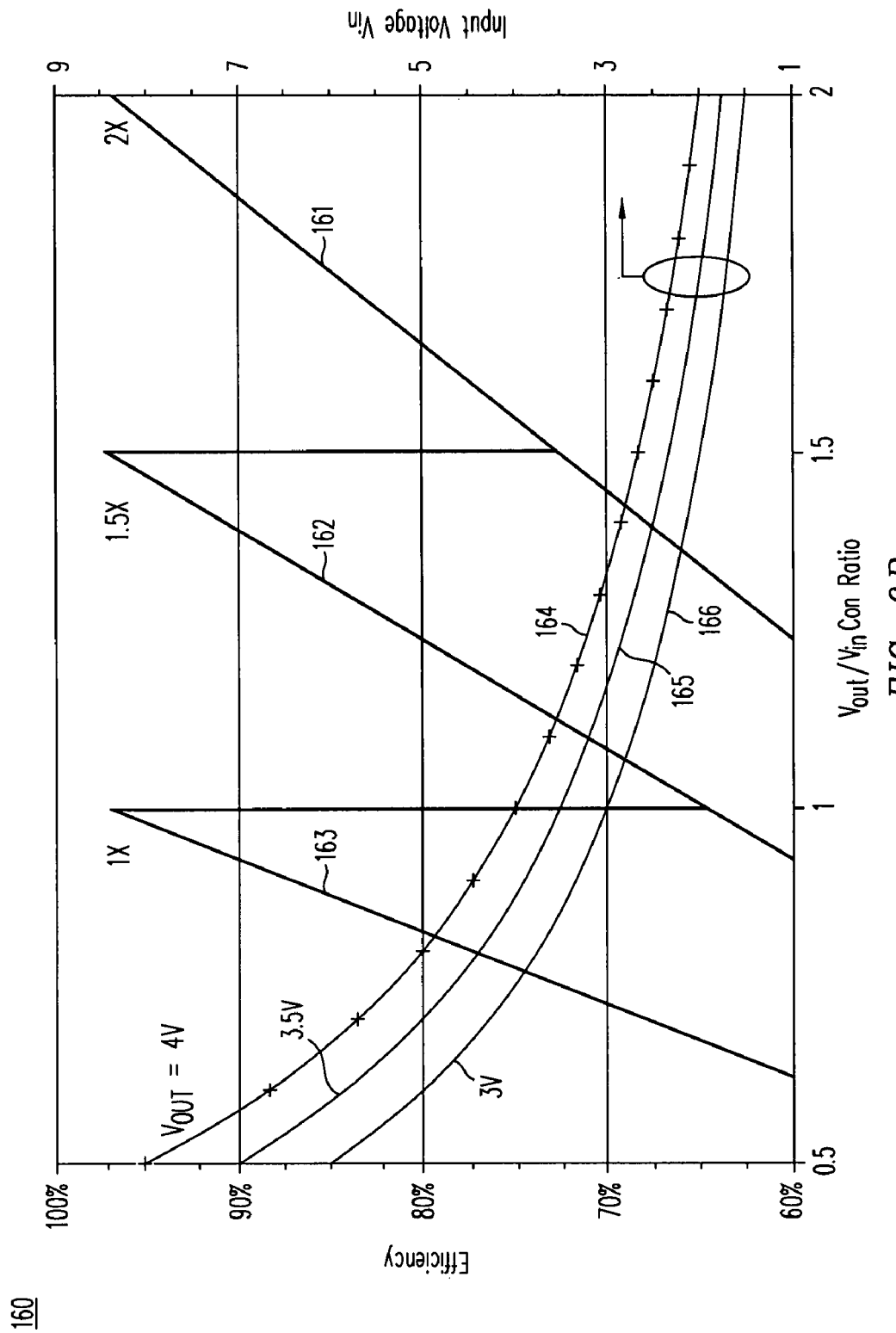
FIG. 6B is a graph of efficiency versus voltage conversion ratio for a tri-mode charge pump.

In the CLXD topology, post-regulator 254 operates as a step-down or Buck converter, given by the relation $$V_{out} = D \cdot V_z \approx D \cdot V_y$$

where D is the duty cycle of the high-side MOSFET 205, ranging between 0% and 100% and with an output similar to curve 18 of FIG. 2A.

Combining the two equations gives us the important relationship $$V_{out} \approx D \cdot V_y = n \cdot D \cdot V_{batt}$$

The voltage conversion ratio of the CLXU is therefore given by $$\frac{V_{out}}{V_{in}} = n \cdot D$$

From this relation, we can make the important observation for the CLXD converter that the converter's output-to-input ratio is the multiplicative product of its pre-regulator's ratio "n" and the post-regulator's duty-factor dependent voltage factor D. In essence, to properly regulate an output voltage, the duty factor D, the conversion ratio n, or both must be varied dynamically to compensate for changes in input voltage.

While post-regulator 254 of CLXD converter 200 can only step-down its input to a lower voltage, operating in tandem with charge pump pre-converter 252, the combined converter can either step-up, step-down, or even regulate at unity voltage conversion ratios.

Specifically if n>1, the pre-converter steps up, the post converter steps down and the combination forms an up-down CLUD converter. With a single-capacitor voltage doubler charge pump this relation is then given by $$\frac{V_{out}}{V_{in}} = 2 \cdot D$$

and with a two-capacitor fractional charge pump this relation is given by $$\frac{V_{out}}{V_{in}} = 1.5 \cdot D$$

Figure 10:
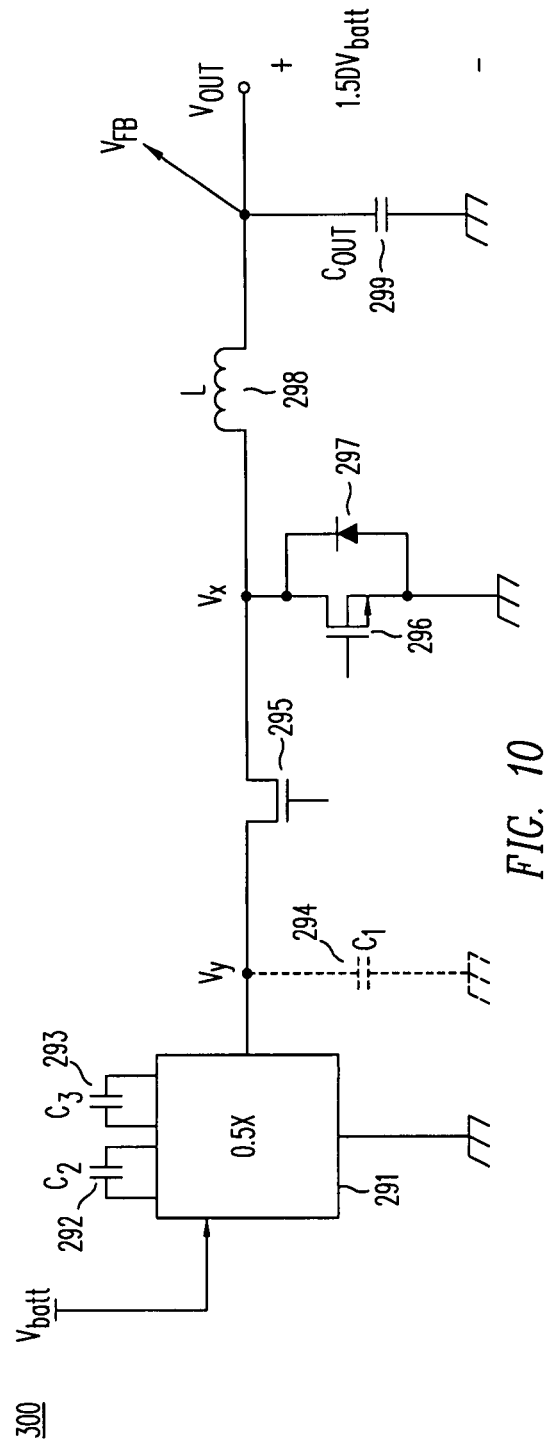
FIG. 10 is a functional circuit diagram of a CLDD converter having a 0.5X pre-converter.

Circuit diagram 300, shown in FIG. 10, represents a functional diagram of a CLXD down-down converter comprising a 0.5X step-down charge-pump pre-converter 301 followed by an switched inductor Buck converter as a post regulator.

Figure 15:
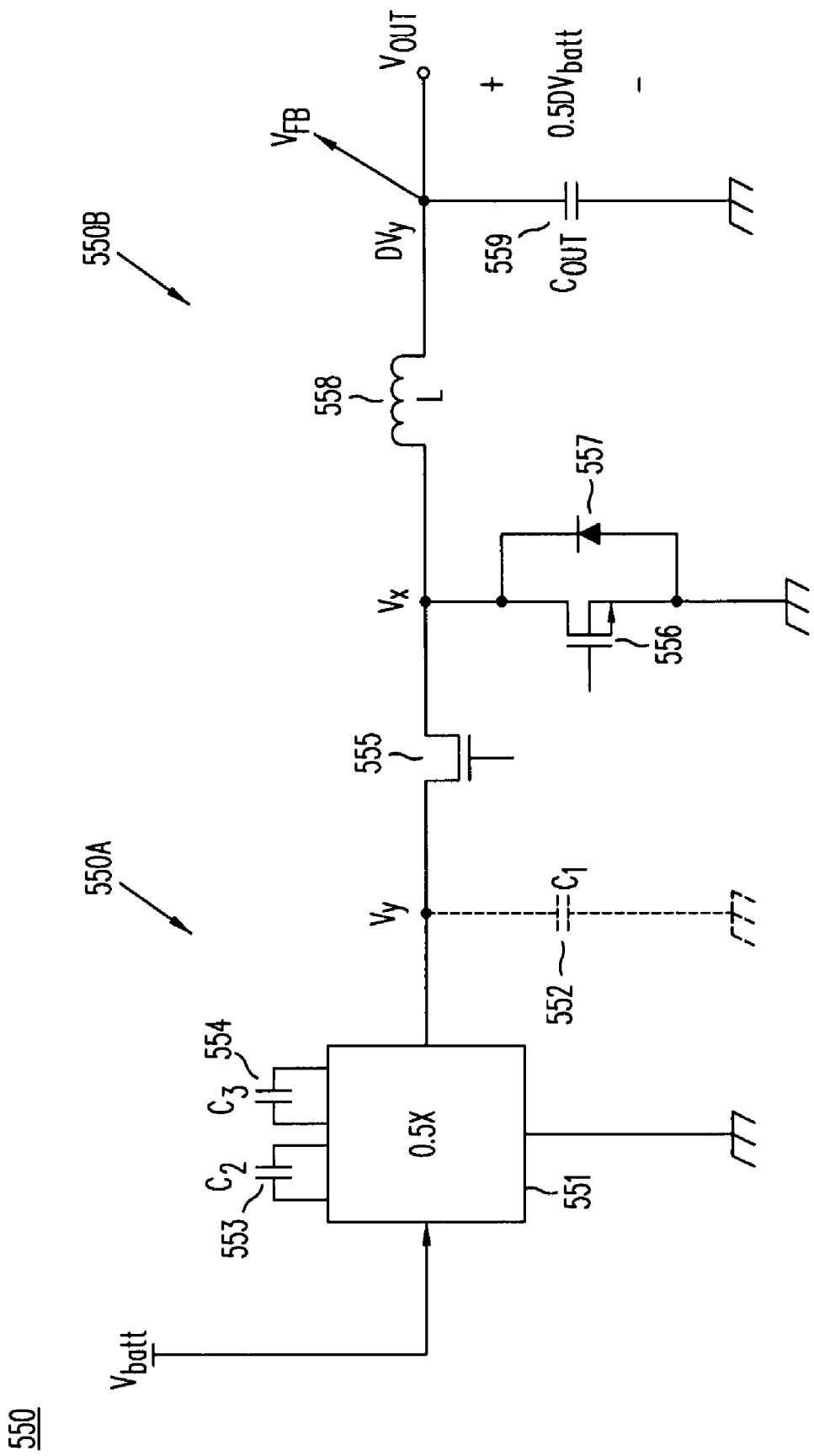
FIG. 15 is a functional circuit diagram of a CLDD converter having a 0.5X pre-converter.

If n<1, the converter operates only as step-down CLDD converter, but it can achieve high step-down conversion ratios at moderate duty factors. A functional description of a dual-flying capacitor CLDD converter is illustrated in FIG. 15. The voltage conversion ratio of the CLDD converter can be described by the relation $$\frac{V_{out}}{V_{in}} = 0.5 \cdot D$$

Figures 18A, 18B:
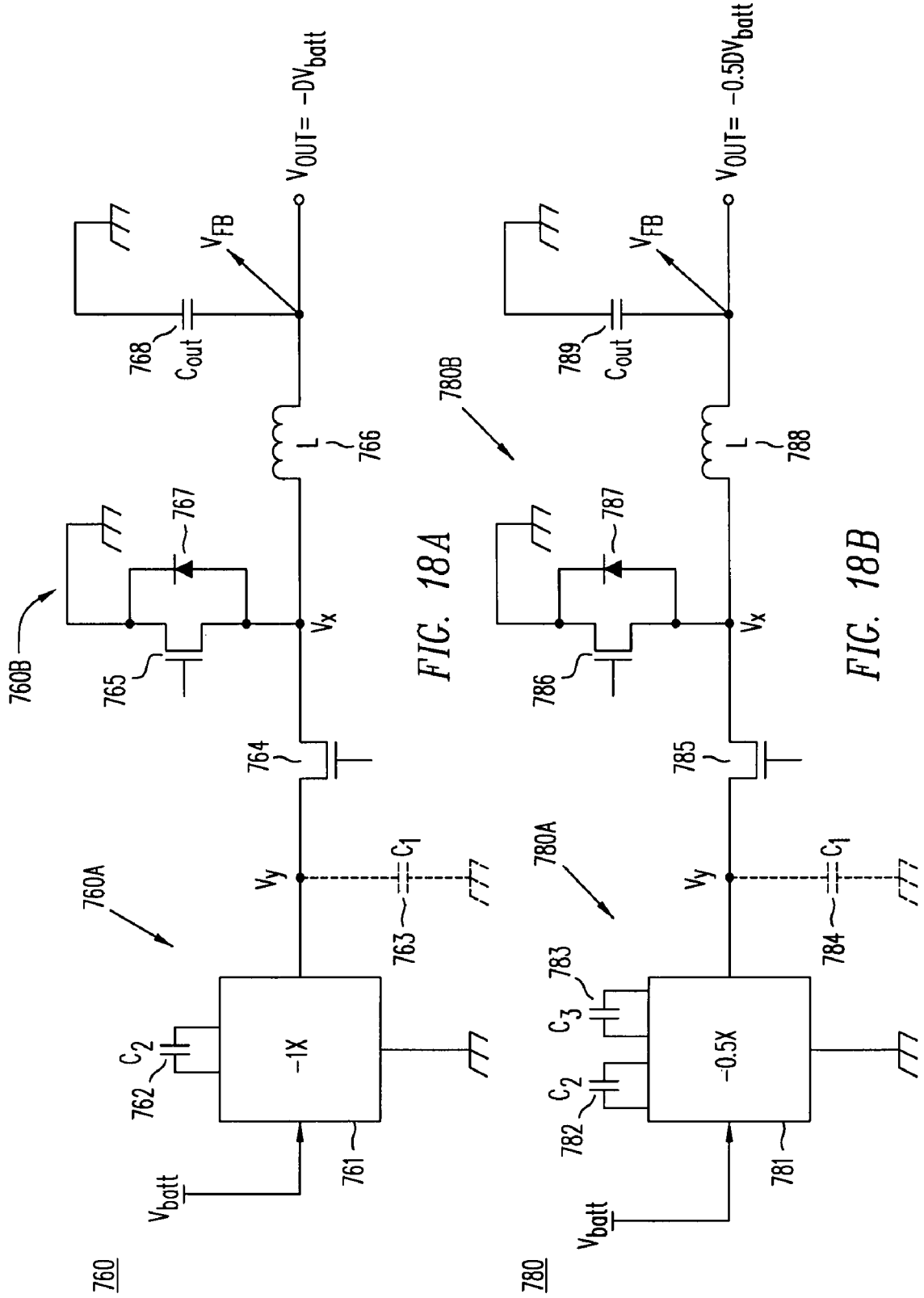
FIG. 18A is a functional circuit diagram of a CLID converter having a –1X pre-converter.
FIG. 18B is a functional circuit diagram of a CLID converter having a –0.5X pre-converter.

If n is negative and the post converter is non-inverting, the resulting CLID converter is inverting and supplies a wide range of negative voltages. Inverting CLID converters are illustrated in FIGS. 18A and 18B. For single-capacitor charge-pump implementations such CLIU inverters are described by $$\frac{V_{out}}{V_{in}} = -D$$

Using dual-capacitor fractional inverting charge-pumps, such CLID inverters are described by $$\frac{V_{out}}{V_{in}} = -0.5D$$

In such cases, the boost converter post-regulator decreases the magnitude of the voltage without changing its polarity, i.e. the term "down" refers to making a negative voltage smaller.

CLUD Up-Down Converter Operation

Figure 11A:
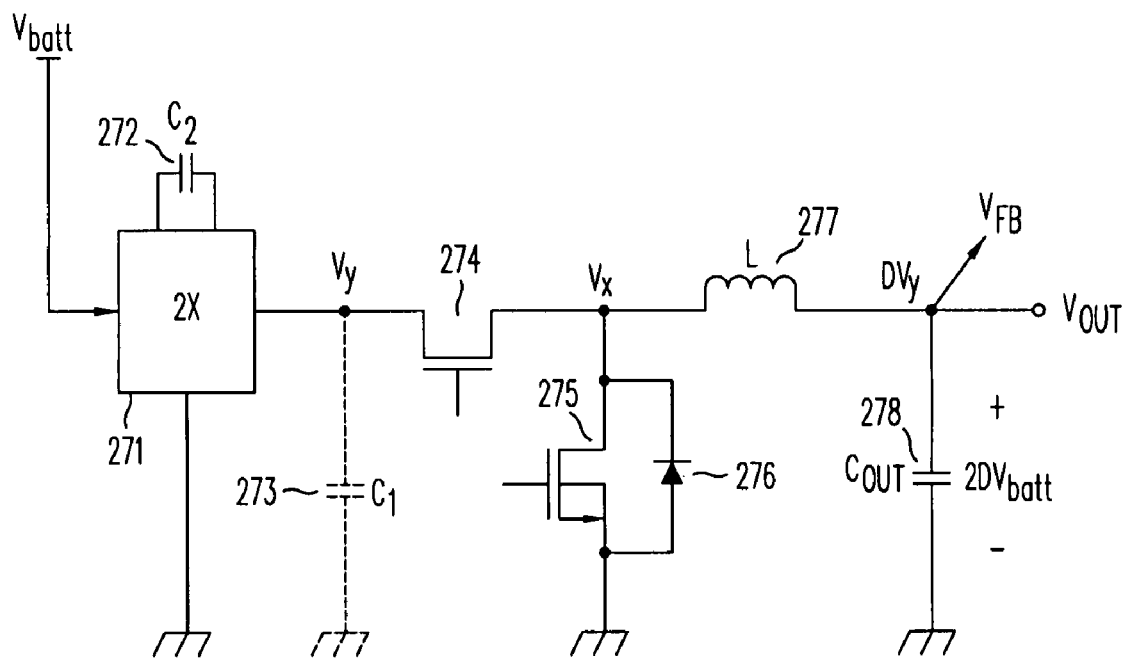
FIG. 11A is a functional circuit diagram of a CLUD converter having a 2X pre-converter.
Figure 11B:
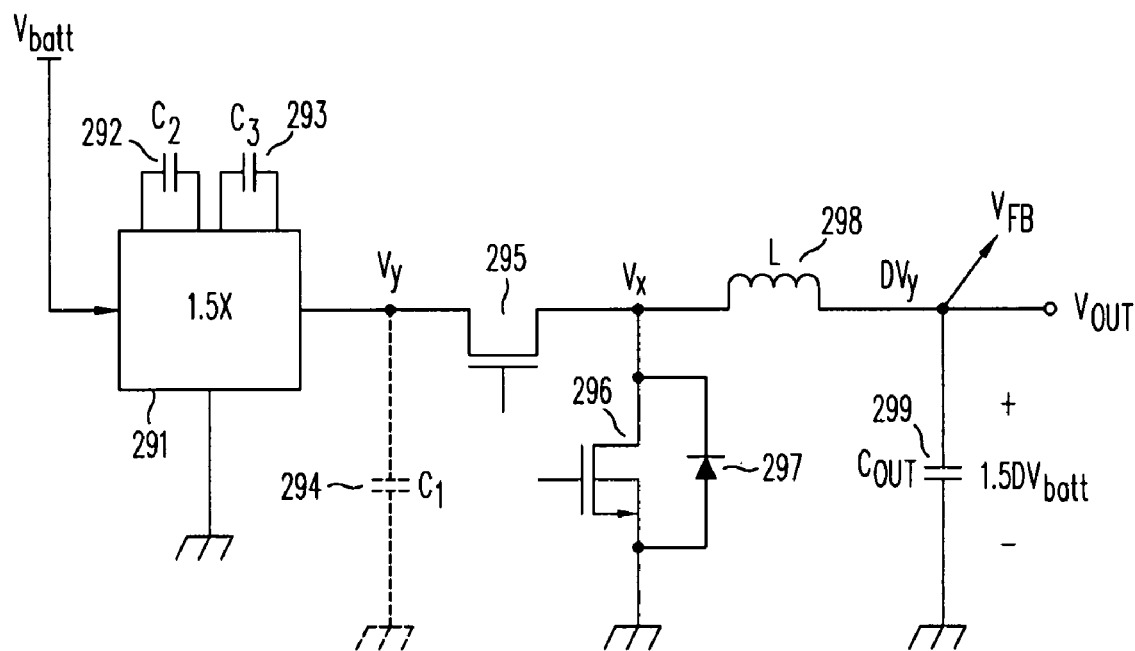
FIG. 11B is a functional circuit diagram of a CLUD converter having a 1.5X pre-converter.

FIGS. 11A and 11B are functional diagrams of two types of CLUD up-down converters. In FIG. 11A, a converter 270 comprises a 2X step-up charge-pump 271 as a pre-converter with flying a capacitor 272, along with an inductor 277, a high-side MOSFET 274, a low-side N-channel synchronous rectifier MOSFET 275 with an intrinsic P-N diode 276, an optional capacitor 273 and an output filter capacitor 278. Capacitor 273 may range in size, depending on the circuit implementation of charge pump 271, and in some cases can be eliminated.

Similarly, in FIG. 11B, a converter 290 comprises a 1.5X step-up charge-pump 291 as pre-converter with flying capacitors 292 and 293, along with an inductor 298, a high-side MOSFET 295, a low-side N-channel synchronous rectifier MOSFET 296 with an intrinsic P-N diode 297, an optional capacitor 294 and an output filter capacitor 299. Capacitor 294 may range in size depending of circuit implementation of charge pump 191 and in some cases can be eliminated.

Figure 12A:
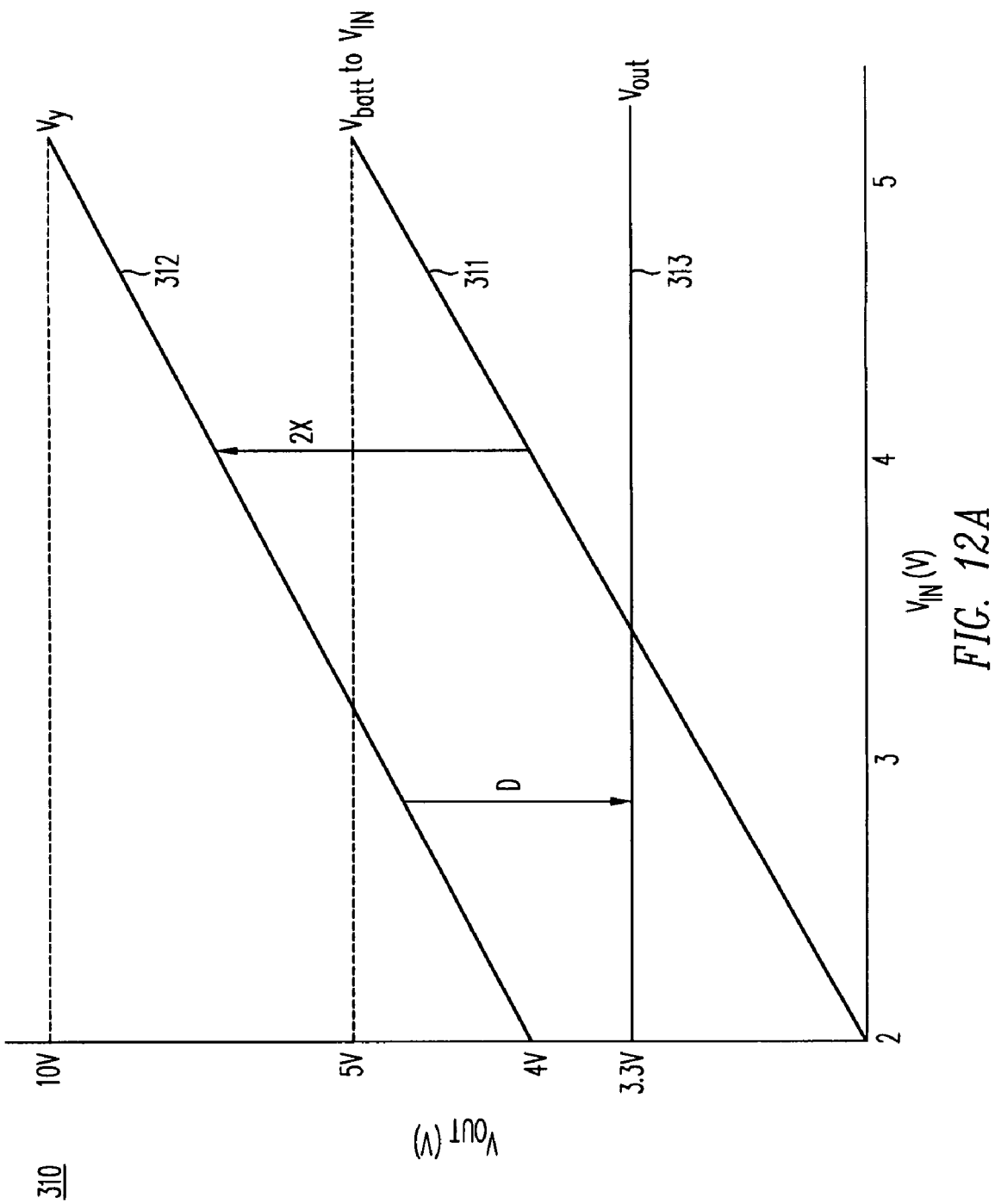
FIG. 12A is a graph of transfer characteristics of a 2X-type CLUD converter over an input voltage in the range of 2V to 5V.
Figure 12B:
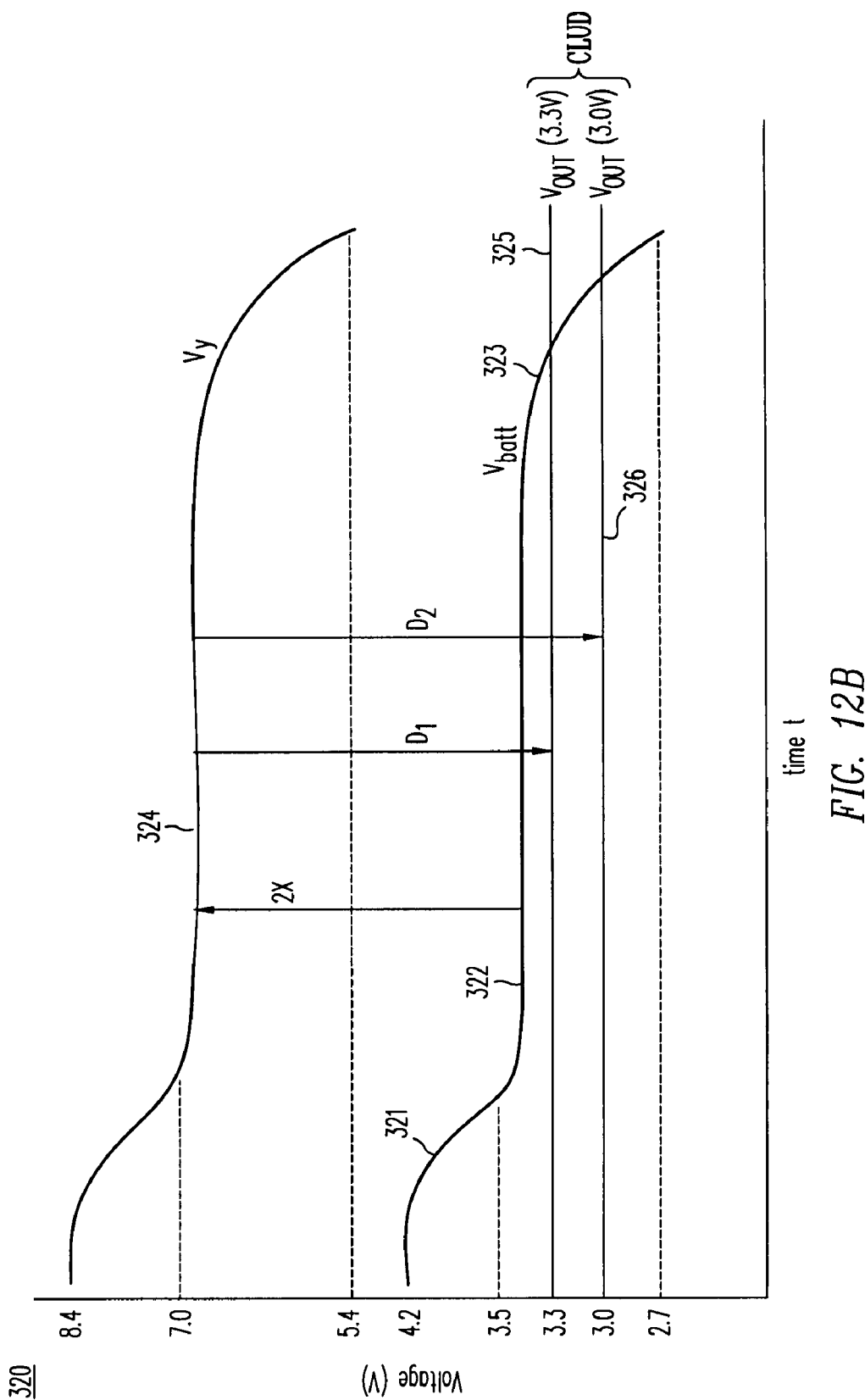
FIG. 12B is a graph of the transfer characteristics of a 2X-type CLUD converter supplied by a 1-cell LiIon battery as a function of time.

FIGS. 12A-12E illustrate various electrical characteristics of a CLUD converter. Specifically, FIG. 12A illustrates the transfer characteristics 310 of a CLDU 3.3V converter over an input voltage range of 2V to 5V, including the operating range of a single-cell lithium ion battery. The notation "1s LiIon" refers to a single series-connected cell comprising lithium ion electrochemistry.

As shown, the unregulated battery or input voltage, shown by curve 311, ranging 2V to 5V, is stepped-up by the 2X capacitive pre-converter to a high intermediate voltage $V_y$, having a wider range of 4V to 10V, illustrated by curve 312. The slope of curve 312 is therefore double that of curve 311. The intermediate voltage $V_y$ (curve 312) is then stepped down by the inductive Buck post-regulator by a factor D, using a varying duty factor to produce a constant output voltage $V_{out}$ illustrated by curve 313. Feedback of the output voltage is employed to adjust the duty factor D to maintain a constant output voltage, in this case at 3.3V.

When $V_{batt}$=3.3V, the input and output voltages are equal, and the converter is regulating at a unity conversion ratio. When curve 311 is above curve 313, i.e. to the right of the cross-over point of curves 311 and 313, the converter is providing step-down conversion. When curve 311 is below curve 313, the output voltage is greater than the input voltage, and the converter is acting as a step-up converter. The converter's circuit operation remains the same throughout all conditions shown, even at the cross-over point.

The CLUD converter's operation can also be represented as a function of the time during which the 1s LiIon battery is discharging. As described in graph 320 in FIG. 11B, a fully charged 1s LiIon battery exhibits a voltage $V_{batt}$ around 4.2V at the onset of discharging, illustrated by curve segment 321, which settles to a voltage of approximately 3.5V before remaining relatively constant for an extended duration, as revealed by curve segment 322. Later, curve 323 illustrates that the battery voltage decays below 3.5V into a range between curves 325 and 326, a condition where a normal 3.3V converter would suffer dropout or mode-switching problems.

As the cell approaches full discharge in curve segment 323, its voltage drops rapidly to 2.7V, below which it must be cut off to avoid over-discharge-induced cell damage. Only specialized LiIon batteries can operate down to 2.7V without growing crystallites that short out the cell.

During the LiIon battery discharge, the output voltage $V_y$ of the 2X switched-capacitor pre-converter tracks discharge characteristic of the battery voltage, as illustrated by curve 324 at a level double the battery input voltage. The inductive Buck post-regulator steps this time-varying intermediate voltage down by a factor $D_1$. The combined effect of the two-stage conversion produces a constant CLUD output voltage $V_{out}$ having a value in this case of 3.3V, as illustrated by curve 325. Alternatively, at a different time-varying duty factor $D_2$, the intermediate voltage $V_y$ can be stepped down to a different regulated voltage, e.g., 3.0V, as shown by curve 326.

The output voltage of the CLUD converter can be any voltage less than the lowest value of $V_y$ (curve 324), namely 5.4V. Such an output voltage may be greater than, less than or within the range of the battery input voltage. For example, the output voltage 3.3V, represented by curve 325, is inside the LiIon battery's voltage range of 4.2V to 2.7V.

Regardless of the voltage of the LiIon cell, the 2X CLUD converter doubles the battery voltage, using its 2X charge-pump pre-converter, to a varying voltage $V_y$, represented by curve 324. This voltage is then reduced by a duty-factor-dependent Buck converter by a time varying factor D to produce a constant regulated output voltage shown by curves 325 and 326. The converter's condition can be described as shown below in Table 1:

TABLE 1

| Phase | Up/Down | $V_{batt}$ | nX | $V_y$ | D | $V_{out}$ | $V_{out}/V_{in}$ |
|---|---|---|---|---|---|---|---|
| 321. Full charge | Down | 4.2 V | 2X | 8.4 V | 36% | 3 V | 0.71 |
| Decay | Down | 3.6 V | 2X | 7.2 V | 42% | 3 V | 0.83 |
| 322. Plateau | Down | 3.5 V | 2X | 7.0 V | 43% | 3 V | 0.86 |
| Discharge $V_{batt} \approx V_{out}$ | Unity | 3.0 V | 2X | 6.0 V | 50% | 3 V | 1.00 |
| 323. Extend Range | Up | 2.7 V | 2X | 5.4 V | 56% | 3 V | 1.11 |

Using feedback, the duty factor self-adjusts to maintain the proper output voltage and regulation, whereby $$D = \frac{V_{out}}{V_y} = \frac{V_{out}}{n \cdot V_{batt}} = \frac{V_{out}}{2 \cdot V_{batt}}$$

In contrast to conventional Buck-boost converters, a CLUD converter does not need to change its operating mode as the battery voltage (curve 323) falls below the output voltage (curve 325), i.e. when $V_{in}=V_{out}\approx 3.3V$. The CLUD converter therefore remains stable with no dropout and degradation in the quality of regulation.

Figure 1A:
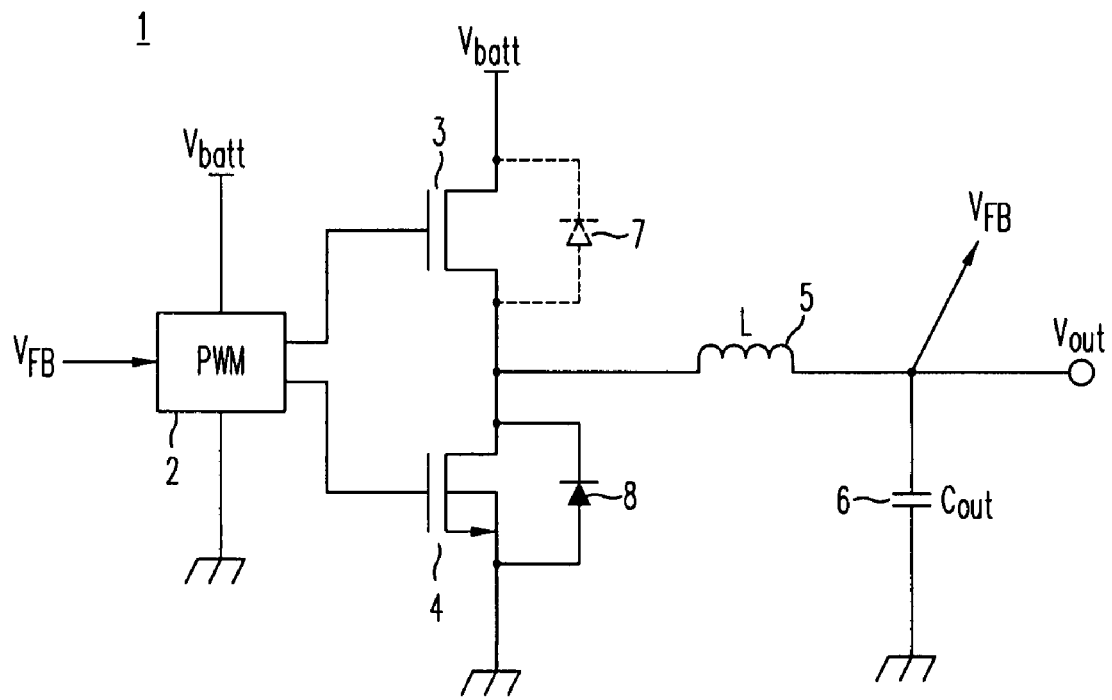
FIG. 1A shows a circuit diagram of a conventional synchronous Buck converter.
Figure 1B:
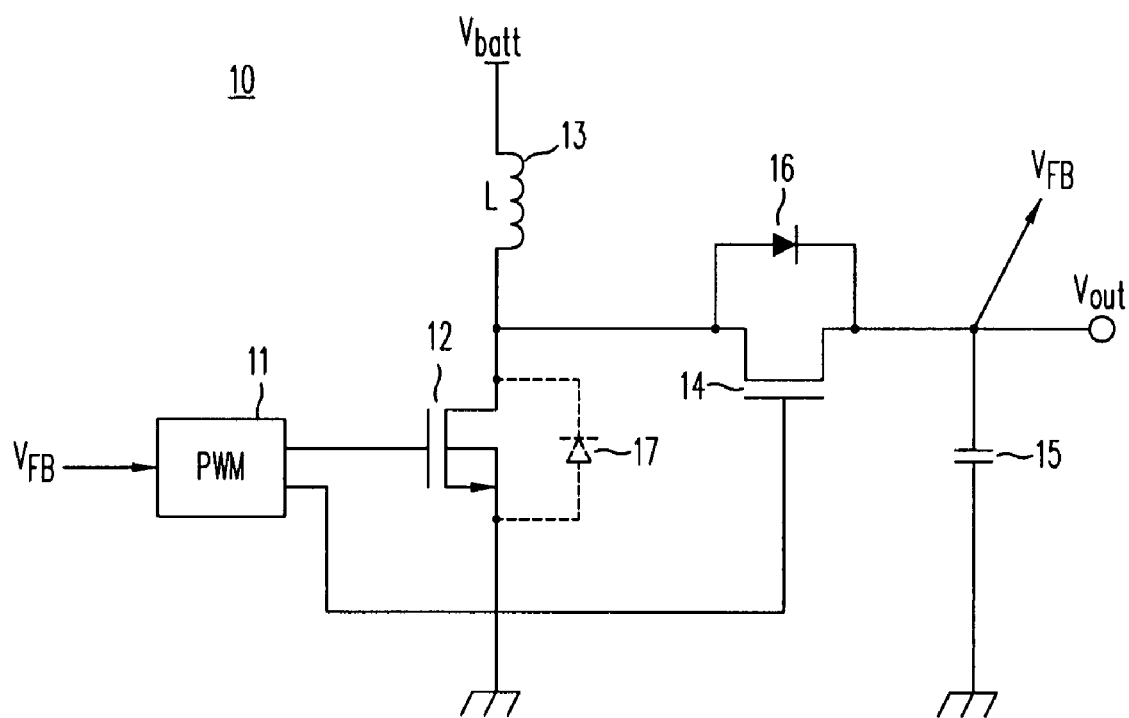
FIG. 1B shows a circuit diagram of a conventional synchronous boost converter

Using a doubler pre-converter in a LCUD converter like that of converter 270 in FIG. 1A to regulate a 1s LiIon battery, the peak voltage of intermediate voltage $V_y$ is over 8V, exceeding the maximum operating voltage of many submicron integrated circuit technologies, especially half micron CMOS. One way to limit the peak voltage is to employ a 1.5X fractional pre-converter similar to charge pump 291 in converter 290 of FIG. 1B. As shown in graph 340 of FIG. 12C, the peak output voltage of the 1.5X pre-converter is limited to 1.5 times 4.2V, or 6.3V, within the voltage capability of half-micron CMOS technology.

Figure 12C:
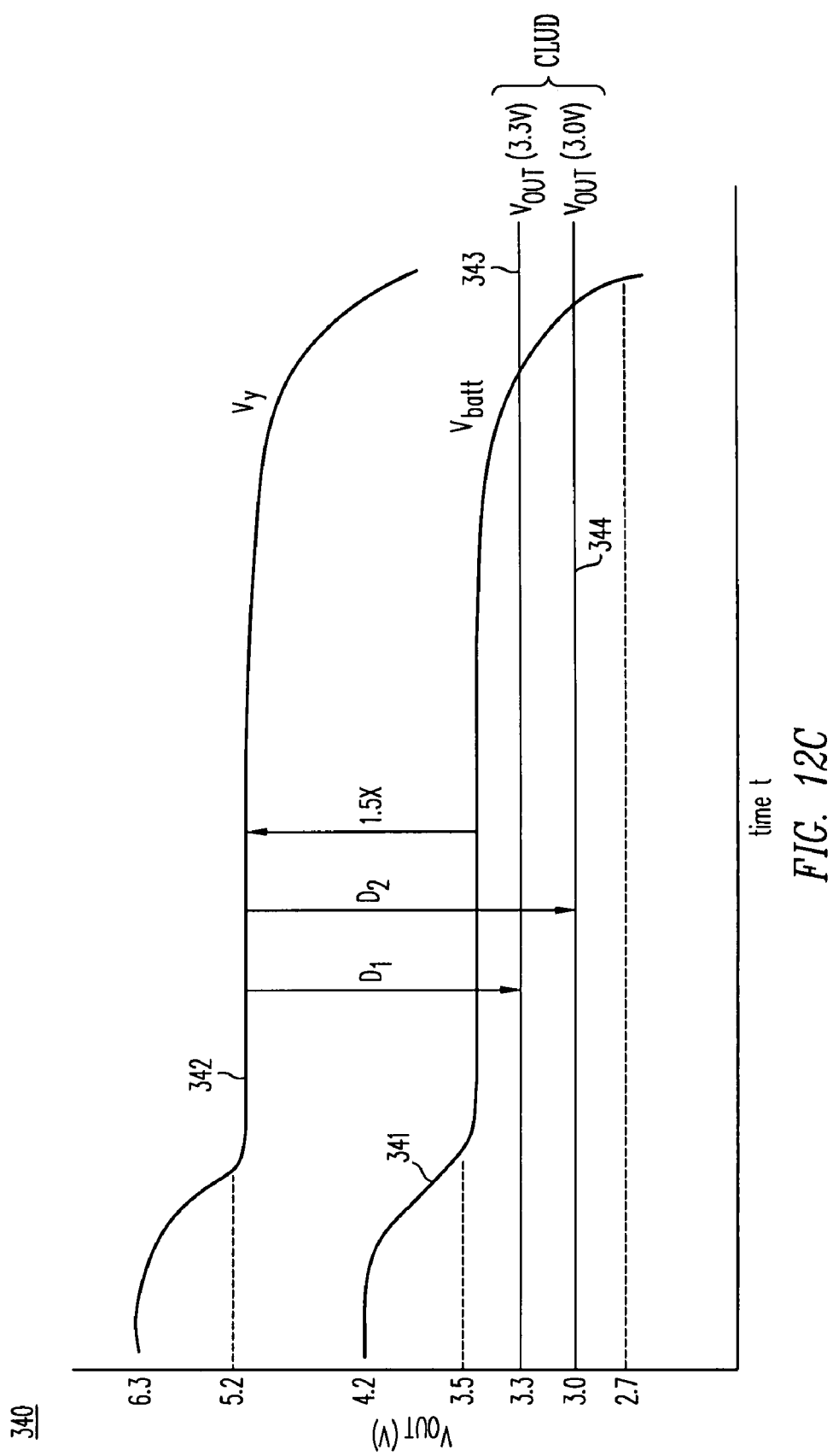
FIG. 12C is a graph of the transfer characteristics of a 1.5X-type CLUD converter supplied by a 1-cell LiIon battery as a function of time.

As shown in FIG. 12C, the 1s LiIon battery voltage (curve 341) is stepped up by 1.5X to produce a time-varying voltage $V_y$ (curve 342). This voltage is then stepped down by a factor D1 to produce a 3.3V output, shown by curve 343, or alternatively to produce a 3.0V output, shown by curve 344. One common product that uses a single cell LiIon battery and requires a 3.3V regulated supply is the cell phone. Unlike a 3V output, which requires a converter supplied by a 1s LiIon cell to operate mostly in step-down mode, a 3.3V output requires operation closer to unity conversion and exhibits an extended duration in its step-up mode, as shown in Table 2.

TABLE 2

| Phase | Up/Down | $V_{batt}$ | nX | $V_y$ | D | $V_{out}$ | $V_{out}/V_{in}$ |
|---|---|---|---|---|---|---|---|
| Full charge | Down | 4.2 V | 1.5X | 6.3 V | 52% | 3.3 V | 0.79 |
| Decay | Down | 3.6 V | 1.5X | 5.4 V | 61% | 3.3 V | 0.92 |
| Plateau | Down | 3.5 V | 1.5X | 5.25 V | 63% | 3.3 V | 0.94 |
| $V_{batt} \approx V_{out}$ | Unity | 3.3 V | 1.5X | 5.0 V | 67% | 3.3 V | 1.00 |
| Discharged | Unity | 3.0 V | 1.5X | 4.5 V | 73% | 3.3 V | 1.10 |
| Extend Range | Up | 2.7 V | 1.5X | 4.1 V | 74% | 3.3 V | 1.22 |

Despite operating within a range of approximately ±20% of its unity conversion ratio, the 2X CLUD converter exhibits duty factors in the narrow range of 36% to 56%, which enables it to utilize PWM control circuitry that is more easily implemented than converters operating at extreme duty factors, especially at high-switching frequencies. In contrast, the 1.5X CLUD converter exhibits slightly higher duty factors in the range from 52% to 74%, but limits the maximum $V_y$ voltage to 6.3V rather than 8.4V.

Figure 12D:
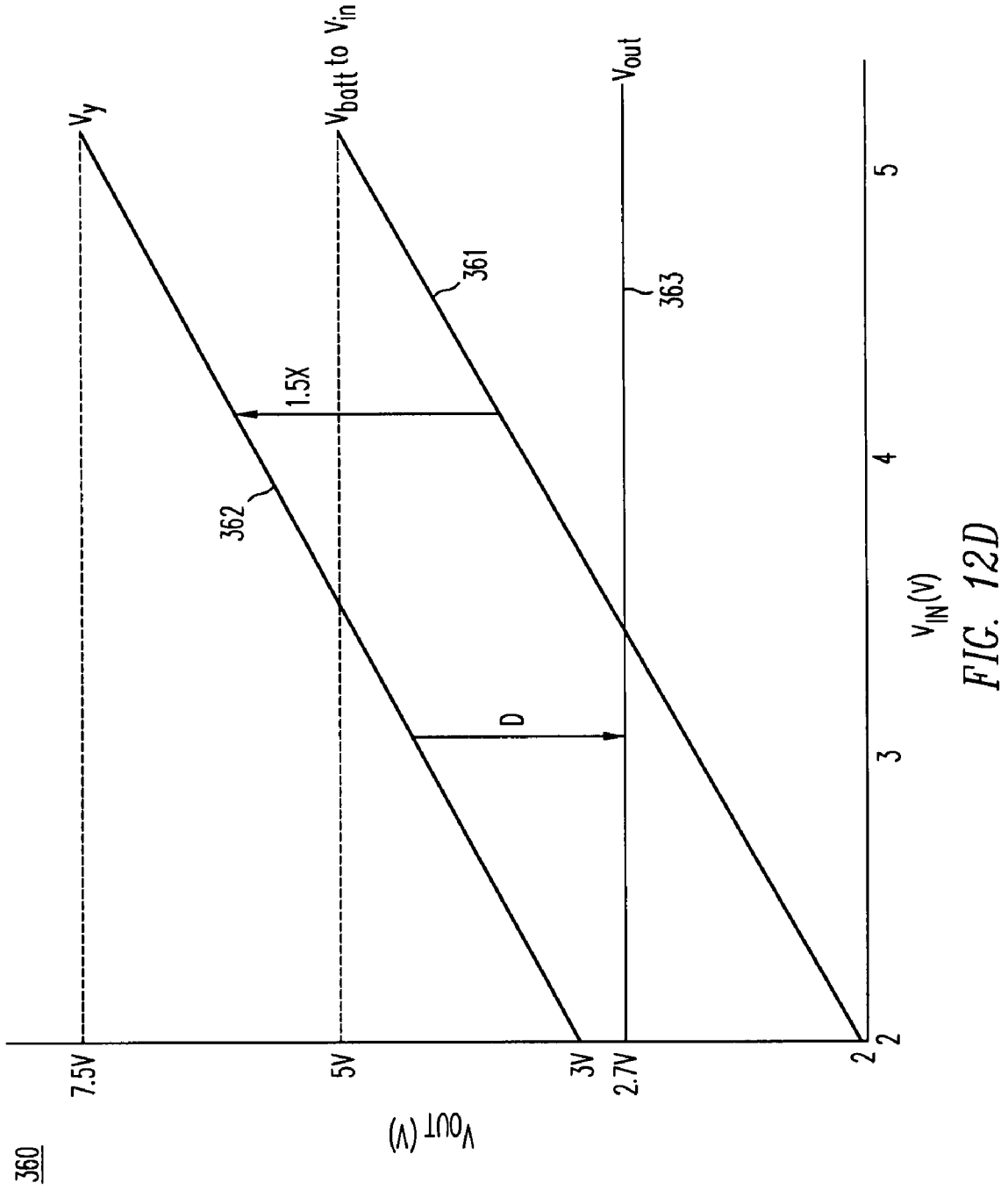
FIG. 12D is a graph of the transfer characteristics of a 1.5X-type CLUD converter over an input voltage in the range of 2V to 5V.

Graph 360 in FIG. 12D illustrates the voltage transfer characteristics of the 1.5X-type CLUD converter where input voltage ranging from 2V to 5V (curve 361) is stepped up by 1.5X to produce an intermediate voltage $V_y$ (curve 362) and then stepped down by a factor D to produce a constant output voltage (curve 363), in this case 2.7V, but alternatively 3.0V to 3.3V.

Present day converters are not able to operate with high efficiencies over the entire voltage range of a battery. Handset designers today must employ step-down-only Buck converters that cut off at a voltage around 3.5V, thereby forfeiting the battery in the final discharge phase and a portion of voltage-plateau-phase, because the added use-life of these later phases of discharge is balanced by the efficiency loss of a conventional Buck-boost converter. The LCUD converter is equally usable for one and two dry cell applications with inputs of 0.9V up to 2.4V.

As previously derived, the conversion ratio of a nX CLDU converter is given by $$\frac{V_{out}}{V_{batt}} = n \cdot D$$

having a corresponding duty factor D given by $$D = \frac{V_{out}}{V_y} = \frac{V_{out}}{n \cdot V_{batt}}$$

Figure 12E:
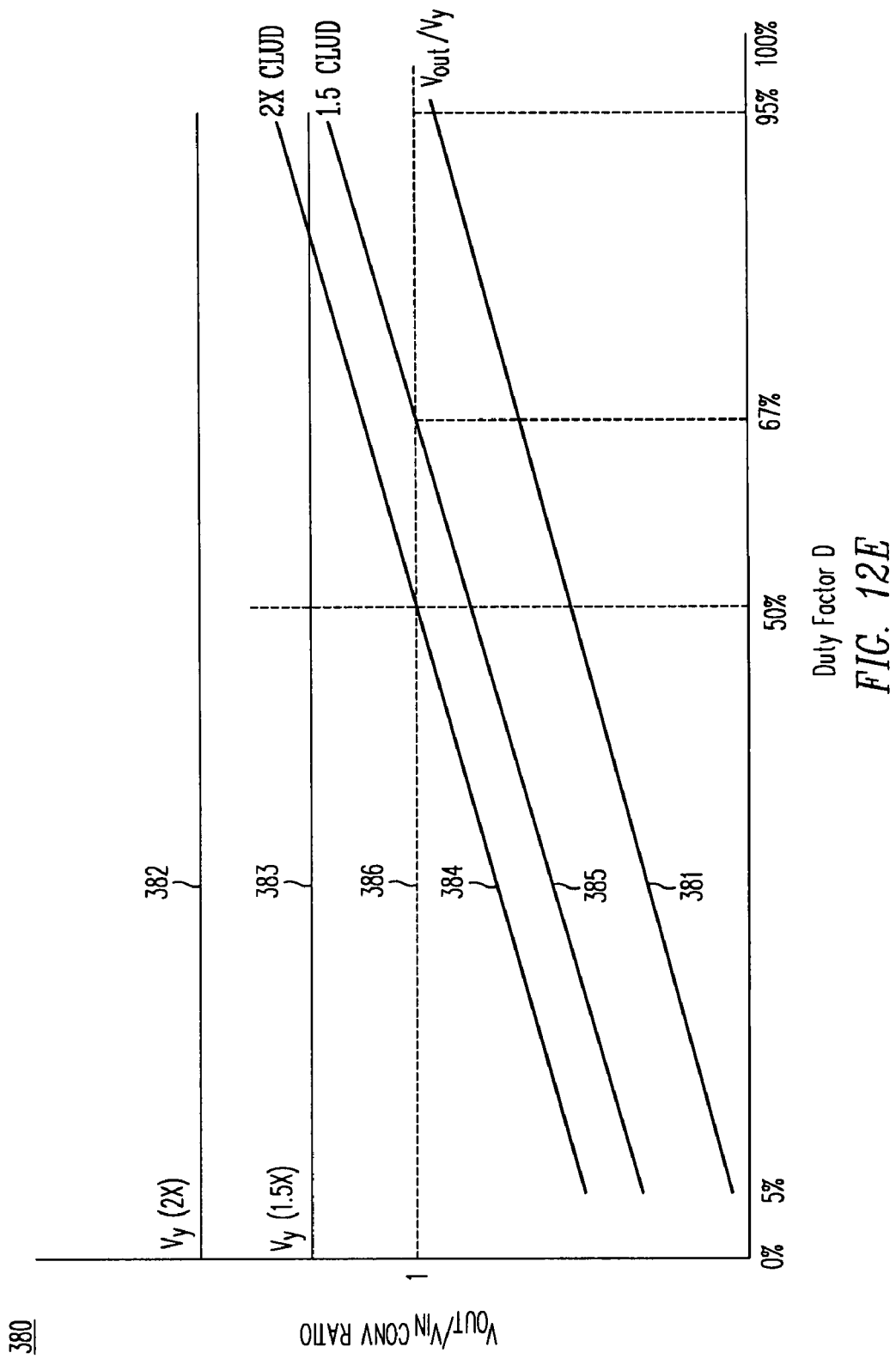
FIG. 12E is a graph of $V_{out}/V_{in}$ as a function of duty factor for 2X and 1.5X converters.

In graph 380 of FIG. 12E, the duty factor dependence of the voltage conversion ratio for 1.5X and 2X LCUD converters is illustrated by curves 385 and 384 respectively, and compared to the Buck converter's characteristic shown by curve 381.

While the Buck converter (curve 381) operates below a unity voltage conversion ratio (illustrated by dashed line 386) at any and all values of duty factor D, either the 1.5X or the 2X CLUD converter is able to operate above and below the unity conversion condition. The output voltage $V_y$ of the pre-converter (illustrated by curve 382 for a 2X charge pump and by curve 383 for a 1.5X charge pump) illustrates that the operation of the pre-converter operation does not depend on duty factor of the post-regulator.

As shown, a unity conversion ratio occurs in the 2X CLUD converter when the duty factor D=50%. At the same duty factor, the Buck converter exhibits a conversion ratio of 0.5. At high duty factors, where the Buck converter only approaches the unity conversion ratio, the 2X-type CLUD converter is able to provide an output voltage roughly equal to twice the input voltage.

CLUD Converter Implementation

Figure 13A:
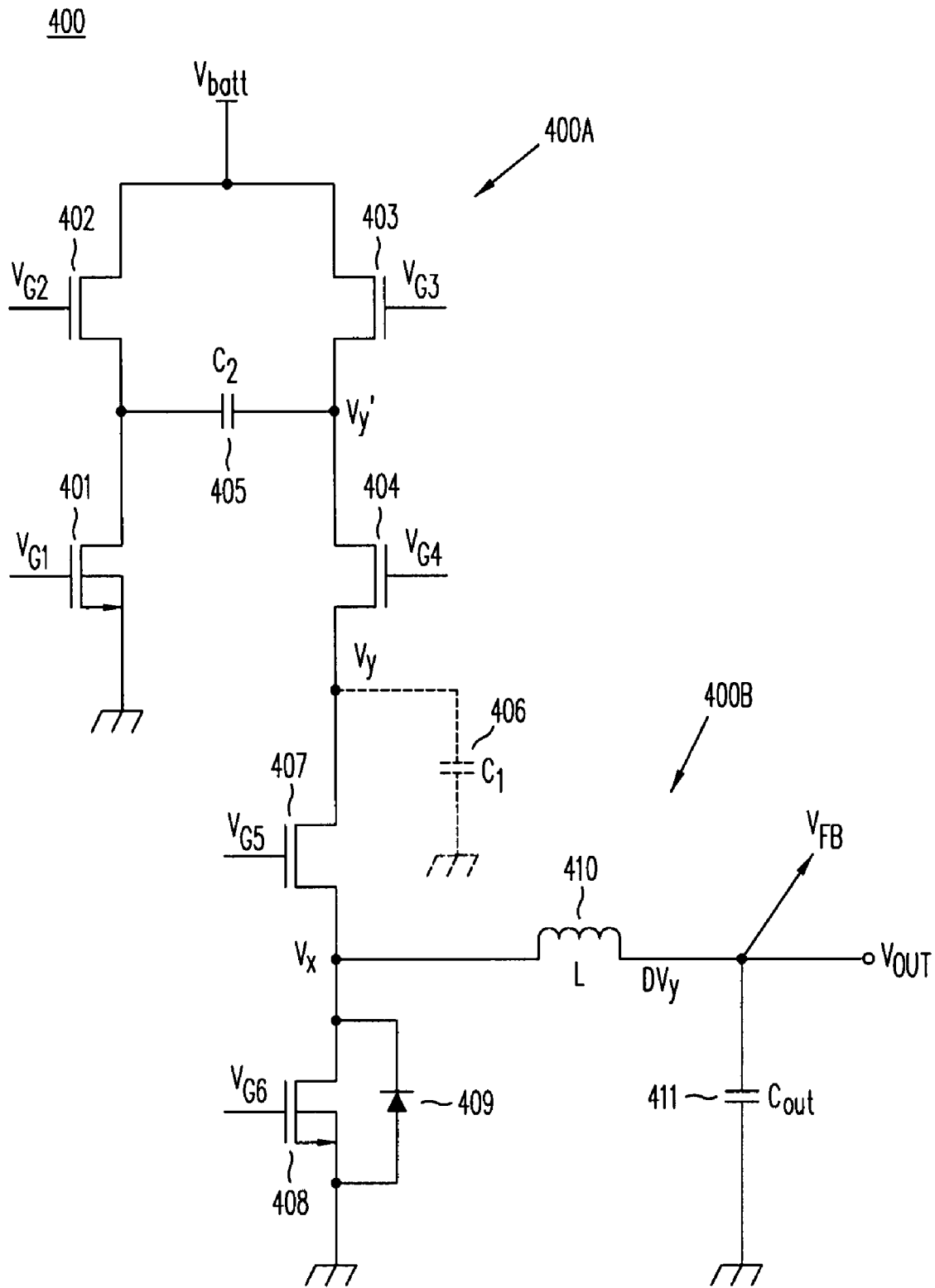
FIG. 13A is a circuit diagram of a 2X CLUD converter.

2X-Type CLUD Implementation: FIG. 13A illustrates a circuit diagram of a 2X CLDU converter 400. As shown, the switched capacitor pre-converter 400A comprises MOSFETs 401, 402, 403, and 404 with a flying capacitor 405. The MOSFETs are controlled by a break-before-make (BBM) buffer (not shown) to alternatively charge and discharge flying capacitor 405. The intermediate output voltage $V_y$ charges capacitor 405 and powers the input to the inductive post regulator 400B, where MOSFETs 407 and 408, using PWM control, continuously adjust the current flowing in inductor 410 in response to feedback of the output voltage as filtered by a reservoir capacitor 411.

In converter 400, the charge pump pre-converter 400A and the inductive post-regulator 400B share no components and may operate independently. Accordingly MOSFETs 401 through 404 can switch at a frequency different from MOSFETs 407 and 408. In such asynchronous operation, capacitor 406 stores energy output from charge pump pre-converter 400A and supplies it to the input of the Buck post-regulator 400B, and capacitor must have sufficient capacitance to supply all current transients as demanded. While the two clocks controlling pre-converter 400A and post-regulator 400B, respectively, may "free run" and thereby vary in frequency, unsynchronized operation can lead to excessive switching noise in the system.

In a preferred embodiment of a multi-frequency implementation of the CLUD converter 400, pre-converter 400A and post converter 400B switch at different frequencies but are synchronized either by a phase-locked-loop, also known as a PLL, or by using a common clock multiplied-up or divided-down to generate the two dissimilar clock signals. Ideally the clock waveform for the inductive post-regulator 400B comprises a ramp generator to produce a square, triangle, or saw-tooth ramp wave. The gate drive for charge pump MOSFETs 401 through 404 may, however, be a square wave signal generated by feeding the output of the ramp generator into a comparator. Alternatively, one or more of the MOSFETs 401 through 404 in the charge pump pre-converter 400A may be used to limit the inrush current to charge pump pre-converter 400A during the charging or discharging of its flying capacitor 405.

If, in contrast, the charge pump pre-converter 400A and inductive post-regulator 400B are switched in phase and at the same frequency then the size of the intermediate capacitor between the two stages can be greatly diminished or even eliminated. Under such circumstances, since MOSFET 404 in pre-converter 400A and MOSFET 407 in post-regulator 400B are wired in series and switch in unison, they are redundant and one of these MOSFETs may be eliminated.

Figure 13B:
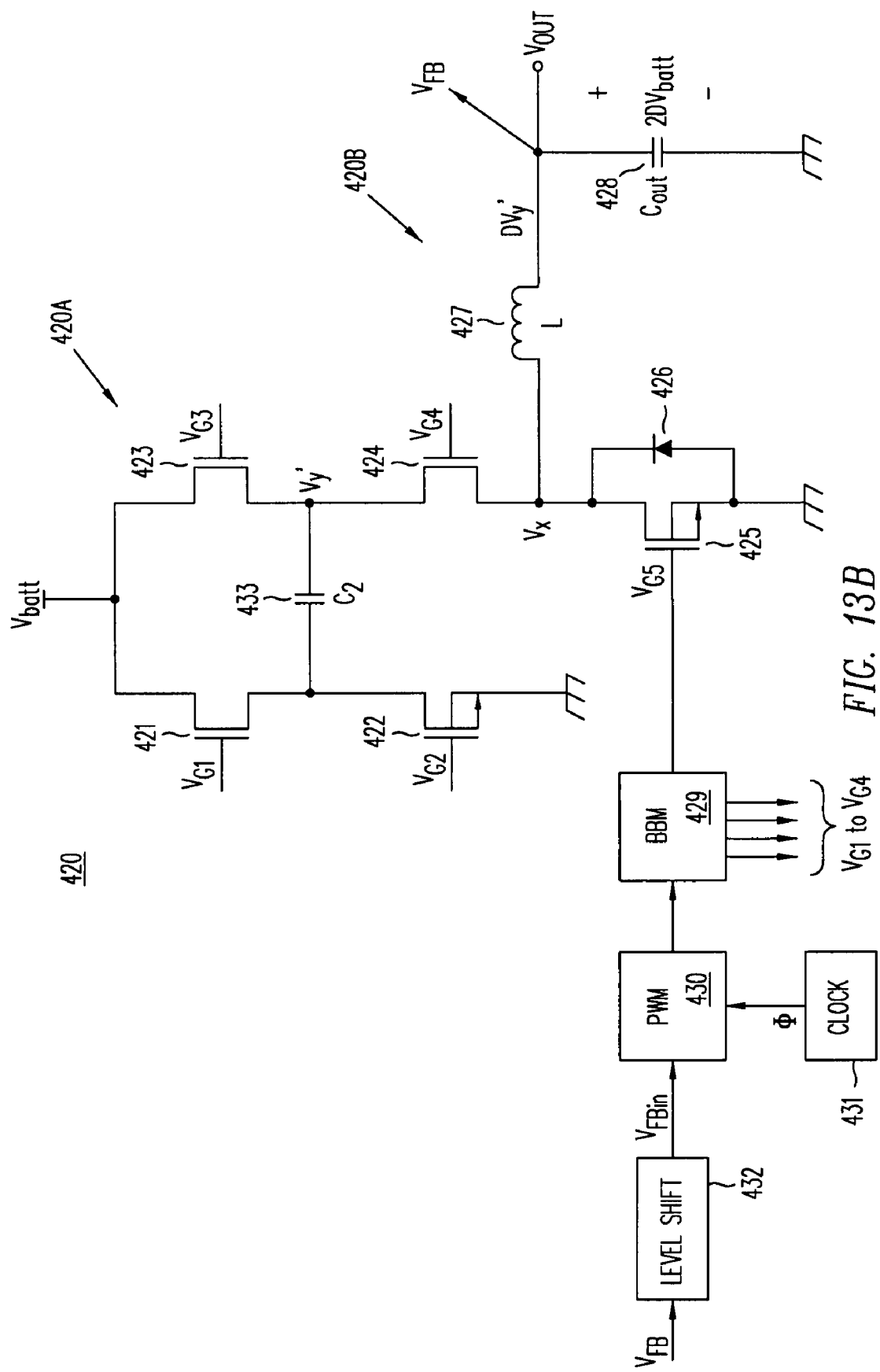
FIG. 13B is a circuit diagram of a simplified 2X CLUD converter.

This simplification for synchronous operation of the charge pump pre-converter and inductive post-regulator is illustrated 2X-type LCUD converter 420 of FIG. 13B, where MOSFET 424 serves as both the output transistor for the charge pump pre-converter 420A and as the input device for the inductive post-regulator 420B. This modification reduces series resistance, conduction and switching losses in the LCUD converter and may also save die area. The intervening capacitor is also eliminated since flying capacitor 433 acts as the input filter for post-regulator 420B whenever MOSFET 424 is on and conducting.

As shown, the switched capacitor pre-converter 420A of converter 420 comprises MOSFETs 421, 422, 423, and 424 with a flying capacitor 433. MOSFETs 421 through 424 are controlled by a break-before-make (BBM) buffer 429 to alternatively charge and discharge flying capacitor 433. The current flowing through inductor 427 is dynamically adjusted by the duty factor of high-side MOSFET 424, with a PWM controller 430 responding to changes in the output voltage of converter 420. Feedback signal $V_{FB}$ is adjusted in voltage and polarity by a level shift circuit 432 to control PWM circuit 430.

When high-side MOSFET 424 is conducting, the voltages $V_x$ and Vy' are both approximately equal to $\{2V_{batt}-I_L \cdot R_{DS}\}$. During this time, inductor 427 is magnetized, i.e. stores energy, while delivering current to the output and simultaneously transferring energy and charging output capacitor 428. When MOSFET 424 is turned off, the voltage $V_x$ flies below ground, forwarding biasing diode 426 and recirculating current.

During some portion of the time while diode 426 is forward-biased, synchronous rectifier MOSFET 425 is turned-on, diverting the current from diode 426. Break-before-make buffer 429 drives the gates of MOSFETs 424 and 425 out of phase, insuring that flying capacitor 433 is not shorted to ground by simultaneous conduction through MOSFETs 424 and 425. Clock pulse generator 431 synchronizes the switching of the MOSFETs in pre-converter 420A and post-regulator 420B, while PWM controller 430 determines the pulse width, i.e. on-time, of all MOSFETs in response to changes in the output voltage and feedback signal $V_{FB}$.

Notice that in converter 420, the intermediate capacitor connected between the charge pump pre-converter 420A and the inductive post-regulator 420B has been eliminated; there is no equivalent to capacitor 406 of converter 400 in converter 420. Therefore, a steady intermediate voltage $V_y$ does not exist in converter 420. The node voltage $V_y'$ emulates the behavior of intermediate voltage $V_y$ during the time when MOSFET 424 conducts and inductor 427 is being magnetized. During that portion of the converter's half-cycle, voltage $V_y'$ has a potential equal to approximately twice the battery input voltage. During the other half-cycle, while flying capacitor 433 is being charged, however, $V_y'$ is pulled to $V_{batt}$ by conducting MOSFET 424 and no longer behaves as a semi-constant voltage source or power supply. So $V_y'$ acts as a "virtual" constant voltage source whenever it is powering the post-regulator 420B, hence the prime notation """.

In an alternative embodiment, synchronous rectifier MOSFET 425 may be eliminated and recirculation current carried entirely by diode 426, which preferably should comprise a Schottky metal-semiconductor diode rather than a P-N junction diode. Schottky diodes are preferred because they exhibit lower forward voltage drops than P-N junction diodes. In yet another embodiment, a Schottky diode can be placed in parallel with MOSFET 425 and intrinsic P-N diode 426.

Figure 13C:
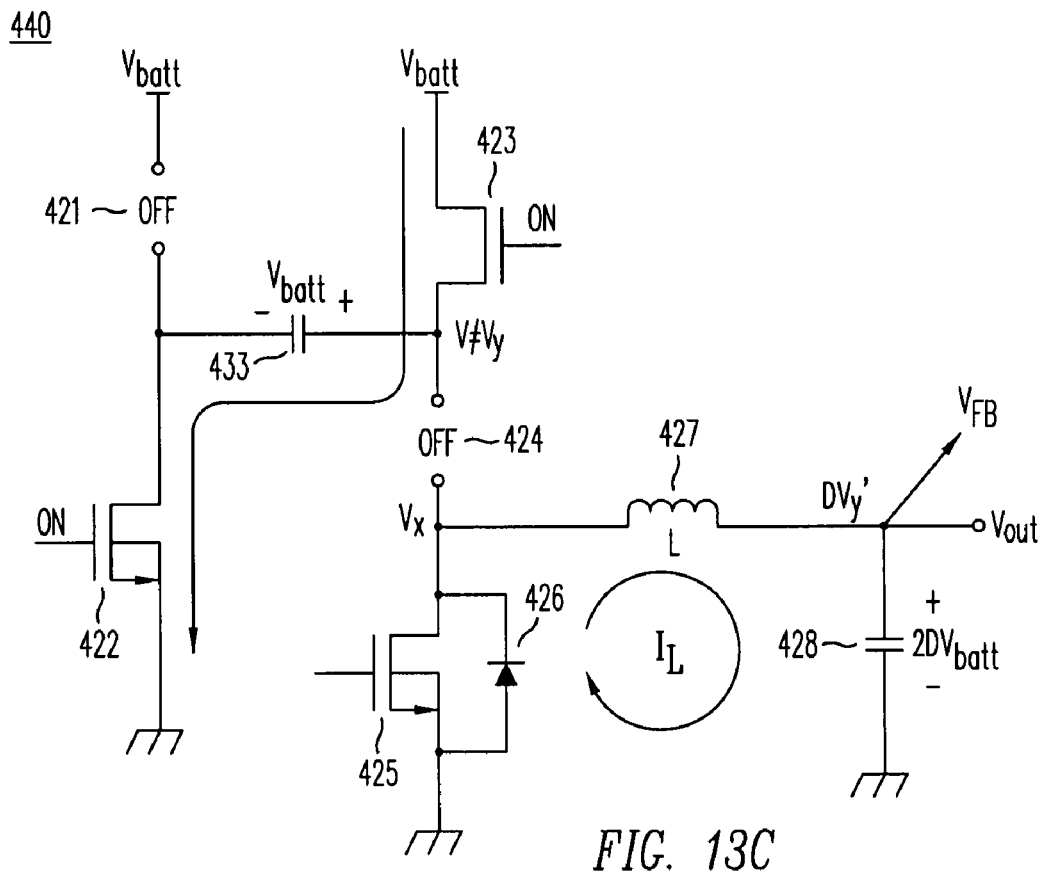
FIG. 13C is an equivalent circuit diagram of the 2X CLUD converter during the charging and recirculation phase.
Figure 13D:
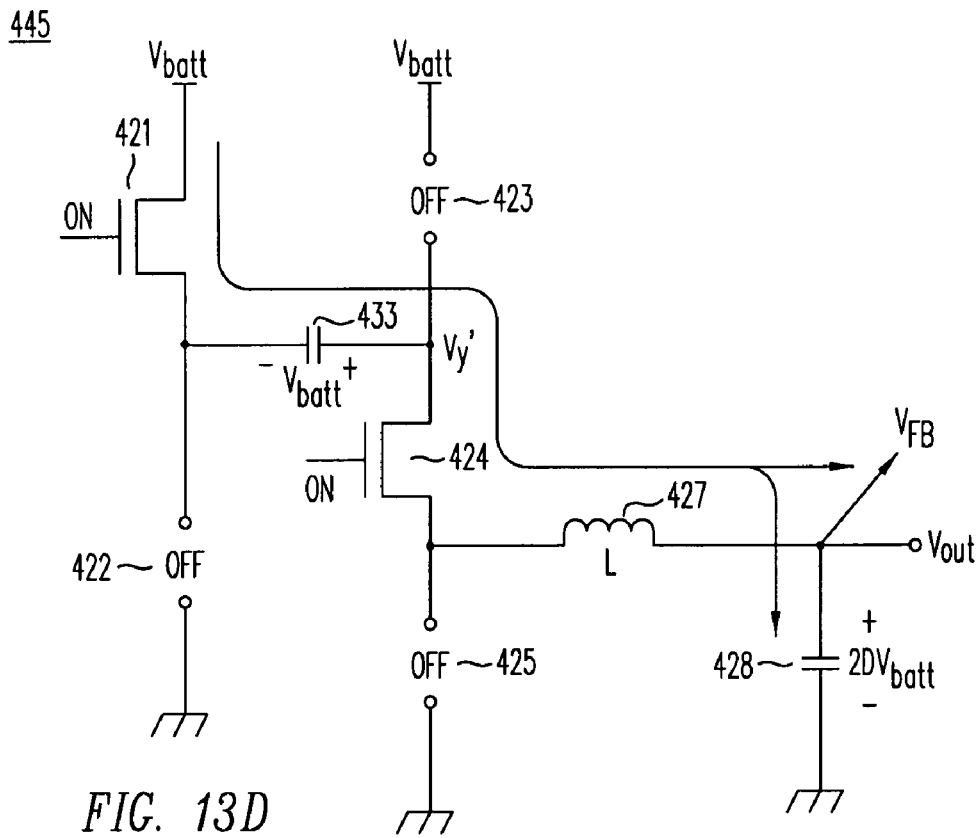
FIG. 13D is an equivalent circuit diagram of the 2X CLUD converter during the transfer and magnetizing phase.

The operation of CLUD converter 420 is illustrated in FIGS. 13C and 13D. In circuit 440 of FIG. 13C, flying capacitor 433 is charged through conducting MOSFETs 423 and 422, while MOSFETs 421 and 424 remain off. Flying capacitor 433 is then charged to the full battery input voltage, i.e. to $V_{batt}$.

During this cycle synchronous rectifier MOSFET 425 is conducting inductor recirculation current $I_L$, thereby moving energy from inductor 427 to output capacitor 428 and a load (not shown). This phase of operation can be referred to as the "charging and recirculation phase", i.e. the charging of the flying capacitor and the maintaining of the output voltage through inductor recirculation. During the charging and recirculation phase, MOSFET 424 is turned off and output capacitor $C_{Out}$ supplies the necessary load current $I_{out}$ to the electrical load. Specifically, during this phase the energy in inductor 427 is used to replenish output capacitor 428 as it is being discharged by the load. Current recirculation includes MOSFET 425, diode 426 and filter capacitor 428. The voltage across capacitor 428 begins to sag during this cycle and is replenished during the subsequent transfer phase shown in FIG. 13D.

FIG. 13D represents the transfer phase, during which energy is transferred from flying capacitor 433 in pre-converter 420A to inductor 427 in post-regulator 420B. This transfer is achieved by turning off MOSFETs 422, 423, and 425, and turning on MOSFETs 421 and 424, thereby connecting flying capacitor 433 in series with inductor 427 and magnetizing, i.e. storing energy ($I^2L$) in inductor 427. Simultaneous to magnetizing the inductor, the current charges capacitor 428 to a voltage $D \cdot V_y$, i.e., the voltage on the flying capacitor ($2 \cdot V_{batt}$) times the duty factor D of MOSFET 424.

The two phases alternate to keep inductor 427 magnetized and flying capacitor 433 and output capacitor 428 charged. The entire system is efficient because once the voltage builds up on flying capacitor 433 and output capacitor 428 during start-up, steady state operation must only replenish enough charge to compensate for the small shifts in voltage resulting from voltage sagging across capacitors 433 and 428 while they are discharging.

Figure 14A:
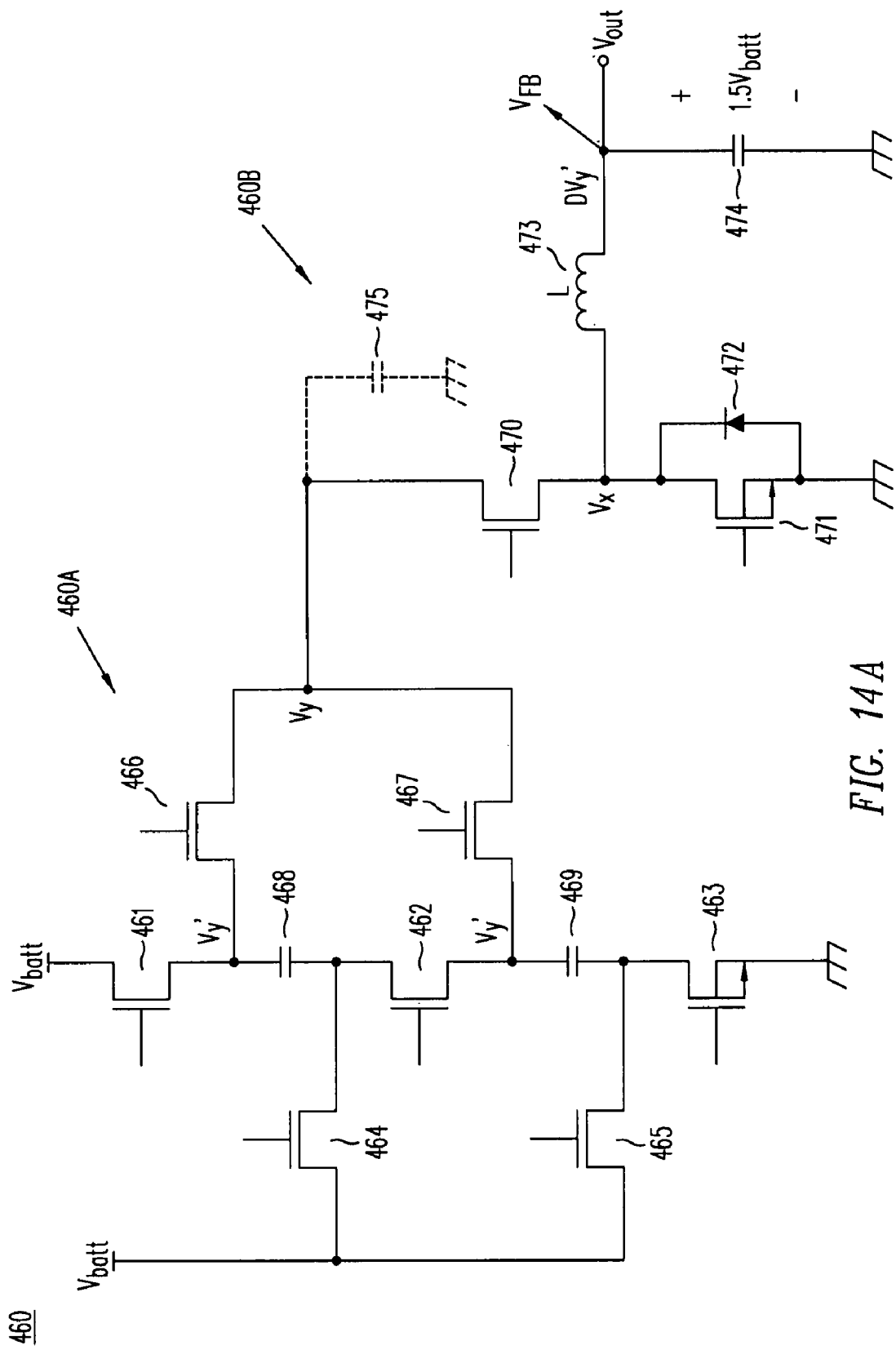
FIG. 14A is a circuit diagram of a 1.5X CLUD converter.

1.5X-Type CLUD Implementation: In another embodiment of this invention, FIG. 14A illustrates a circuit diagram of a 1.5X-type CLUD converter 460. Using a fractional charge pump rather than a doubler, the switched capacitor pre-converter 460A comprises two flying capacitors 468 and 469 driven by seven MOSFETs 461, 462, 463, 464, 465, 466, and 467. The MOSFETs are controlled by a break-before-make (BBM) buffer (not shown) to alternatively charge and discharge flying capacitors 468 and 469. The intermediate output voltage $V_y$ charges capacitor 475 and powers the inductive post regulator 460B, where MOSFETs 470 and 471, using PWM control, continuously adjust the current flowing in inductor 473 in response to feedback of the output voltage as filtered by reservoir capacitor 474.

In converter 460, the charge pump pre-converter 460A and the inductive post-regulator 460B share no components and may operate independently. Accordingly MOSFETs 470 through 471 can switch at a frequency different than MOSFETs 461 through 467. In such asynchronous operation, capacitor 475 stores energy output from pre-converter 460A and supplies it to the input of the Buck post-regulator 460B. Capacitor 475 and must have sufficient capacitance to supply all currents transients as demanded. While the two clocks controlling pre-converter 460A and post-regulator 460B, respectively, may "free run" and thereby vary in frequency, unsynchronized operation can lead to excessive switching noise in the system.

In a preferred embodiment of a multi-frequency implementation of 1.5X CLUD converter 460, pre-converter 460A and post converter 460B switch at different frequencies but are synchronized either by a phase-locked-loop, also known as a PLL, or by using a common clock multiplied-up or divided-down to generate the two dissimilar clock signals. Ideally, the clock waveform for the inductive post-regulator 460B comprises a ramp generator to produce a square, triangle, or saw-tooth ramp wave. The gate drive for the MOSFETs in pre-converter 460A may, however, be a square wave signal generated by feeding the output of the ramp generator into a comparator. Alternatively, one or more of the MOSFETs in charge pump pre-converter 460A may be used to limit the inrush current to the charge pump during the charging or discharging of flying capacitors 468 and 469.

If, in contrast, charge pump pre-converter 460A and inductive post regulator 460B are switched in phase and at the same frequency, the size of the intermediate capacitor 475 between the two stages can be greatly diminished or even eliminated. Under such circumstances, since each of MOSFETs 466 and 467 in the charge pump pre-converter 460A is connected in series with MOSFET 470 in post-regulator 460B, and MOSFETs 466, 467 and 470 are switching on and off together at the same frequency, MOSFET 467 may be eliminated.

Figure 14B:
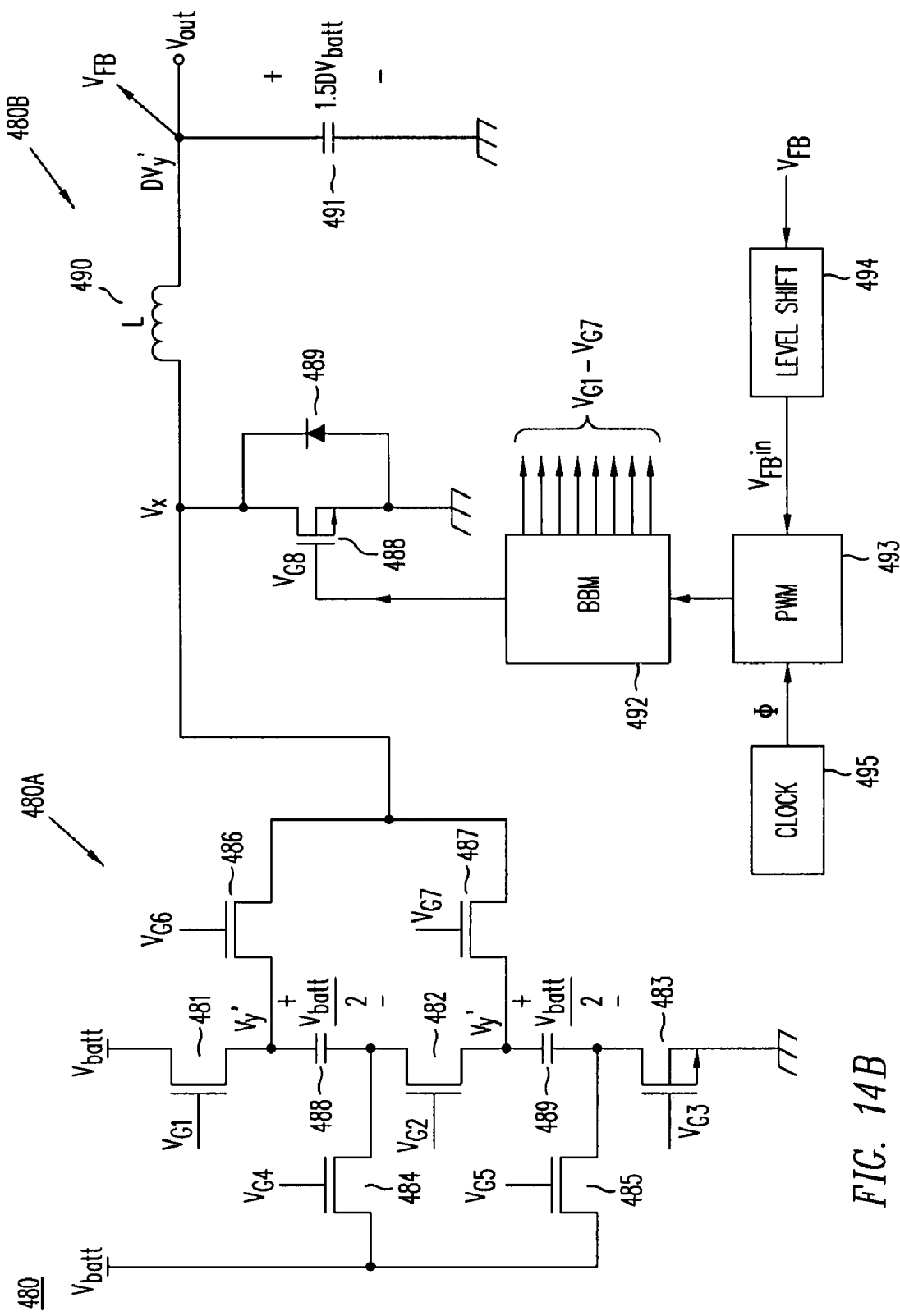
FIG. 14B is a circuit diagram of a simplified 1.5X CLUD converter.

The resulting 1.5X-type LCUD converter 480 is illustrated in FIG. 14B, where MOSFETs 486 and 487 serve both as output transistors for charge pump pre-converter 480A and as input devices for inductive post-regulator 480B. This modification reduces series resistance, conduction and switching losses in LCUD converter 480 and also saves die area. The intervening capacitor is also eliminated since flying capacitors 488 and 489 act in parallel as an input filter for post-regulator 480B whenever MOSFETs 486 and 487 are on and conducting.

As shown, the fractional switched capacitor pre-converter 480A of simplified converter 480 comprises seven MOSFETs 481, 482, 483, 484, 485, 486 and 487 with flying capacitors 488 and 489. The MOSFETs are controlled by a break-before-make (BBM) buffer 492 to alternatively charge and discharge flying capacitors 488 and 489. The current flowing through inductor 490 is dynamically adjusted by the duty factor of MOSFETs 486 and 487, with a PWM controller 493 responding to changes in the output voltage of converter 480. The feedback signal $V_{FB}$ is adjusted in voltage by level shift circuit 494 to control PWM circuit 493.

When high-side MOSFETs 486 and 487 are conducting, the voltage $V_x$ is biased at $V_y$' approximately equal to $\{2V_{batt} - I_L \cdot \frac{1}{2}R_{DS}\}$ during which time inductor 490 is magnetized, i.e. stores energy while delivering current to the output and simultaneously transferring energy and charging output capacitor 491. When MOSFETs 486 and 487 are turned off, the voltage $V_x$ flies below ground, forwarding-biasing diode 489 and recirculating current. The synchronized conduction of MOSFETs 486 and 487 not only performs the function of controlling the output current of 1.5X charge pump pre-converter 480A, but performs the function of the input MOSFETs for the inductive Buck post converter 480B, thereby eliminating the need for one high-current low-resistance MOSFET, saving die area and improving efficiency.

Some portion of the time while diode 489 is forward biased, synchronous rectifier MOSFET 488 is turned on, diverting current from diode 489. Break-before-make buffer 492 drives MOSFETs 488 out of phase with MOSFETs 486 and 487, insuring that flying capacitors 488 and 489 are not shorted to ground by simultaneous conduction of MOSFETs 486, 487, and 488. Clock pulse generator 495 synchronizes the switching of boost post-regulator 480B and charge pump pre-converter 480A, while PWM controller 493 determines the pulse width, i.e. on-time, of all MOSFETs in response to changes in the output voltage and feedback signal $V_{FB}$.

Notice that in converter 480 the intermediate capacitor connected between charge pump pre-converter 480A and inductive post-regulator 480B has been eliminated, i.e., there in no equivalent to capacitor 475 of converter 460 in simplified converter 480. Therefore, a steady intermediate voltage $V_y$ does not exist in converter 480. The node voltages $V_y'$ emulate the behavior of intermediate voltage $V_y$ during the time when MOSFETs 486 and 487 conduct and inductor 490 is being magnetized. During that portion of the half-cycle of converter 480, voltage $V_y'$ has a potential equal to approximately 1.5 times the battery input voltage. During the other half-cycle, each of series-connected capacitors 488 and 489 is charged to a voltage of $V_{batt}/2$ through conducting MOSFETs 481, 482 and 483 and no longer behaves as a semi-constant voltage source or power supply. So $V_y'$ acts as a "virtual" constant voltage source whenever it is powering post-regulator 480B, hence the prime notation "'".

In an alternative embodiment, synchronous rectifier MOSFET 488 may be eliminated and recirculation current may be carried entirely by diode 489, which preferably should comprise a Schottky metal-semiconductor diode rather than a P-N junction. Schottky diodes are preferred because they exhibit lower forward voltage drops than junction diodes. In yet another embodiment, a Schottky diode is placed in parallel with MOSFET 488 and intrinsic P-N diode 489.

Figure 14C:
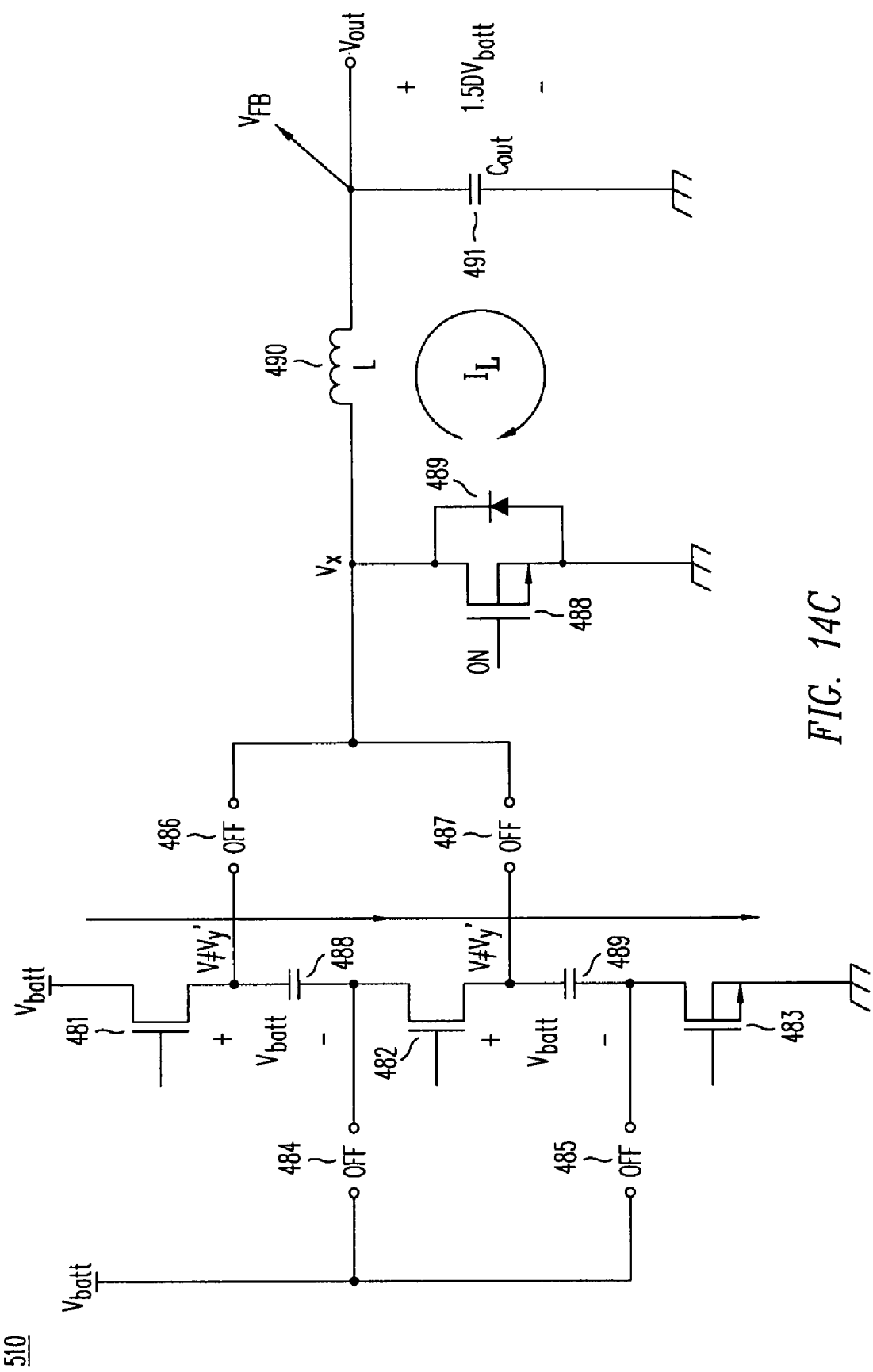
FIG. 14C is an equivalent circuit diagram of the 1.5X CLUD converter during the charging and recirculation phase.
Figure 14D:
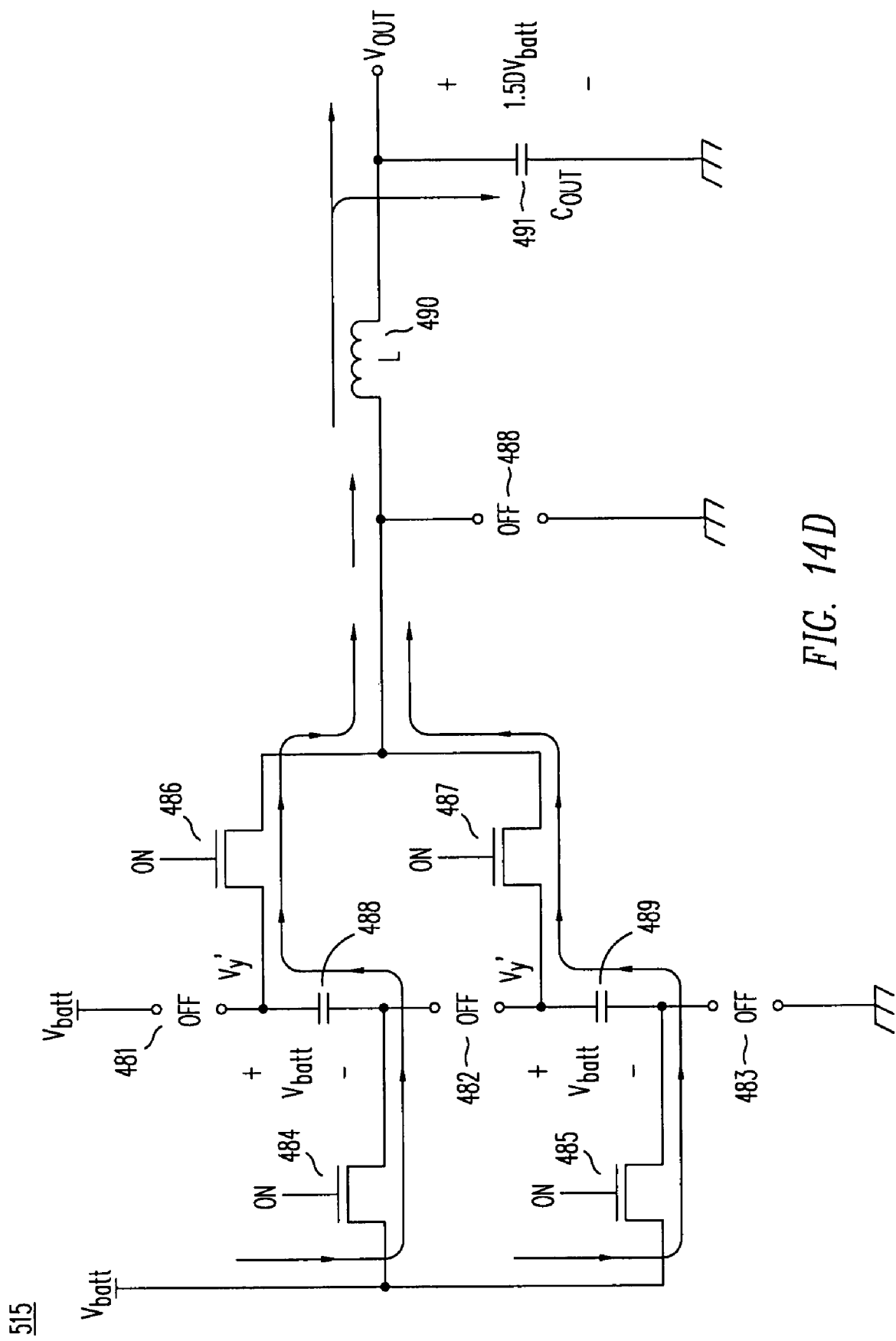
FIG. 14D is an equivalent circuit diagram of the 1.5X CLUD converter during the transfer and magnetizing phase.

The operation of the fractional CLUD converter 480 is illustrated in FIGS. 14C and 14D. In equivalent circuit diagram 510 of FIG. 14C, capacitors 488 and 489 are charged through conducting MOSFETs 481, 482 and 483 while MOSFETs 484, 485, 486 and 487 remain off. Series-connected flying capacitors 488 and 489 are then each charged to the half the battery input voltage, i.e., to $V_{batt}/2$.

During this phase, synchronous rectifier MOSFET 488 is conducting a recirculation current $I_L$, thereby moving energy from inductor 490 to output capacitor 491 and a load (not shown). This phase can be referred to as the "charging and recirculation phase", i.e. the charging of the flying capacitors and the maintaining of the output voltage through current recirculation through inductor 490. During this phase, MOSFETs 486 and 487 are turned off and output capacitor $C_{Out}$ supplies the necessary load current $I_{out}$ to the electrical load. Specifically, during this phase the energy in inductor 490 is used to replenish output capacitor 491 as it is being discharged by the load. Current recirculation includes MOSFET 488, diode 489 and output capacitor 491. The voltage across capacitor 491 begins to sag during this phase and is replenished during the subsequent transfer phase, shown in FIG. 14D.

FIG. 14D illustrates the transfer phase, where energy is transferred from flying capacitors 488 and 489 in pre-converter 480A to inductor 488 in post-regulator 480B. This energy transfer is achieved by shutting off MOSFETs 481, 482, and 483, and by turning on MOSFETs 484, 485, 486 and 487, thereby connecting flying capacitors 488 and 489 in parallel, stacked atop the voltage $V_{batt}$ and in series with inductor 490. This connection simultaneously magnetizes inductor 490, i.e. storing energy $I^2L$, and transfers charge from flying capacitors 488 and 489 to output capacitor 491 at a voltage $D \cdot V_y$, i.e., the voltage on the flying capacitors 488 and 489 ($1.5 \cdot V_{batt}$) times the duty factor D of MOSFETs 486 and 487.

The two phases alternate to keep inductor 490 magnetized and flying capacitors 488 and 489 and output capacitor 491 charged. The entire system is efficient because once the voltage builds up on flying capacitors 488 and 489 and output capacitor 491 during start-up, steady state operation must only replenish enough charge to compensate for the small shifts in voltage resulting from voltage sagging across capacitors 488, 489 and 491 while they are discharging.

CLXD Converter Efficiency

One unexpected aspect of a CLXD converter, and in fact any CLXX class converter, is the relative independence of its overall efficiency η on input and load conditions. This can better be understood by referring to FIG. 9 where charge-pump pre-converter 252 produces an intermediate voltage $V_y$ that provides the input voltage to inductive post-regulator 254.

The lossy element 253 is included in the behavioral model to illustrate that because charge-pump pre-converter 252 cannot actually regulate voltage, any voltage mismatch ΔV between the intermediate voltage $V_y$ and the desired intermediate voltage $V_z$ needed to power post-regulator 254 will result in a further loss of efficiency. In LC-class converters like those described in the above-referenced application Ser. Nos. 11/890,818 and 11/890,956, closed loop feedback around the entire loop from the output terminal of the converter to the input terminal of the PWM controller is beneficial to counter any "loading" effects on the charge pump. But in CL-class converters like converter 250, the output of charge pump pre-converter 252 is internal to the converter, and unless the input to post converter 254 is used to supply an external load, then $V_z$ will naturally operate at the voltage $V_y$, the optimum efficiency condition.

Specifically, in CLXX-type converters such as converter 250, charge pump pre-converter 252 operates in an open-loop manner to produce an output voltage $V_y$ that is some fixed multiple "n" of the input voltage. For example, using one or two flying capacitors, the multiplier will be an integral multiple of 0.5V. As long as $V_z$ can be maintained near the voltage $n \cdot V_{in}$, i.e. where $V_y \approx V_z$, the efficiency of charge pump pre-converter 252 will remain high. Any deviation ΔV from this optimum condition will result in a loss of efficiency in charge pump pre-converter 252, where the mismatch is given by $\Delta V = V_z - V_y$ resulting in a loss that has the same mathematical form $\Delta V/V_{in}$ as the losses in a linear converter, even though lossy element 253 is not really regulating voltage. Specifically, the loss of efficiency may be defined as $$P_{loss2} = I_y \cdot \Delta V = I_y |(V_y - V_z)|$$

The efficiency of element 253, is then given by $$\eta_2 = \frac{P_z}{P_y} = \frac{P_y - P_{loss2}}{P_y} = \frac{I_y \cdot V_y - I_y(V_y - V_z)}{I_y \cdot V_y} = \frac{V_z}{V_y}$$

and where $V_z \leq V_y$, i.e. the maximum theoretical efficiency of the second element is 100%. From the converter transfer function $V_y = n \cdot V_{in}$ then $$\eta_2 = \frac{V_z}{V_y} = \frac{V_z}{nV_{in}}$$

In reality, however, the maximum efficiency of charge pump pre-converter 252 is not 100%. Charge pump pre-converter 252 typically has a maximum efficiency in the range of 96% when delivering power to a load operating at a voltage $V_z$. Assuming that this efficiency remains relatively constant, the conversion efficiency of the first two stages is given by $$\eta_{CP} = \eta_1 \cdot \eta_2 = \eta_2 \frac{V_z}{V_y} = \frac{\eta_2 \cdot V_z}{n \cdot V_{in}}$$

When n=1, the charge pump is not actually stepping up voltage and the efficiency equation defaults to that of linear converter.

Referring again to converter 250 in FIG. 9, the overall efficiency of the CLXD converter shown can be estimated as the product of the aforementioned charge pump efficiency $\eta_1 \cdot \eta_2$ and the efficiency of the switched inductor post converter $\eta_3$.

For post-regulator 254, its input power is given by $P_z = I_z \cdot V_z$ while $P_{out} = I_{out} \cdot V_{out}$. The efficiency $\eta_3$ of post-regulator 254 can then be expressed as $$\eta_3 = \frac{P_{out}}{P_z} = \frac{I_{out} \cdot V_{out}}{I_z \cdot V_z}$$

Typical values range from 94% to 89% depending on operating conditions, power MOSFET resistance and operating currents. Since the efficiency $\eta_3$ of post-regulator 254 depends on the voltage conversion ratio, and since the conversion ratio depends on duty factor D, then it follows logically that the switching converter's efficiency depends on duty factor, i.e. $\eta_3 = f(D)$.

The overall efficiency of LCXX converter 250, then, is given by the product of the efficiency of charge-pump pre-converter 252 and the efficiency of inductive post-regulator 254.

$$\eta = \eta_{CP} \cdot \eta_3 = \eta_1 \cdot \eta_3 \frac{V_z}{V_y} = \eta_1 \cdot \eta_3 \frac{V_z}{n \cdot V_{in}}$$

Since feedback within post-regulator 254 maintains the targeted output voltage $V_{out}$ by adjusting its duty factor for a wide range of intermediate voltages $V_z$ then, unloaded, $V_z = V_y = n \cdot V_{in}$ and the above equation simplifies to $$\eta = \eta_{CP} \cdot \eta_3 = \eta_1 \cdot \eta_3$$

where $\eta_3$ is a function of the duty factor D. Using a step-down, Buck converter topology for the post-regulator 254, the voltage transfer function of CLXD converter 250 is given by $V_{out} = D \cdot V_y = [n \cdot D] V_{in}$.

Switched CLXX-type and CLXD-type converters of this invention can produce a well regulated output voltage with efficiencies that are relatively insensitive to the $V_{out}/V_{in}$ voltage conversion ratio. In the event that the charge-pump pre-converter is a step-up fractional charge pump, e.g. where n=1.5 or 2, the resulting CLUD converter is able to operate in either step-up or step-down modes without exhibiting any mode changes, narrow pulse, or dropout effects near unity voltage conversion ratios, i.e. when $V_{out} \approx V_{in}$. A CLUD converter is able to operate over a range of output to input voltage ratios far beyond those attainable by a Buck converter, boost converter or charge pump. Assuming a practical limitation to duty factors in the range between 10% and 90%, Table 3 compares the usable range of voltage conversion ratios of the CLUD converter to those of a charge pump doubler, Buck converter, and boost converter.

TABLE 3

| Converter Topology | Range of $V_{out}/V_{in}$ | Range of Efficiency | Unity Ratio Efficiency |
|---|---|---|---|
| 2X Charge Pump | 0.1 to 2.0 | Above 1.8 | Poor, $\eta < 50\%$ |
| Boost Converter | 1.1 to 15 | Good up to ~8-10 | Dropout below 1.1 |
| Buck Converter | 0.1 to 0.9 | Good over range | Dropout above 0.9 |
| 2X CLUD | 0.2 to ~1.8 | Good over range | Good, $\eta > 92\%$ |
| 1.5X CLUD | 0.15 to ~1.5 | Good over range | Good, $\eta > 92\%$ |

Despite its high efficiency characteristic, a Buck converter operating between a 10% and a 90% duty factor is only capable of step-down conversion ratios, i.e. for $V_{out} = \{0.1V_{in}$ to $0.9V_{in}\}$ as shown by curve 471. Similarly, a boost converter operating between a 10% and a 90% duty factor is only capable of step-up conversion ratios, i.e. where $V_{out} = \{1.1V_{in}$ to $8V_{in}\}$. Furthermore 2X charge pump efficiency (curve 473) is high only for conversion ratios exceeding 1.8.

In contrast, the efficiency of a CLUD is high over a wide range of voltage conversion ratios, i.e. where $V_{out} = \{0.15V_{in}$ to $1.8V_{in}\}$. This result is unexpected considering the CLUD converter combines elements of the charge pump and the boost converter, yet regulates over a much wider range of operating conditions than either of them.

Switched Capacitor-Inductor Down-Down (CLDD) Converters

The CLXD converter topology is also useful for step-down voltage regulation. By utilizing a step-down charge-pump as a pre-converter, step-down voltage conversion is performed in two stages, or as a CLDD converter. Examining the implementation of the CL type down-down converters in greater detail, FIG. 15 illustrates the functional block representation of a switched 0.5X-type LCDD regulating converter 550. Converter 550 comprises a pre-converter 550A which includes a fractional charge pump 551 with flying capacitors 553 and 554 and a filter capacitor 552, where the output of charge pump 551 supplies an intermediate voltage $V_y$. Intermediate voltage $V_y$ in turn powers a step-down switched-inductor post-regulator 550B comprising an inductor 558, a MOSFET 555, a low-side N-channel synchronous rectifier MOSFET 556 with an intrinsic rectifier diode 557 and an output capacitor 559. Since $V_y = 0.5 \cdot V_{batt}$ and $V_{out} = D \cdot V_y$, then the voltage conversion ratio of 0.5X-type CLDD converter 550 is given by $$\frac{V_{out}}{V_{batt}} = n \cdot D = 0.5 \cdot D$$

Figure 16A:
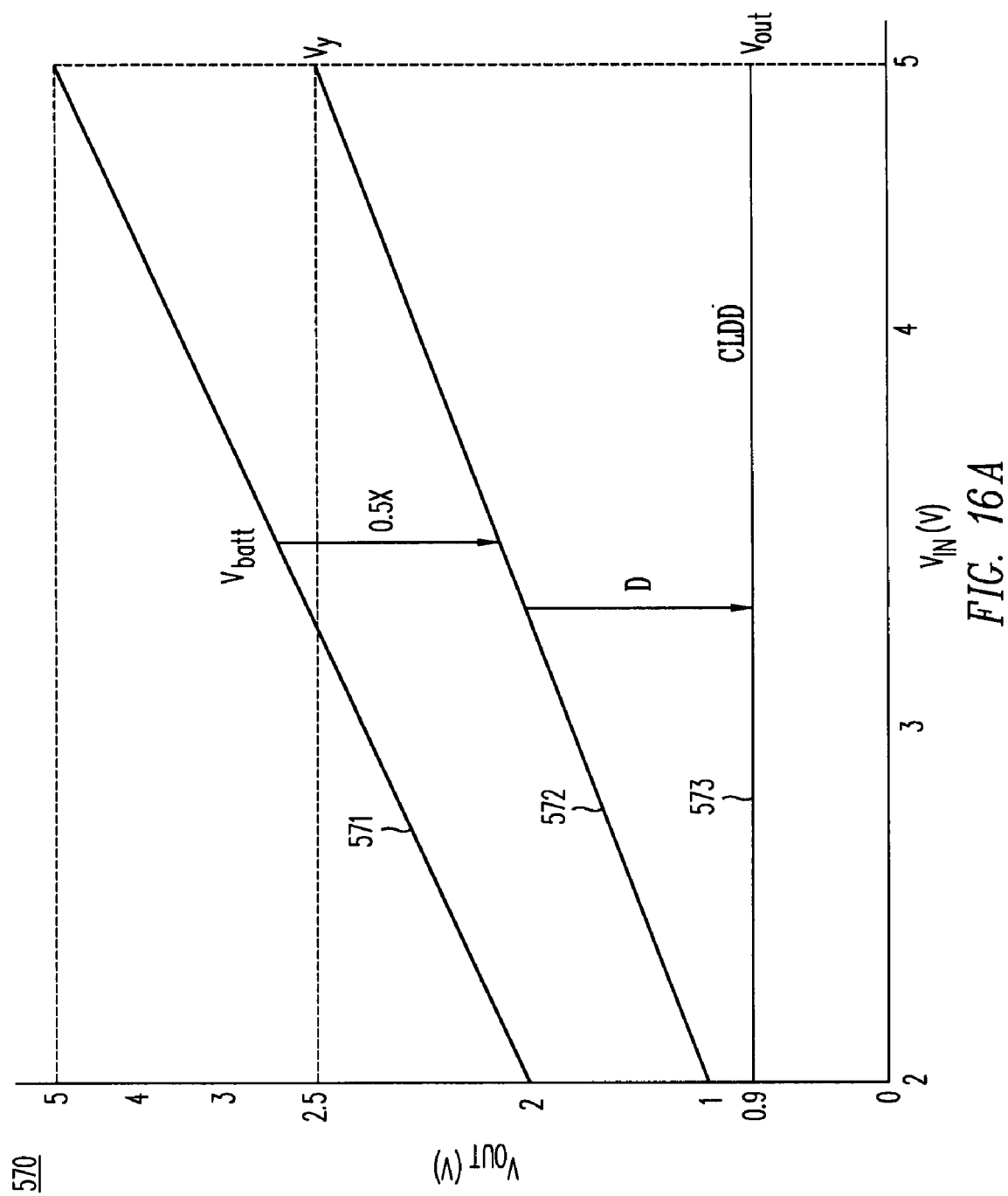
FIG. 16A is a graph of the transfer characteristics of a switched 0.5X-type CLDD converter over an input voltage in the range of 2V to 5V.

An example of the voltage transfer characteristic of 0.5X CLDD converter 550 is shown on graph 570 of FIG. 16A for an input ranging from 2V to 5V. As shown, the $V_{batt}$ input (curve 571) is stepped down by a factor of 2 to produce a $V_y$ intermediate voltage (curve 572) that changes in proportion to the battery input. This voltage is then further reduced by a varying factor of D in the step-down type post-regulator 550B to produce a constant output voltage 573, in this case 0.9V. The step-down conversion ratio of 0.5X CLDD converter 550 is substantial even at moderate duty factor ratios. For example at a 50% duty factor the step-down voltage conversion is a factor of 4X, i.e. $V_{out}$=25% of $V_{batt}$.

Figure 16B:
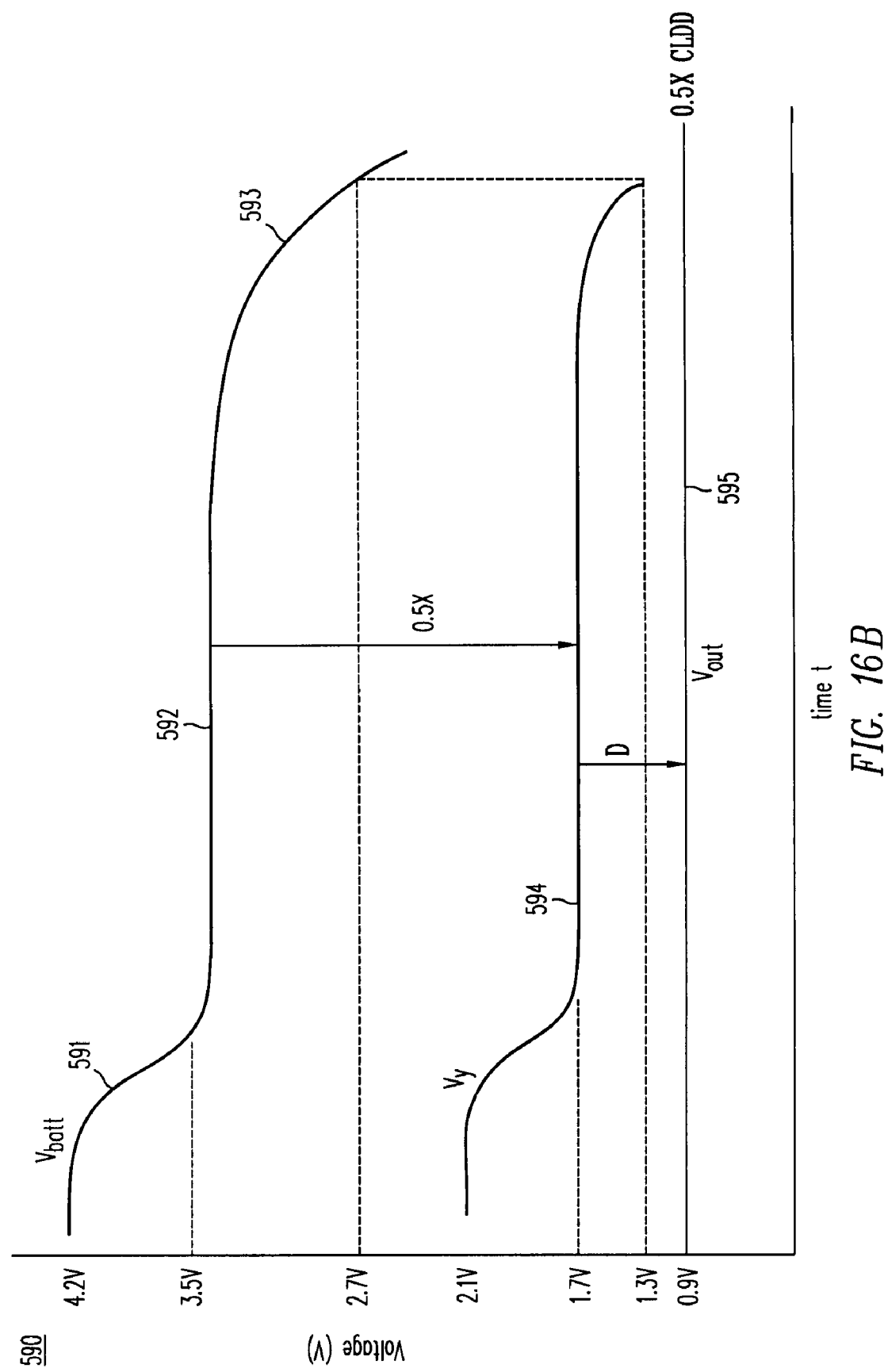
FIG. 16B is a graph of the transfer characteristics of a switched 0.5X-type CLDD converter supplied by a 1-cell LiIon battery as a function of time.

Another example of CLDD conversion is illustrated in graph 590 of FIG. 16B where the discharge of a 1s LiIon battery is stepped down and regulated to 0.9V. The LiIon battery fully charged starts with a 4.2V condition (curve 591) that decays over time to a plateau voltage (curve 592) of approximately 3.5V and then eventually reached its discharged condition of 2.7V in region of curve 593. The CLDD converter's fractional pre-converter produces a time varying voltage $V_y$ equal to one-half of $V_{batt}$, shown by $V_y$ curve 594 ranging from 2.1V to 1.4V. $V_y$ is then further stepped down to 0.9V by an a varying amount D by the step-down post-regulator to produce a constant 0.9V output (curve 595).

Figure 16C:
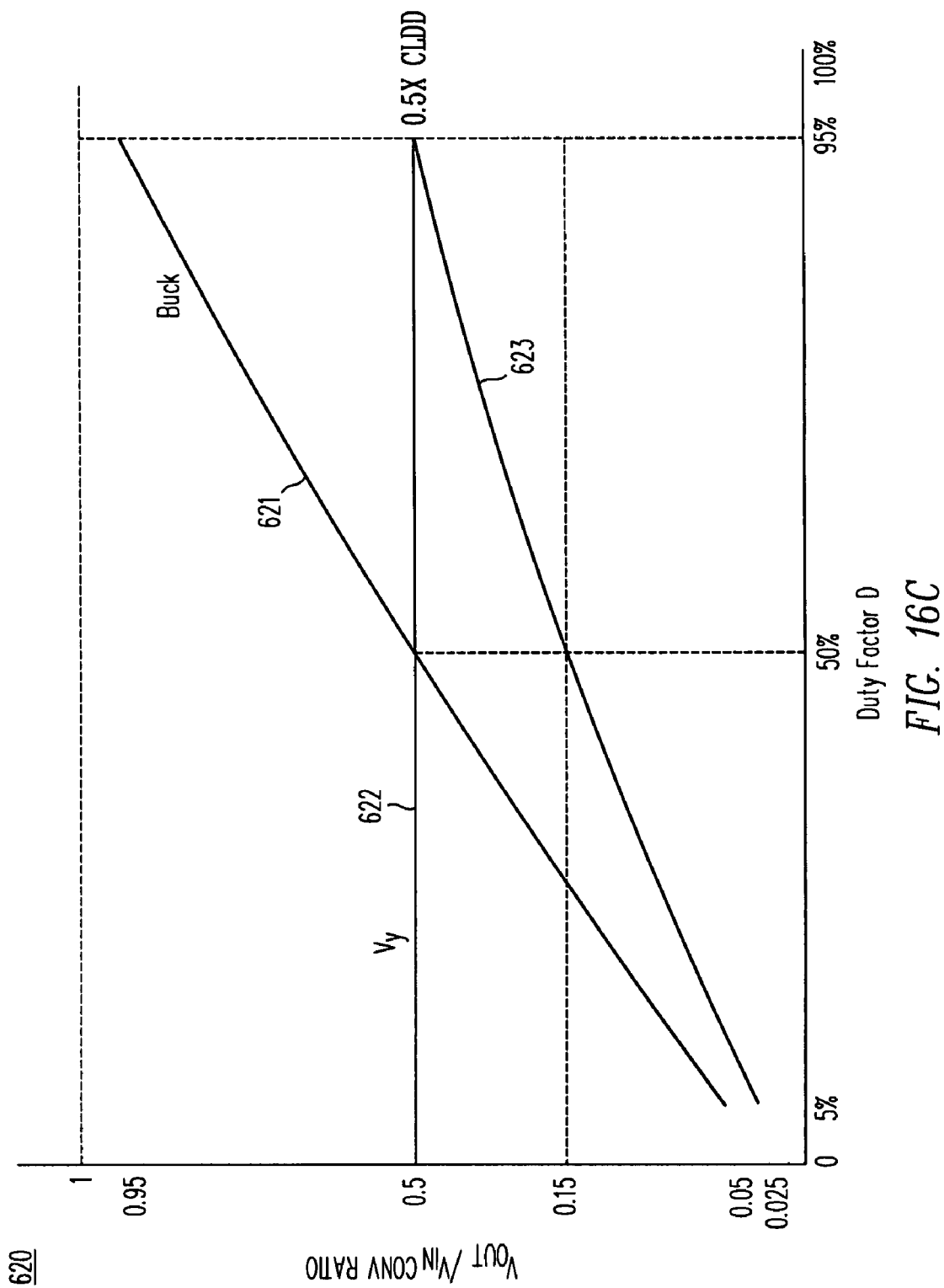
FIG. 16C is a graph of $V_{out}/V_{in}$ as a function of duty factor for the 0.5X-type CLDD converter.

For a given step down ratio, the duty factor D of the CLDD converter is lower than a Buck or CLUD converter, making it ideally suited for operating at low output-to-input voltage conversion ratios. This feature is illustrated in graph 620 in FIG. 16C showing the voltage conversion ratio at various duty factors. The graph compares the voltage conversion characteristic of a 0.5X-type CLDD converter (curve 623) to that of a conventional Buck converter (curve 623).

Neither the Buck converter nor 0.5X-type CLDD converter operates above a unity conversion ratio, meaning both converters are limited to step-down operation. At low duty factors, the conversion ratio of both the Buck converter and CLDD converter asymptotically approaches zero. At a 50% duty factor, the Buck converter has an output-to-input voltage ratio of one-half, while the 0.5X-type CLDD converter exhibits an input-to-output voltage ratio of one-quarter. From the relationship $$\frac{V_{out}}{V_{batt}} = n \cdot D = 0.5 \cdot D$$

having a corresponding duty factor D given by $$D = \frac{V_{out}}{V_y} = \frac{V_{out}}{n \cdot V_{batt}} = 2 \frac{V_{out}}{B_{batt}}$$

describing D as function of the product of the voltage conversion ratio and the pre-converter factor nX, it is clear that smaller values of "n" increase the minimum duty factor for any given conversion ratio, making it easier to implement converters with high step-down conversion ratios. For example, at a 50% duty factor, a 0.5X CLDD converter can step down its input voltage by a factor of 4, a value double that of a Buck converter. The relationship between duty factor and conversion ratio for the 0.5X-type CLDD converter is illustrated by curve 623 in graph 620 of FIG. 16C and contrasted with the conversion ratio of a conventional Buck converter (curve 621) and a 0.5X charge pump (curve 622).

TABLE 4

| Condition | 2X CLUD | 1.5X CLUD | Buck | 0.5X CLDD |
|---|---|---|---|---|
| D = 90% | $V_{out}/V_{in}$ = 1.8 | $V_{out}/V_{in}$ = 1.35 | $V_{out}/V_{in}$ = 0.9 | $V_{out}/V_{in}$ = 0.45 |
| D = 50% | $V_{out}/V_{in}$ = 1 | $V_{out}/V_{in}$ = 0.75 | $V_{out}/V_{in}$ = 0.5 | $V_{out}/V_{in}$ = 0.25 |
| D = 10% | $V_{out}/V_{in}$ = 0.2 | $V_{out}/V_{in}$ = 0.15 | $V_{out}/V_{in}$ = 0.1 | $V_{out}/V_{in}$ = 0.05 |
| lim D → 0% | $V_{out}/V_{in}$ = 0 | $V_{out}/V_{in}$ = 0 | $V_{out}/V_{in}$ = 0 | $V_{out}/V_{in}$ = 0 |
| 1 s LiIon→0.9 V | 11% < D < 17% | 14% < D < 22% | 21% < D < 33% | 43% < D < 67% |
| 5 V ± 10%→1.2 V | 11% < D < 13% | 15% < D < 18% | 22% < D < 27% | 44% < D < 53% |
| 3 s LiIon→3.3 V | 13% < D < 20% | 18% < D < 27% | 26% < D < 41% | 52% < D < 82% |
| 1 s LiIon→1.2 V | 14% < D < 22% | 19% < D < 30% | 29% < D < 44% | 57% < D < 88% |
| 2 s LiIon→1.2 V | 7%* < D < 11% | 10% < D < 15% | 14% < D < 22% | 29% < D < 44% |
| 12 V ± 10%→1.2 V | 5%* < D < 6%* | 6%* < D < 7%* | 9%* < D < 11% | 18% < D < 22% |

Table 4 illustrates the duty factor range of some common step-down conversion applications with input voltages ranging from those supplied by 1s LiIon to 3s LiIon batteries, along with 5V and 12V supplies regulated at ±10%. Those conditions marked with an asterisk (*) may require limiting the converter's operating frequency in order to meet the full range in required duty factors. The CLDD converter accommodated all the applications without requiring duty factors under ten percent.

Figure 17A:
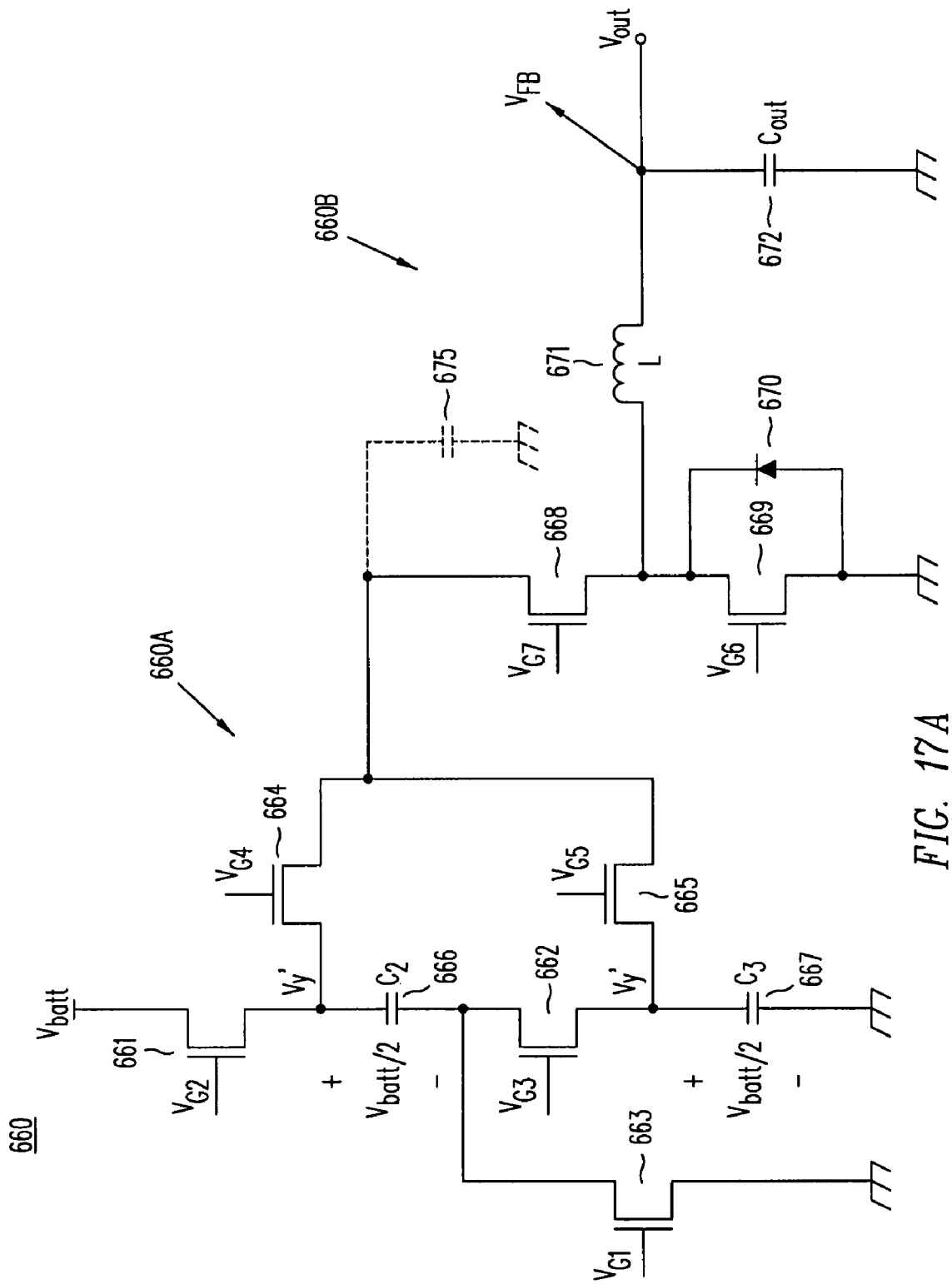
FIG. 17A is a circuit diagram of a 0.5X CLDD converter.

0.5X-Type CLDD Implementation: FIG. 17A illustrates a circuit diagram of a 0.5X-type CLDD converter 660. Using a ground-referenced fractional charge pump, the switched capacitor pre-converter 660A comprises two flying capacitors 666 and 667 driven by five MOSFETs 661, 662, 663, 664, and 665. The MOSFETs are controlled by break-before-make (BBM) buffer (not shown) to alternatively charge and discharge flying capacitors 666 and 667. The output voltage $V_y$ charges capacitor 675 and powers the input to the inductive post-regulator 660B, where MOSFETs 668 and 669 using PWM control, continuously adjust the current flowing in inductor 671 in response to feedback of the output voltage as filtered by reservoir capacitor 672.

In converter 660, the charge pump pre-converter 660A and the inductive post-regulator 660B share no components and may operate independently. Accordingly, MOSFETs 668 through 669 can switch at a frequency different than MOSFETs 661 through 665. In such asynchronous operation, capacitor 675 must store energy output from charge pump pre-converter 660A and supply it to the input of post-regulator 660B and must comprise sufficient capacitance to supply all current transients as demanded. While the two clock pulse generators controlling pre-converter 660A and post-regulator 660B, respectively, may "free run" and thereby vary in frequency, unsynchronized operation can lead to excessive switching noise in the system.

In a preferred embodiment of a multi-frequency implementation of 0.5X CLDD converter 660, pre-converter 660A and post-regulator 660B switch at different frequencies but are synchronized either by a phase-locked-loop, also known as a PLL, or by using a common clock generator, multiplied-up or divided-down to generate the two dissimilar clock signals. Ideally the clock waveform for inductive post-regulator 660B comprises a ramp generator rather to produce a square, triangle, or saw-tooth ramp wave. The gate drive for charge pump MOSFETs 661, 662, 663, 664 and 665 may however comprise square wave signals generated by feeding the output of the ramp generator into a comparator. Alternatively, one or more of the MOSFETs 661, 662, 663, 664 and 665 in the charge pump pre-converter 660A may be used to limit the inrush current to the charge pump during the charging or discharging of its flying capacitors.

If, in contrast, charge pump pre-converter 660A and inductive post-regulator 660B are switched in phase and at the same frequency, the size of an intermediate capacitor between the two stages can be greatly diminished or even eliminated. Under such circumstances, since each of MOSFETs 664 and 665 in the charge pump pre-converter 660A is wired in series with MOSFET 668 in post-regulator 660B, whenever MOSFETs 664, 665 and 668 are switching on and off together at the same frequency, MOSFET 668 is redundant and may be eliminated.

Figure 17B:
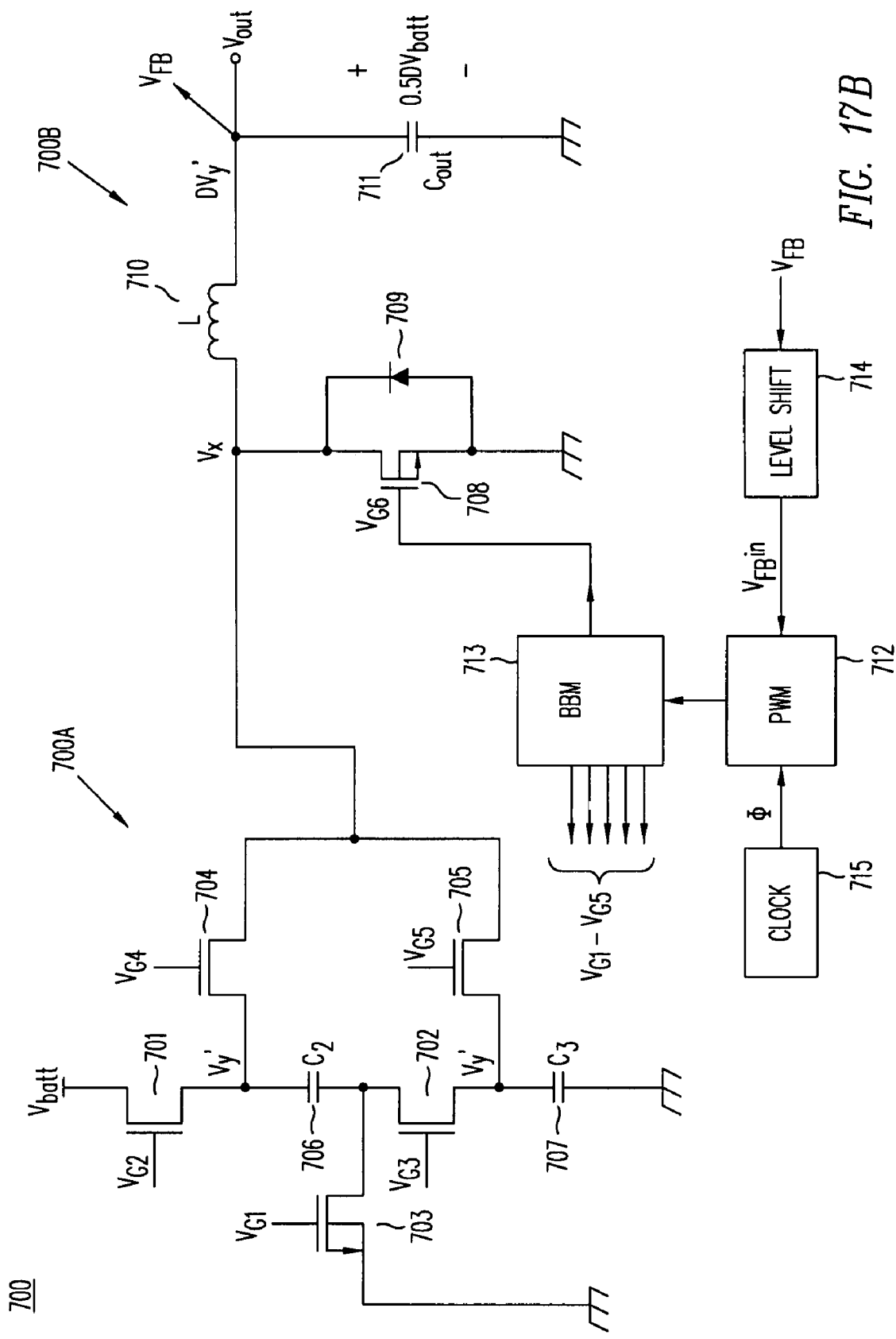
FIG. 17B is a circuit diagram of a simplified 0.5X CLDD converter.

The resulting 0.5X-type LCDD converter 700 is illustrated in FIG. 17B, where MOSFETs 704 and 705 serve both as output transistors for the charge pump pre-converter 700A and as input devices for the inductive post-regulator 700B. This modification reduces series resistance, conduction and switching losses in the LCDD converter and also saves die area. The intervening capacitor 675 is also eliminated, since flying capacitors 706 and 707 act in parallel as an input filter for post-regulator 700B whenever MOSFETs 704 and 705 are on and conducting.

As shown, the fractional switched capacitor pre-converter 700A of converter 700 comprises five MOSFETs 701, 702, 703, 704, and 705 with flying capacitors 706 and 707. The MOSFETs are controlled by break-before-make (BBM) buffer 713 to alternatively charge and discharge flying capacitors 706 and 707. The current flowing through inductor 710 is dynamically adjusted by the duty factor of MOSFETs 704 and 705, with a PWM controller 712 responding to changes in the output voltage of converter 700. Feedback signal $V_{FB}$ is adjusted in voltage by a level shift circuit 714 to control PWM controller 712.

When high-side MOSFETs 704 and 705 are conducting, the voltage $V_x$ is biased at $V_y'$ approximately equal to $\{0.5V_{batt} - I_L \cdot \frac{1}{2}R_{DS}\}$, during which time inductor 710 is magnetized, i.e. stores energy while delivering current to the output terminal and simultaneously transferring energy and charging output capacitor 711. When MOSFETs 704 and 705 are turned off, the voltage $V_x$ flies below ground, forwarding biasing diode 709 and recirculating current. The synchronized conduction of MOSFETs 704 and 705 not only performs the function of controlling the output current of 0.5X charge pump pre-converter 700A, but also performs the function of the input MOSFETs for the inductive post converter 700B, thereby eliminating the need for one high current low-resistance MOSFET, saving die area and improving efficiency.

Some portion of the time while diode 709 is forward-biased, synchronous rectifier MOSFET 708 is turned on, diverting the current from diode 709. Break-before-make buffer 713 drives the gate of MOSFETs 708 out of phase with MOSFETs 704 and 705, insuring that flying capacitors 706 and 707 are not shorted to ground by simultaneous conduction of MOSFETs 704, 705, and 708. A clock generator 715 synchronizes the switching of pre-converter 700A to the switching of post-regulator 700B, while PWM controller 712 controls the pulse width, i.e. on-time, of all MOSFETs in response to changes in the output voltage and feedback signal $V_{FB}$.

Notice that in converter 700, the intermediate capacitor connected between charge pump pre-converter 700A and inductive post-regulator 700B has been eliminated, i.e., there in no equivalent to capacitor 675 of converter 660 in converter 700. Therefore, a steady intermediate voltage $V_y$ does not exist in converter 700. The node voltage $V_y'$ emulates the behavior of intermediate voltage $V_y$ during the time when MOSFETs 704 and 705 conduct and inductor 710 is being magnetized. During that portion of the half-cycle of converter 700, the voltage $V_y'$ is approximately equal to one-half the battery input voltage. During the other half-cycle, when flying capacitors 706 and 707 are charged in series, each capacitor is charged to a voltage of $V_{batt}/2$ through conducting MOSFETs 701, 702 and 703 and no longer behaves as a semi-constant voltage source or power supply. So $V_y'$ acts as a "virtual" constant voltage source whenever it is powering post-regulator 700B, hence the prime notation "'".

In an alternative embodiment, synchronous rectifier MOSFET 708 may be eliminated and recirculation current carried entirely by diode 709, which preferably should comprise a Schottky metal-semiconductor diode, not a P-N junction diode. Schottky diodes are preferred because they exhibit lower forward voltage drops than junction diodes. In yet another embodiment, a Schottky diode can be placed in parallel with MOSFET 708 and intrinsic P-N diode 709.

Figure 17C:
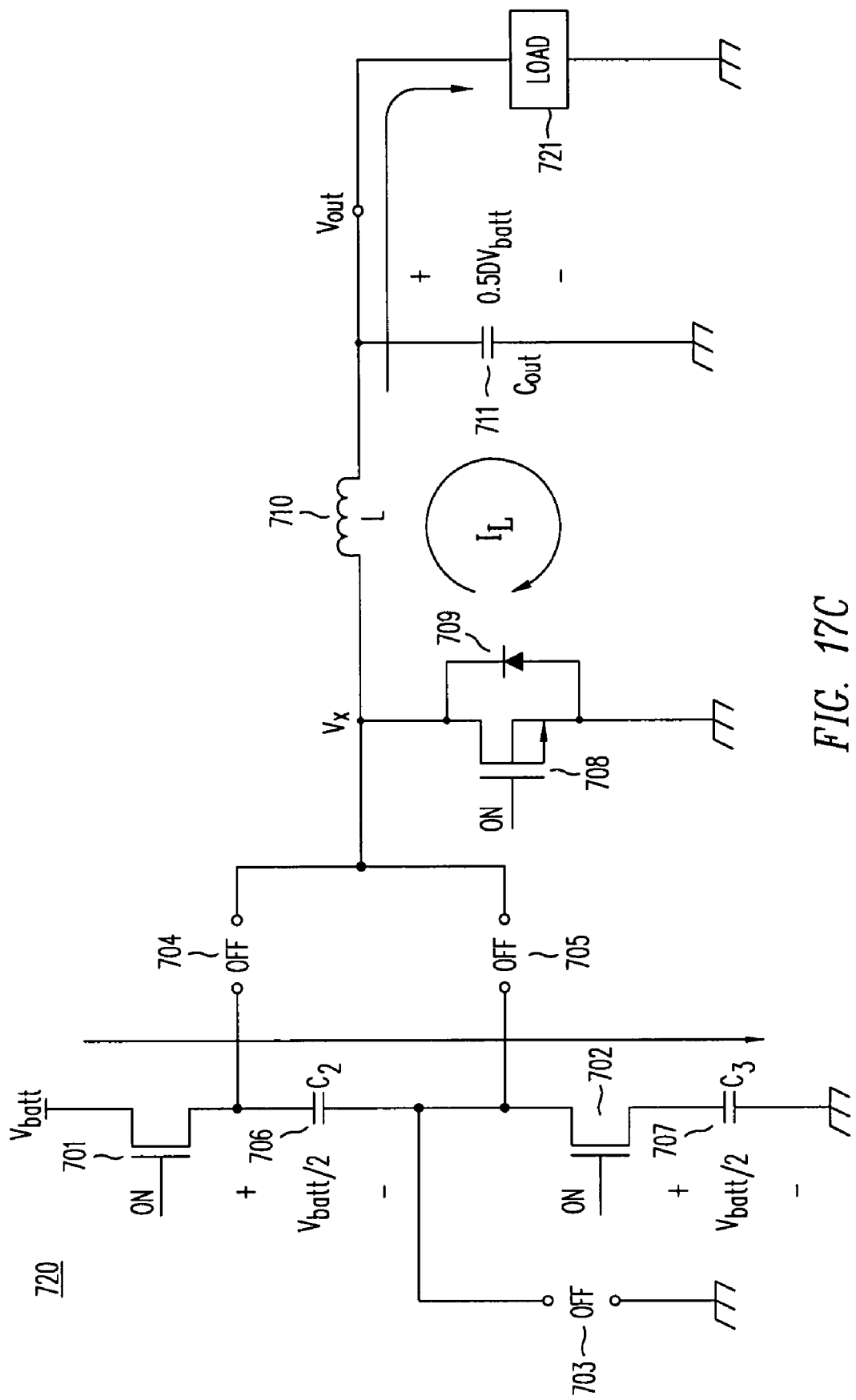
FIG. 17C is an equivalent circuit diagram of the 0.5X CLDD converter during the charging and recirculation phase.
Figure 17D:
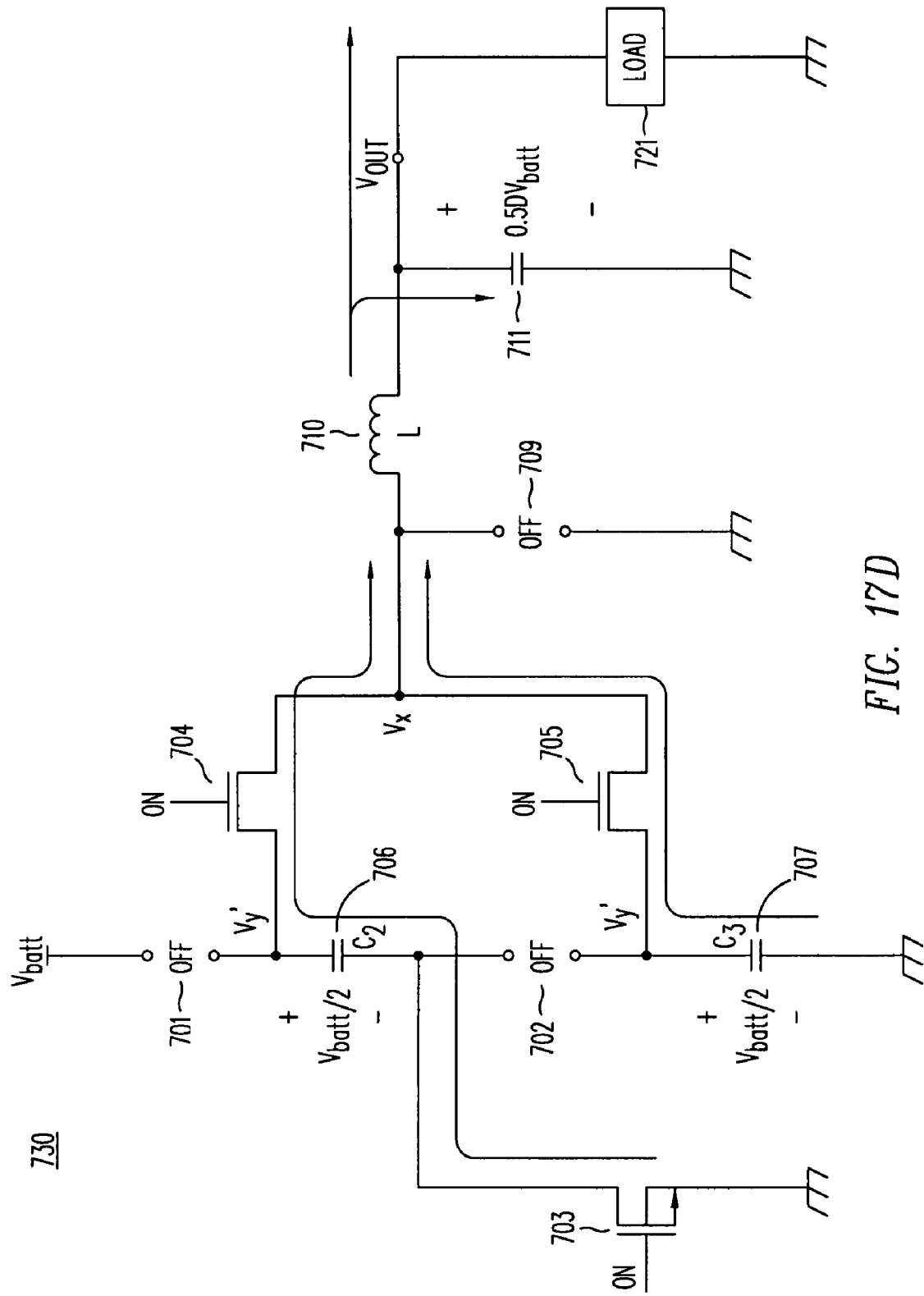
FIG. 17D is an equivalent circuit diagram of the 0.5X CLDD converter during the transfer and magnetizing phase.

The operation of fractional CLDD converter 700 is illustrated in FIGS. 17C and 17D. In equivalent circuit diagram 720 of FIG. 17C, capacitors 706 and 707 are charged through conducting MOSFETs 701 and 702 while MOSFETs 703, 704, and 705 remain off. Series-connected flying capacitors 706 and 707 are each charged to the half the battery input voltage, i.e. to $V_{batt}/2$.

During this phase, synchronous rectifier MOSFET 708 is conducting recirculation current $I_L$ through inductor 710, thereby moving energy from inductor 710 to output capacitor 711 and to load 721. The phase can be referred to as the "charging and recirculation phase", i.e. the charging of the flying capacitors and the maintaining of the output voltage through inductor recirculation. During this phase, MOSFETs 704 and 705 are turned off and output capacitor $C_{out}$ 711 supplies the necessary load current $I_{out}$ to the electrical load 721. Specifically, during this phase the energy in inductor 710 is used to replenish output capacitor 711 as it is being discharged by load 721. A recirculation current flows through MOSFET 708, diode 709 and filter capacitor 711. The voltage across capacitor 711 begins to sag during this cycle and is replenished during the subsequent transfer phase shown in FIG. 17D.

FIG. 17D represents the transfer phase, when energy is transferred from flying capacitors 706 and 707 in pre-converter 700A to inductor 710 in post-regulator 700B. This transfer is achieved by shutting off charge circuit MOSFETs 701, 702, and 709, and by turning on MOSFETs 703, 704, and 705, thereby connecting flying capacitors 706 and 707 in parallel referenced to ground, and in series with inductor 710. This connection simultaneously magnetizes inductor 710, storing energy $I^2L$, and transfers charge from flying capacitors 706 and 707 to reservoir capacitor 711 at a voltage $D \cdot V_y$, i.e., the voltage on the flying capacitors ($0.5 \cdot V_{batt}$) times the duty factor D of MOSFETs 704 and 705.

The two phases alternate to keep inductor 710 magnetized and flying capacitors 706 and 707 and output capacitor 711 charged. The entire system is efficient because once the voltage builds up on flying capacitors 706 and 707 and filter capacitor 711 during start-up, steady state operation must only replenish enough charge to compensate for the small shifts in voltage resulting from voltage sagging across capacitors 706, 707 and 711 as they discharge.

Switched Capacitor-Inductor (CLID) Regulating Inverters

The generic CLXD converter topology of FIG. 9 is also useful for producing regulated voltages below ground. By utilizing an inverting charge-pump as a pre-converter followed by an inductive down converter, inverting voltage conversion is performed in two stages, referred to herein as a CLID converter. The switched-inductor post converter as described comprises a down converter, meaning the absolute magnitude of the voltage is decreased.

Examining the implementation of the CLID-type inverters in greater detail, FIGS. 18A and 18B illustrate the functional block diagrams of two different switched CLID inverting converters, comprising a –1X type pre-converter in FIG. 18A and a fractional –0.5X type pre-converter in FIG. 18B. In both FIG. 18A and FIG. 18B, the post converter comprises a non inverting Buck converter, a circuit that decreases the absolute magnitude of the negative output voltage, i.e. a smaller, less negative voltage. Such circuit topologies are referred to herein as CLID inverters.

In FIG. 18A, a –1X type CLID inverting converter 760 comprises a pre-converter 760A and a post-regulator 760B. Pre-converter 760A comprises a doubler charge pump 761 with a flying capacitor 762 and a filter capacitor 763, where the output of charge pump 761 supplies a negative, i.e. below ground, intermediate voltage $V_y$. The intermediate voltage $V_y$ in turn powers a non-inverting step-down switched-inductor post-regulator 760B, comprising an inductor 766, a MOSFET 764, a synchronous rectifier MOSFET 765 with an intrinsic rectifier diode 767 and an output capacitor 768. MOSFET 765 includes a P-N diode 767 which remains reverse-biased since $V_x \leq 0$. In some cases, depending on the magnitude of the capacitance $C_1$ of filter capacitor 763, a P-N diode is included in parallel with capacitor 763 to clamp the positive voltage range of $V_y$. Since $V_y = -1 \cdot V_{batt}$ and $V_{out} = D \cdot V_y$, then the voltage conversion ratio of –1X-type CLID converter 760 is given by $$\frac{V_{out}}{V_{batt}} = -D$$

Figure 19A:
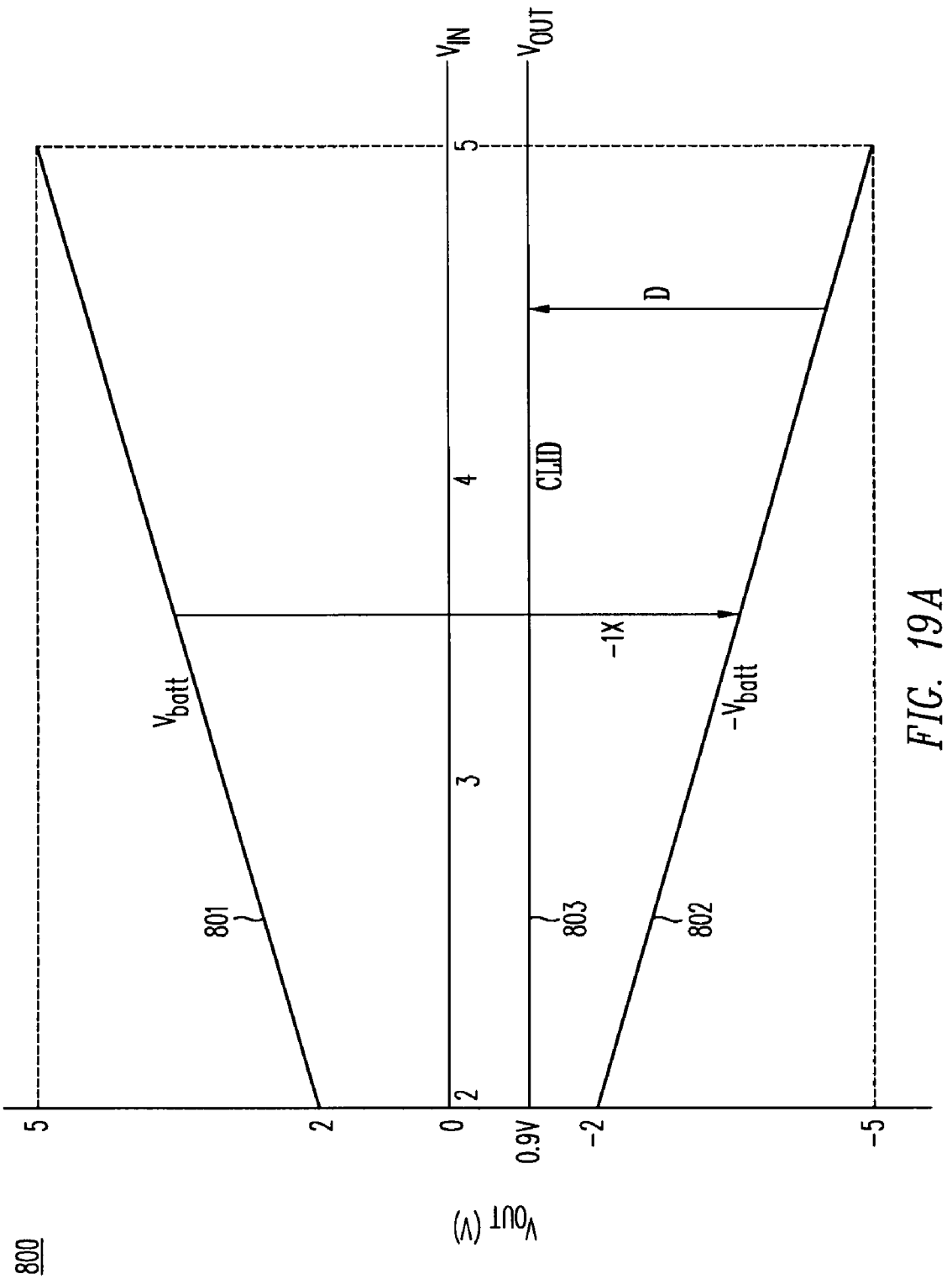
FIG. 19A is a graph of the transfer characteristics of a switched –1X-type CLID converter over an input voltage in the range of 2V to 5V.

The ability of –1X CLID inverting converter 760 to create and regulate a –0.9V or –1.8V output from a wide range of input voltages is illustrated in graph 800 of FIG. 19A, with inputs as shown ranging from 2V up to 5V, a range including 1s LiIon discharge condition. As shown, the battery or input voltage (curve 801) is inverted to produce intermediate voltage $V_y$, shown by curve 802. Using a non-inverting Buck type post-regulator operating at a duty factor $D_1$, a regulated –0.9V output (curve 803) is produced, or at a different duty factor $D_2$, a –1.2V output (not shown) may be produced.

Figure 19B:
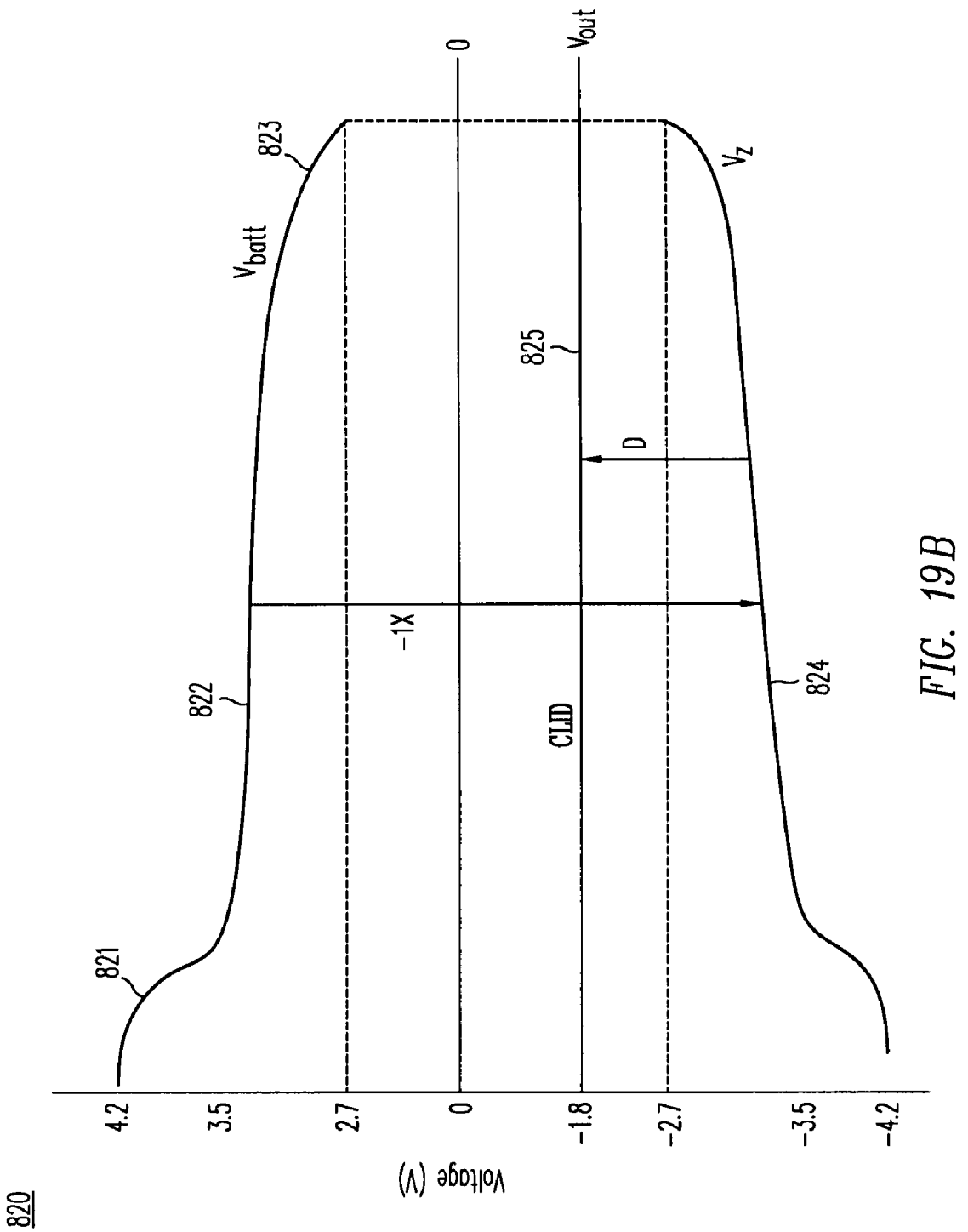
FIG. 19B is a graph of the transfer characteristics of a switched –1X-type CLID converter supplied by a 1-cell LiIon battery as a function of time.

An example of CLID conversion is illustrated in graph 820 of FIG. 19B where the discharge of a 1s LiIon battery is inverted and regulated to –1.8V. The LiIon battery fully charged starts with a 4.2V condition (curve 821) that decays over time to a plateau voltage (curve 822) of approximately 3.5V and then eventually reaches its discharged condition of 2.7V (curve 823). The single-capacitor pre-converter 760A of –1X-type CLID converter 760 produces a time varying negative voltage $-V_y$, shown by curve 824, ranging from –4.2V to –2.7V. The intermediate voltage $-V_y$ is then stepped down in magnitude to –1.8V by an varying amount D, using a step-down post-regulator to produce a constant –1.8V output (curve 825).

In some cases, a –1X pre-converter in a –1X CLID inverting converter produces an undesirably large negative intermediate voltage Vy at high input voltage conditions, forcing the post-regulator to operate at low duty factors. One way to avoid this problem is to employ a –0.5X-type fractional charge pump inverting pre-converter instead of a –1X type pre-converter.

–0.5X-type CLID Inverting converter: In FIG. 18B, a –0.5X type CLID inverting converter 780 comprises a pre-converter 780A and a post-regulator 780B. Pre-converter 780A comprises a fractional charge pump 781 with flying capacitors 782 and 783 and a filter capacitor 784, where the output of charge pump 781 supplies a negative, i.e. below ground, intermediate voltage $V_y$. Intermediate voltage $V_y$ in turn powers a non-inverting step-down switched-inductor post converter 780B comprising an inductor 788, a MOSFET 785, a synchronous rectifier MOSFET 786 with an intrinsic rectifier diode 787 with an output capacitor 789. MOSFET 786 includes a P-N diode 787 which remains reverse biased since $V_x \leq 0$. In some cases, depending on the magnitude of the capacitance $C_1$ of filter capacitor 784, a diode parallel to capacitor 784 is included to clamp the positive voltage range of $V_y$. Since $V_y = -0.5 V_{batt}$ and $V_{out} = D \cdot V_y$, then the voltage conversion ratio of –0.5X-type CLID converter 780 is given by $$V_{out} = -0.5 \cdot D$$

Figure 19C:
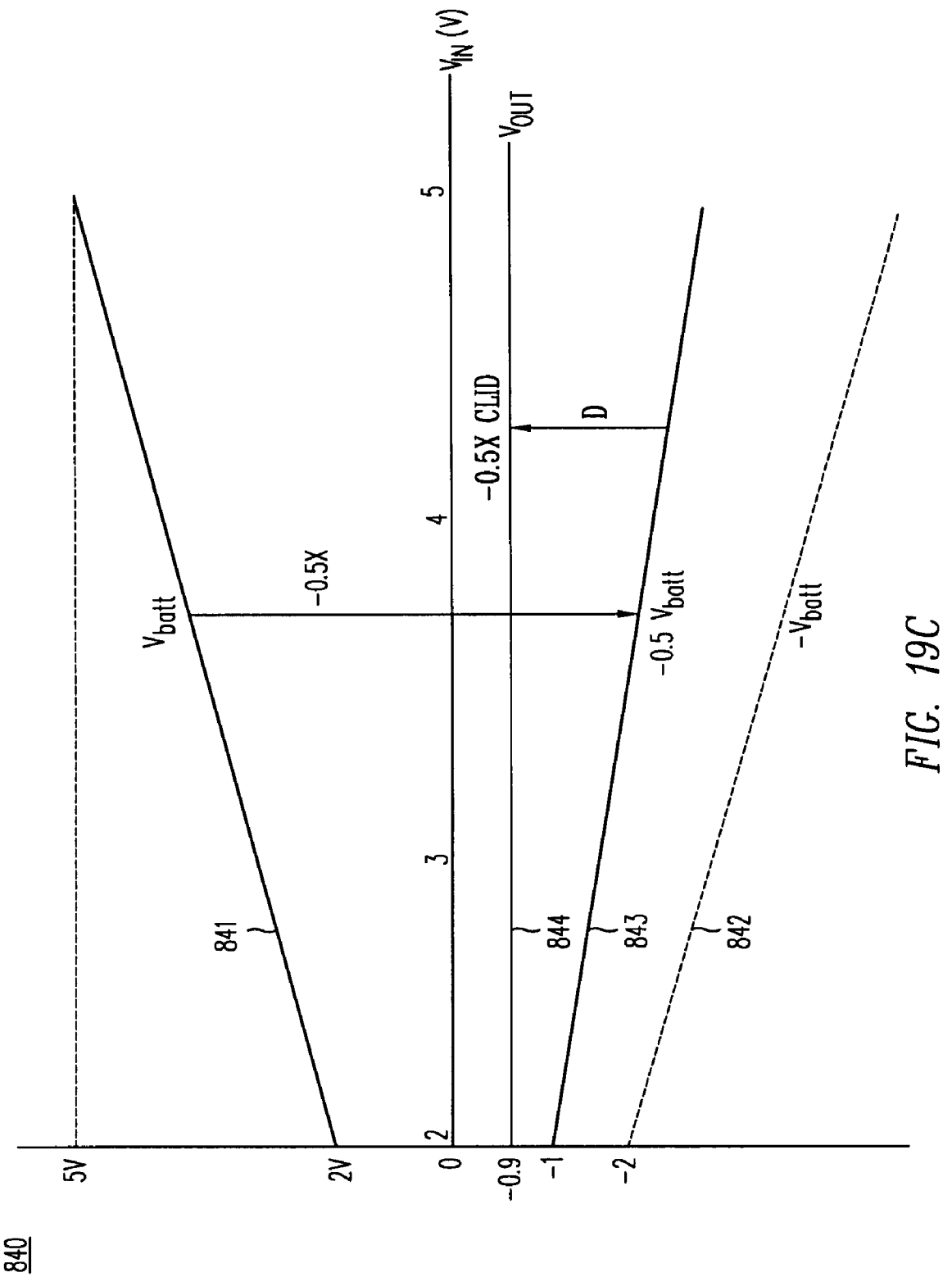
FIG. 19C is a graph of the transfer characteristics of a switched –0.5X-type CLID converter over an input voltage in the range of 2V to 5V.

The ability of –0.5X CLIU inverting converter 780 to create and regulate a –0.9V output from a wide range of input voltages is illustrated in graph 840 of FIG. 19C, with inputs as shown ranging from 2V up to 5V, a range including a 1s LiIon discharge condition. As shown, battery or input voltage (curve 841) is inverted and halved to produce intermediate voltage $V_y$, shown by curve 843, ranging from 1V to 2.5V. Using step-down post-regulator 780B operating at a duty factor $D_1$, a regulated –0.9V output (curve 844) is produced, or at a different duty factor (not shown), a –1.8V output may be produced from a 1s LiIon battery.

Figure 19D:
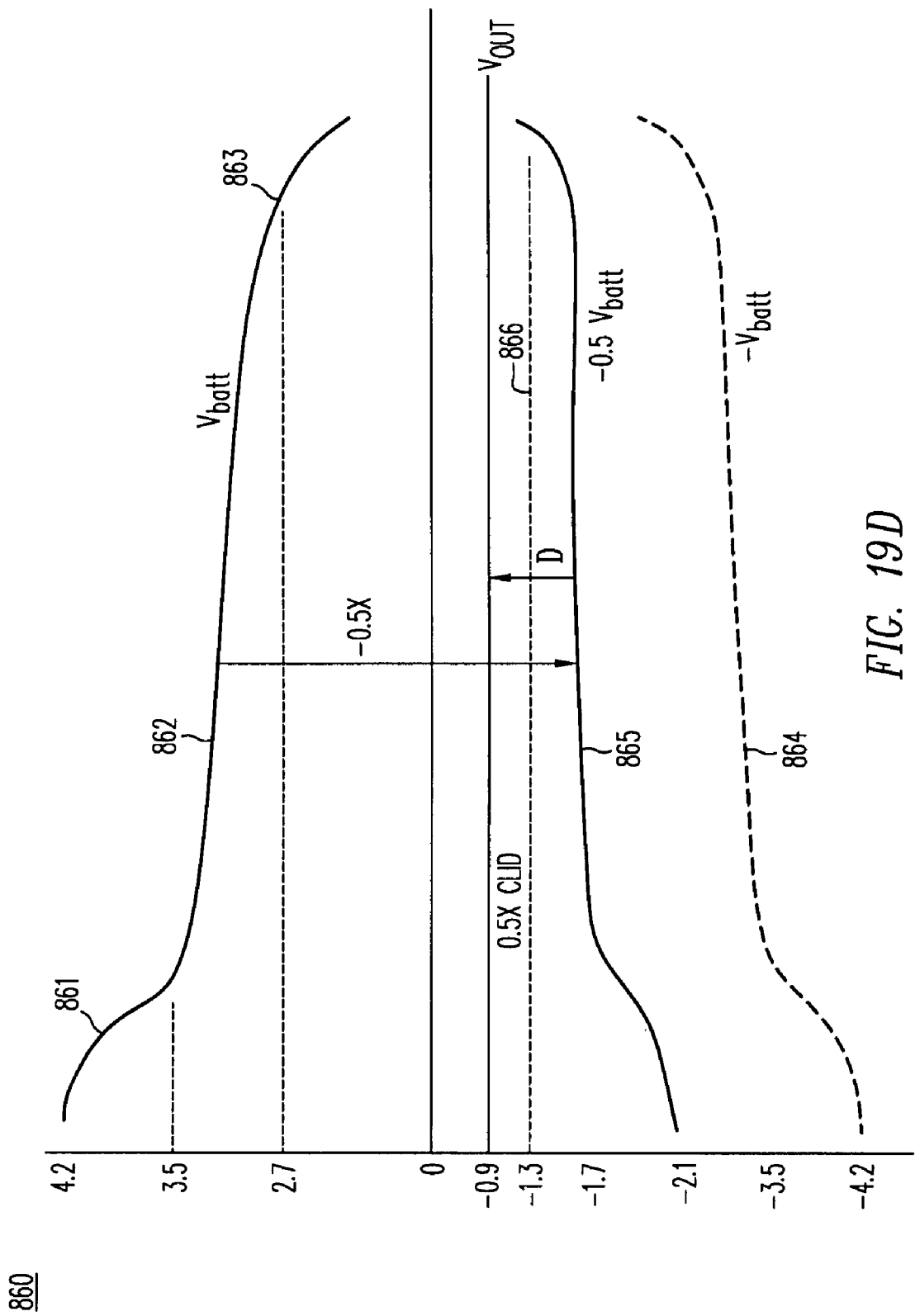
FIG. 19D is a graph of the transfer characteristics of a switched –0.5X-type CLID converter supplied by a 1-cell LiIon battery as a function of time.

An example of –0.5X CLID conversion is illustrated in graph 860 of FIG. 19D, where the discharge of a 1s LiIon battery is inverted and regulated to –0.9V. The LiIon battery fully charged starts with a 4.2V condition (curve 861) that decays over time to a plateau voltage (curve 862) of approximately 3.5V and then eventually reached its discharged condition of 2.7V (curve 863). The single-capacitor pre-converter 780A of –0.5X-type CLID converter 780 produces a time varying negative voltage $-V_y$, shown by curve 865, ranging from –2.1V to –1.35V. The intermediate voltage $V_y$ is then stepped down in absolute magnitude to –0.9V by a varying amount D, using non-inverting step-down post-regulator 780B to produce a constant –0.9V output (curve 866).

The duty factor for CLID inverting converters can be derived by rearranging the formula for the CLXD converter to yield $$D = \frac{V_{out}}{n \cdot V_{batt}} = -\frac{V_{out}}{V_{batt}}$$

in the case of the single capacitor inverter and by $$D = \frac{V_{out}}{n \cdot V_{batt}} = -2\frac{V_{out}}{V_{batt}}$$

Figure 19E:
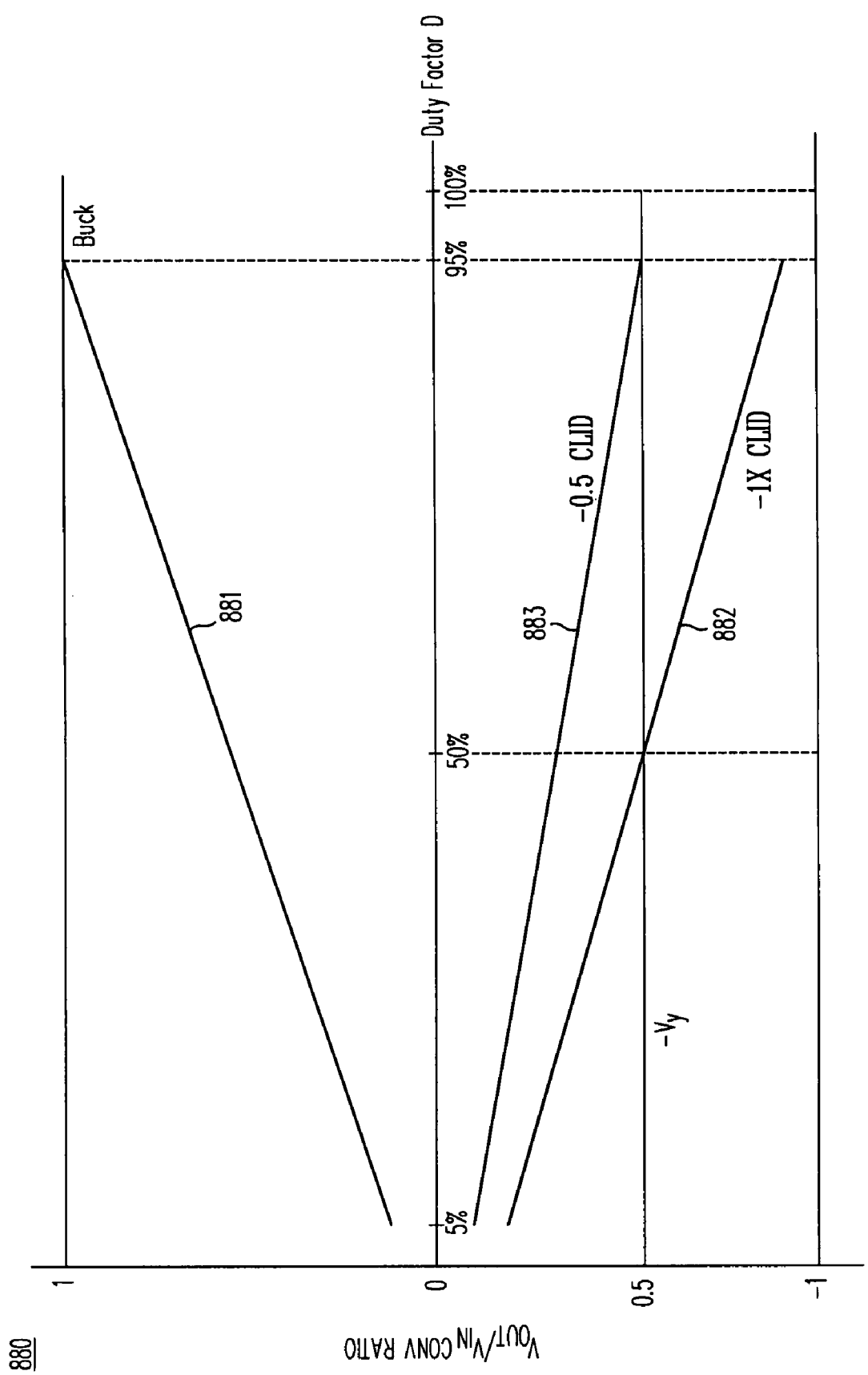
FIG. 19E is a graph of $V_{out}/V_{in}$ as a function of duty factor for CLID converters having -1X-type and –0.5-type pre-converters.

Since n<0 and $V_{out}/V_{batt}$<0, both numbers are negative and the duty factor equation mathematically behaves the same as a non-inverting CLID converter. This principle is illustrated in graph 880 of FIG. 19E, where curve 881 represents the voltage conversion ratio of a Buck converter as a function of duty factor. The conversion ratio of a −1X-type CLID inverting converter (curve 882) is the negative mirror image of the conversion ratio of a Buck converter (curve 881) and the conversion ratio of a −0.5X CLID inverting converter (curve 883) is one-half that value, or a negative mirror image of the conversion ratio of a +0.5X CLDD converter, described previously.

Table 5 contrasts the D=50% preferred conversion ratio for −1X CLID and −0.5X CLID converters and illustrates the duty factor range needed to output several negative output voltages from a LiIon battery.

TABLE 5

| Condition | −0.5X CLID | −1X CLID | Buck (Positive) |
|---|---|---|---|
| D = 50% | $V_{out}/V_{in}$ = −0.25 | $V_{out}/V_{in}$ = −0.5 | $V_{out}/V_{in}$ = 0.5 |
| LiIon → −3.0 V | N/A | 71% < D < 100%* | 71% < D < 100%* |
| LiIon → −2.7 V | N/A | 64% < D < 90% | 64% < D < 90% |
| LiIon → −1.8 V | N/A | 43% < D < 60% | 43% < D < 60% |
| LiIon → −0.9 V | 42% < D < 60% | 21% < D < 30% | 21% < D < 30% |

Those conditions marked with an asterisk (*) may require limiting the converter's operating frequency in order to meet the full range in required duty factors. Those marked with N/A require both step-up and step-down inversion.

Figure 20A:
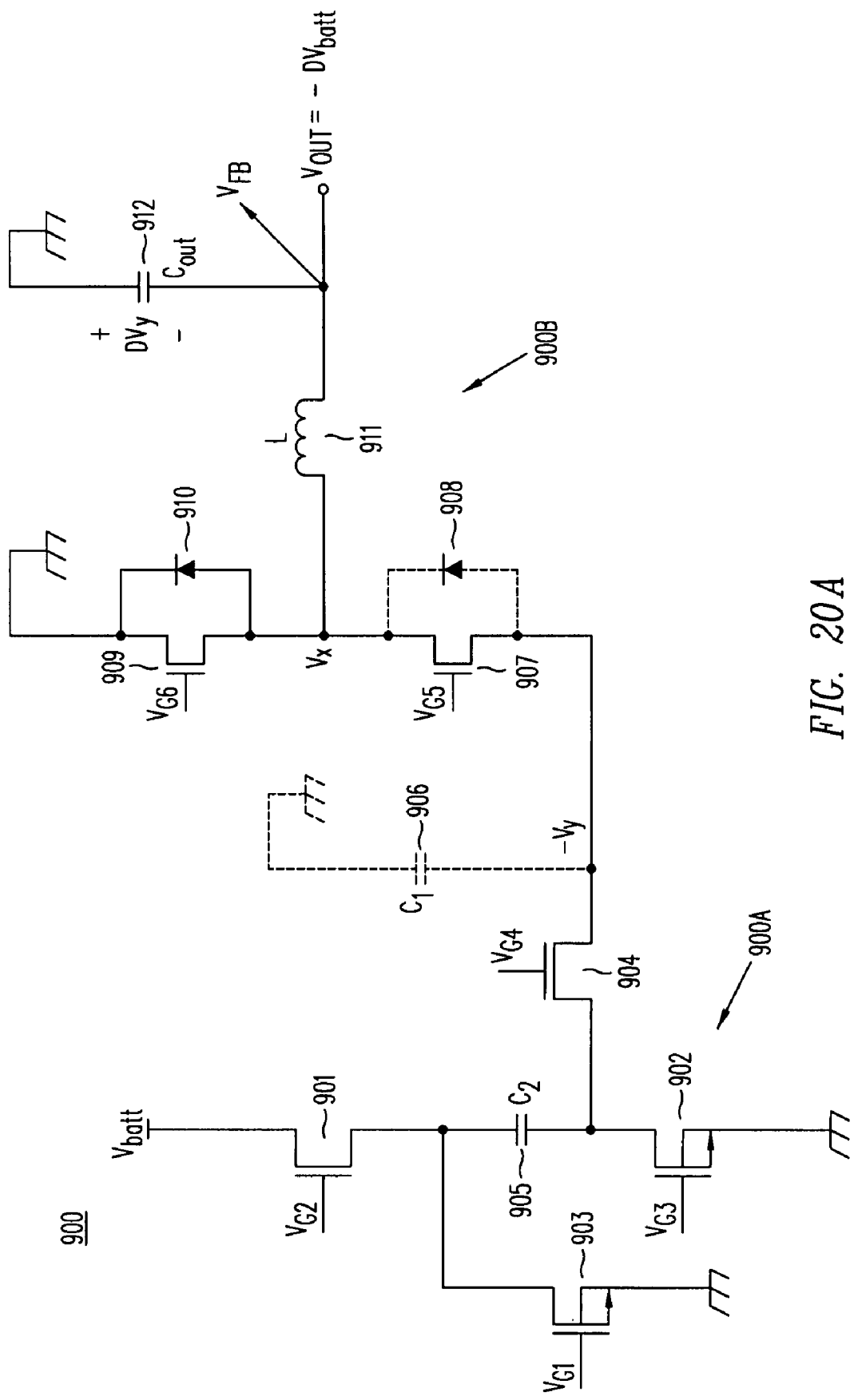
FIG. 20A is a circuit diagram of a –1X CLID converter.

CLID Converter Implementation: A circuit diagram of a CLID converter 900 using a −1X-type pre-converter is shown in FIG. 20A. As shown, a charge pump inverting pre-converter 900A comprises MOSFETs 901, 902, 903, and 904 and a flying capacitor 905, providing intermediate negative output voltage −$V_y$, and an optional filter capacitor 906. A diode across capacitor 906 may be included to limit the $V_y$ positive voltage swing and may be omitted depending on the capacitance value $C_1$ of capacitor 906. Intermediate voltage $V_y$ is connected to an inductor 911 of Buck-type post-regulator 600B with a ground-connected MOSFET 909, a floating synchronous rectifier MOSFET 907 with an intrinsic P-N diode 908 and an output capacitor 912 driving a load (not shown). Since $V_x \leq 0$, the output of −1X-type CLID converter 900 is given by the equation $$V_{out} = -D \cdot V_{batt}$$

Figure 20B:
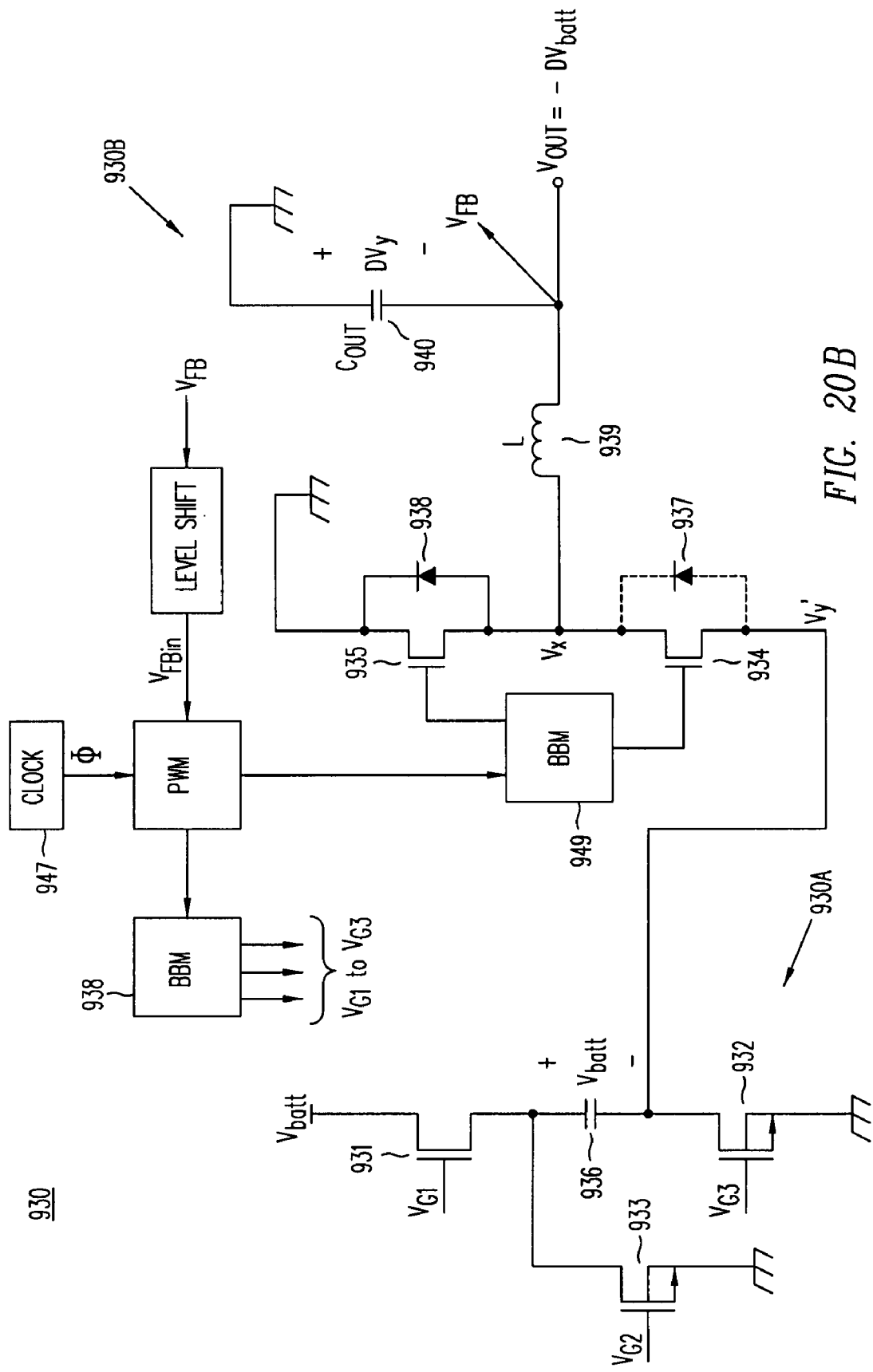
FIG. 20B is a circuit diagram of a simplified –1X CLID converter.

Since MOSFETs 904 and 907 are connected in series, synchronous operation of charge pump pre-converter 900A and inductive post-regulator 900B at the same frequency and in phase means that one of these two MOSFETs is redundant and can be eliminated, along with capacitor 906. This simplified version of the CLID converter is illustrated as converter 930 of FIG. 20B.

As shown, a charge pump inverting pre-converter 930A comprises MOSFETs 931, 932, and 933 with a flying capacitor 936, which provides an intermediate negative output voltage $V_y'$. Intermediate voltage $V_y'$ is connected to an inductor 939 of a Buck-type post-regulator 930B having a ground-connected MOSFET 935, a synchronous rectifier MOSFET 934 with an intrinsic P-N diode 937 and an output capacitor 940 driving a load (not shown).

Post-regulator 930B is controlled by PWM a controller 945, driving MOSFET 935 in response to the feedback signal $V_{FB}$ from the output, terminal of converter 930, level shifted to the appropriate value $V_{FBin}$ by a level shift circuit 946. Level shift circuit 946 is needed to convert the output voltage $V_{out}$ which is negative, i.e. below circuit ground, to a voltage within the range of the PWM control circuit 945. One convenient method to implement level shift circuit 946 involves current mirrors. The implementation of a feedback circuit is described in the above-referenced application Ser. No. 11/890,818.

As shown, a clock and ramp generator 947 is used to switch PWM controller 945 at a frequency φ and is used to drive the MOSFETs 931, 932 and 933 in pre-converter 930A at a frequency m·φ, where in the simplified case m=1 and the charge pump pre-converter 930A and switched inductor post-regulator 930B are clocked at the same frequency and synchronized to the same clock. A break-before-make (BBM) circuit 938 provides the gate drive and necessary level shifting $V_{G1}$ to $V_{G3}$ to MOSFETs 931, 932 and 933, respectively. A BBM circuit 949 drives MOSFET 935 and synchronous rectifier MOSFET 934 in response to PWM controller 945, preventing significant shoot-through conduction, i.e. simultaneous conduction in MOSFETs 935 and 934 to prevent damage and improve the efficiency of converter 930.

Figure 20C:
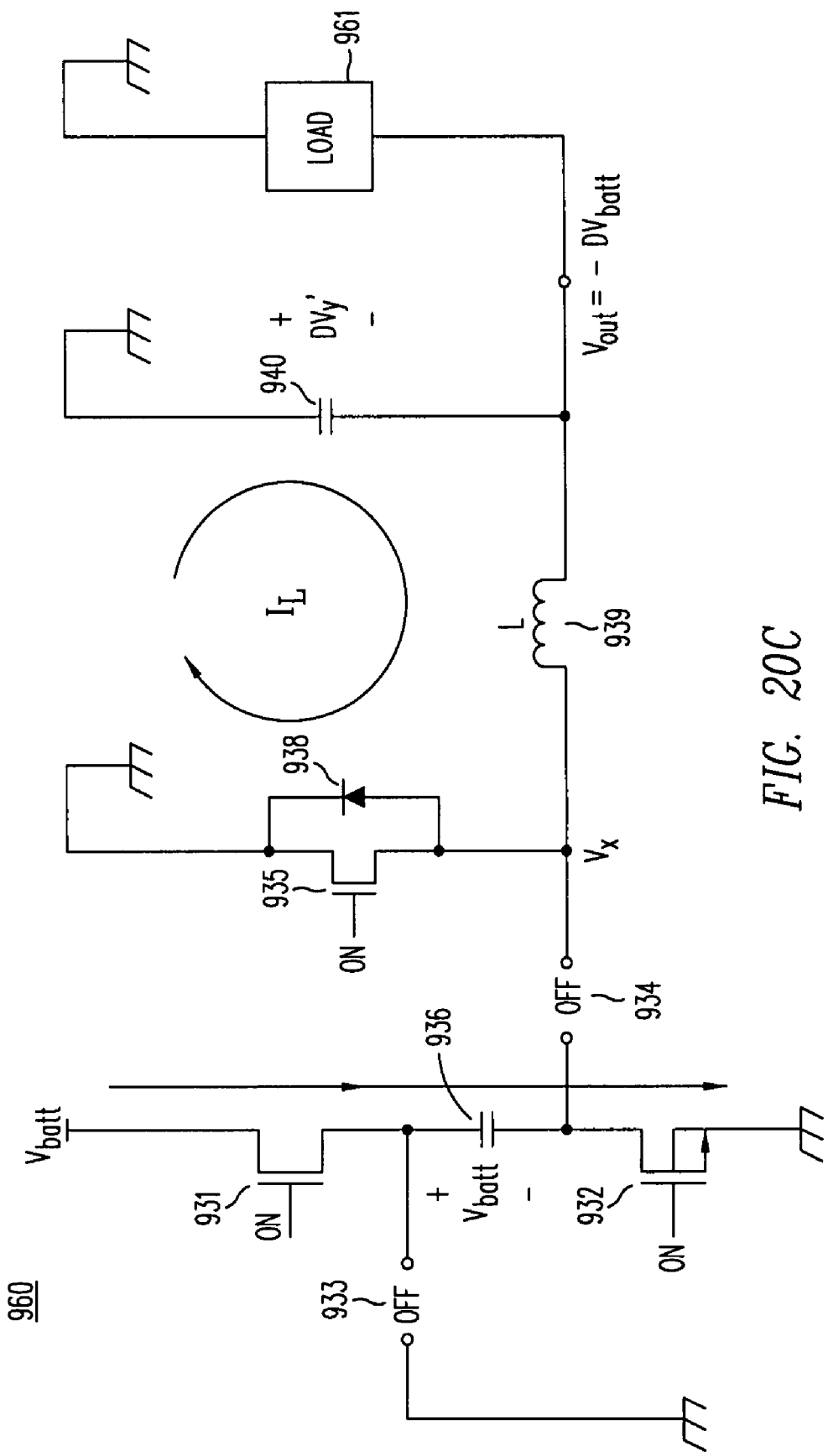
FIG. 20C is an equivalent circuit diagram of the –1X CLID converter during the charging and recirculation phase.
Figure 20D:
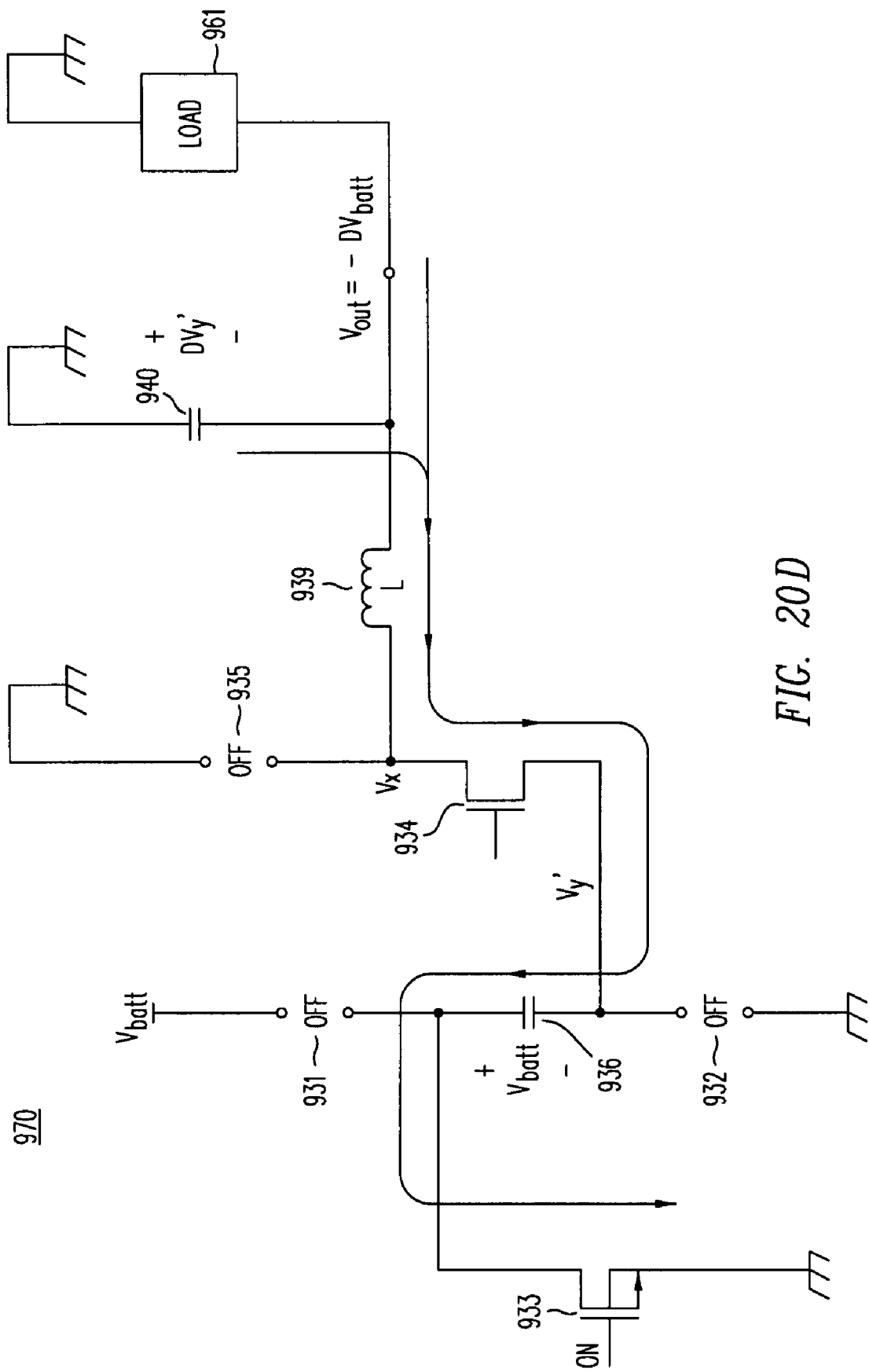
FIG. 20D is an equivalent circuit diagram of the –1X CLID converter during the transfer and magnetizing phase.

As shown in the equivalent circuit diagrams of FIGS. 20C and 20D, the operation of −1X-type CLID converter 930 occurs in two alternating phases. In the charging and recirculating phase, shown in FIG. 20C, flying capacitor 936 is charged through MOSFETs 931 and 932 to substantially the full battery voltage $V_{batt}$, while the current $I_L$ in inductor 939 re-circulates through diode 938, the on-state synchronous rectifier MOSFET 935, output capacitor 940, and to load 961. MOSFETs 933 and 934 remain off in this phase of operation. The on-time of synchronous rectifier MOSFET 935 may be less than the entire period during which diode 938 is conducting and may rely on more control signals than simply the gate drive of MOSFET 934 to determine when it should commence and cease conduction.

In the second phase, shown in FIG. 20D, conducting MOSFETs 931, 932, and 935 are turned off and MOSFETs 933 and 934 are turned on to connect flying capacitor 936 to inductor 939 thereby magnetizing the inductor. During this cycle output capacitor 940 supplies load 961. After a prescribed time, determined by PWM controller 945, converter 930 reverts to the first phase, alternating according to the duty factor provided by PWM controller 945.

In another embodiment, synchronous rectifier MOSFET is never turned off fully but only reduced to low current operation, in the range of a few microamperes to reduce noise as described in the above-referenced application Ser. No. 11/890,947.

Figure 21A:
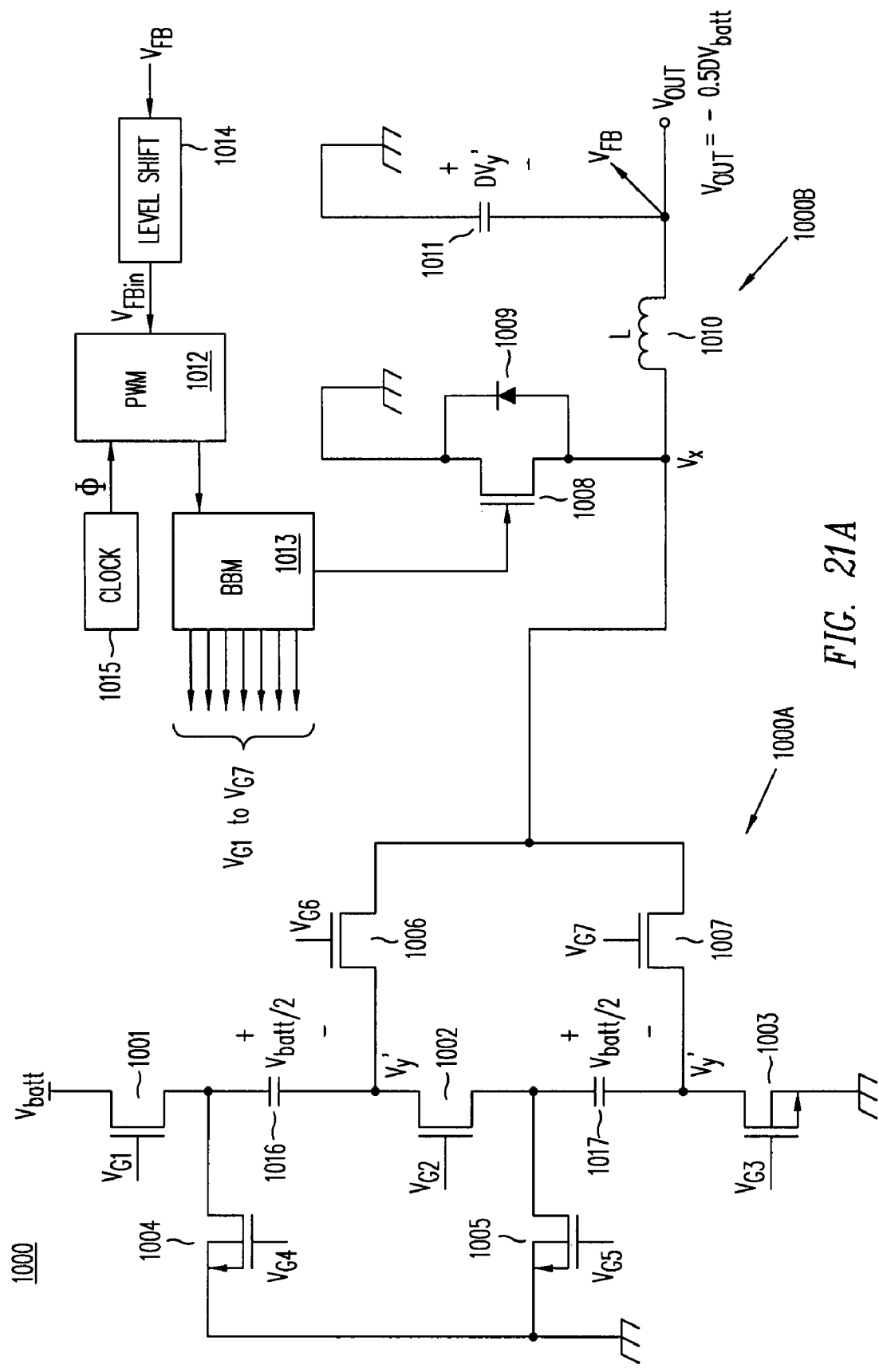
FIG. 21A is a circuit diagram of a –0.5X CLID converter.

Fractional CLIU Converter Implementation: A CLID converter 1000 using a −0.5X-type pre-converter 1000A is shown in FIG. 21A. Fractional charge pump pre-converter 1000A comprises MOSFETs 1001 through 1007 with flying capacitors 1016 and 1017. As converter 1000 is a simplified circuit, intermediate voltage $V_y$ is not a constant voltage. Instead, during the conduction of MOSFETs 1006 and 1007, the voltage $V_y$ acts like a virtual voltage source connected to inductor 1010 of non-inverting Buck-type post-regulator 1000B. Post-regulator 1000B includes MOSFETs 1006 and 1007, a synchronous rectifier MOSFET 1008 with an intrinsic P-N diode 1009, and an output capacitor 1011 driving a load (not shown). The output voltage of −0.5X-type LCID converter is given by the equation $$V_{out} = n \cdot D \cdot V_{batt} = -0.5 \cdot D \cdot V_{batt}$$

Post-regulator 1000B is controlled by a PWM controller 1012 driving MOSFETs 1006 and 1007 in response to the feedback signal $V_{FB}$ from the output terminal of converter 1000, level shifted to the appropriate value $V_{FBin}$ by level shift circuit 1014. Level shift circuit 1014 is needed to convert the output voltage $V_{out}$ which is negative, i.e. below ground, to a positive signal within the range of the PWM controllwe 1012. One convenient method to implement level shift circuit 1014 involves current mirrors. The implementation of a feedback circuit is described in the above-referenced application Ser. No. 11/890,818.

As shown, a clock and ramp generator 1015 is used to switch PWM controller 1012 at a frequency φ and is used to drive MOSFETs 1001 through 1007 in charge pump pre-converter 1000A at a frequency m·φ, which may be higher or lower than the switching frequency of post-regulator 1000B. In the embodiment shown in FIG. 21A, m=1 and charge pump pre-converter 1000A and switched inductor post-regulator 1000B are clocked at the same frequency and synchronized to the same clock. A break-before-make (BBM) circuit 1013 provides the gate drive and necessary level shifting $V_{G1}$ to $V_{G7}$ to MOSFETs 1001 through 1007. BBM circuit 1013 drives MOSFETs 1006 and 1007 and synchronous rectifier MOSFET 1008 in response to PWM controller 1012, preventing significant shoot-through conduction, i.e. simultaneous conduction in MOSFETs 1009, 1006 and 1007, to prevent damage and improve the efficiency of converter 1000.

Figure 21B:
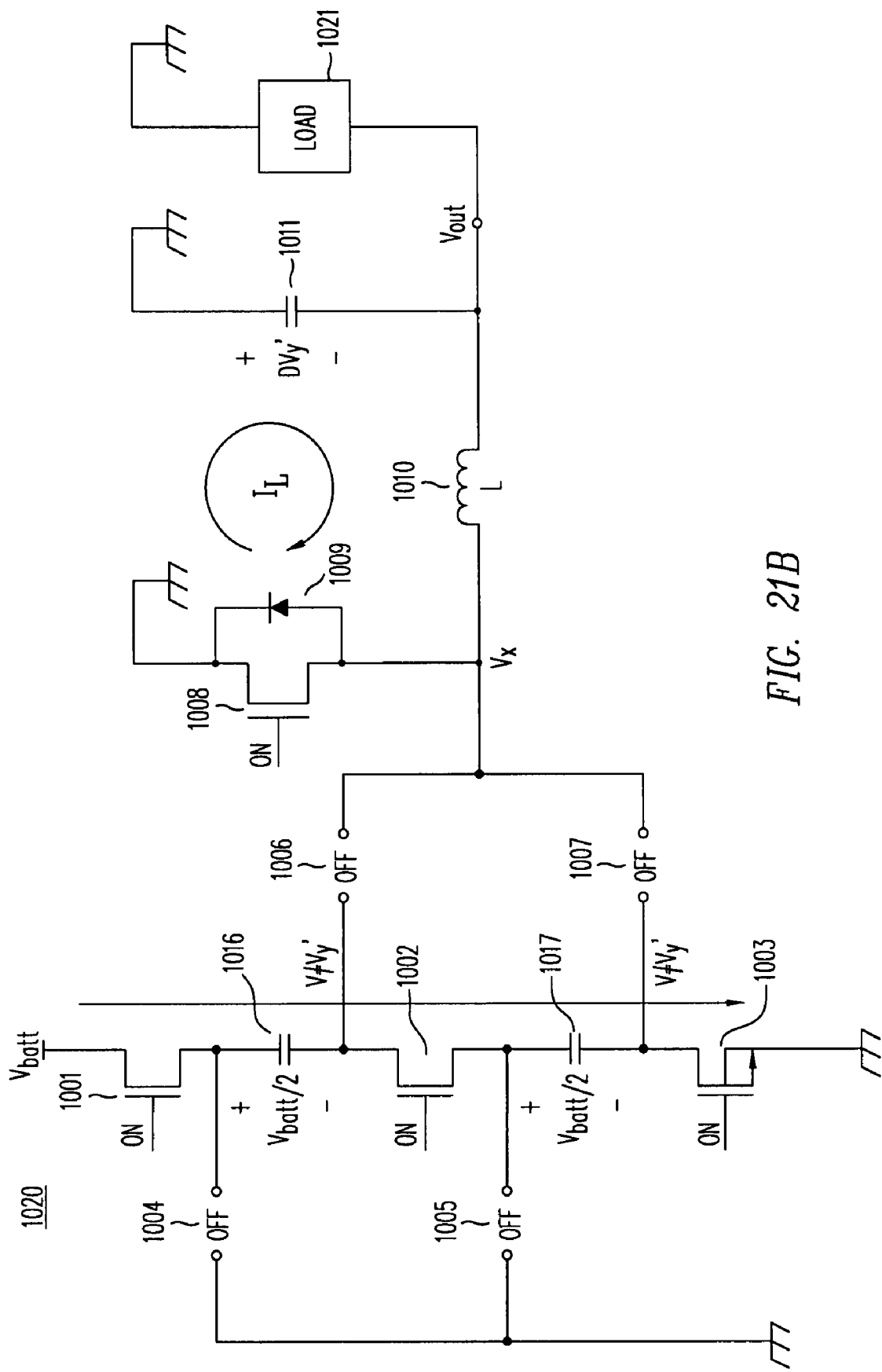
FIG. 21B is an equivalent circuit diagram of the –0.5X CLID converter during the charging and recirculation phase.
Figure 21C:
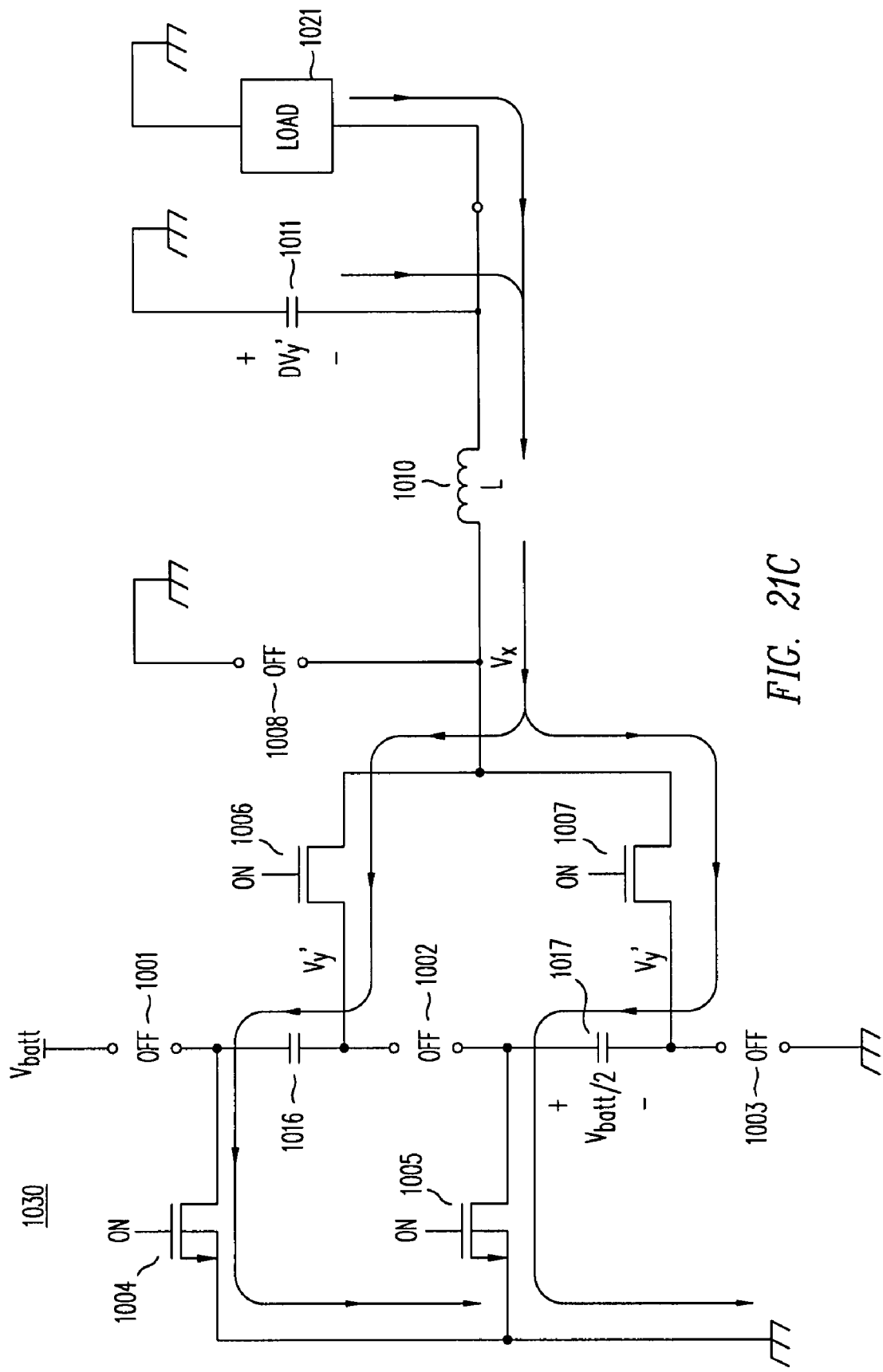
FIG. 21C is an equivalent circuit diagram of the –0.5X CLID converter during the transfer and magnetizing phase.

As shown in the equivalent circuit diagrams of FIGS. 21B and 21C, the operation of −0.5X fractional type CLID inverting converter 1000 occurs in two alternating phases. In the charging and recirculating phase, shown in FIG. 21B, flying capacitors 1016 and 1017 are charged through MOSFETs 1001, 1002, and 1003 to substantially one-half the battery voltage, i.e. $V_{batt}/2$, while the current $I_L$ in inductor 1010 re-circulates through diode 1009, the on-state synchronous rectifier MOSFET 1008, output capacitor 1011, and to the load 1021. The recirculation path is completed by capacitor 1011. MOSFETs 1004, 1005, 1006, and 1007 remain off in this phase of operation. The on-time of synchronous rectifier MOSFET 1008 may be less than the entire period during which diode 1009 is conducting and may rely on more control signals than simply the gate drive of MOSFETs 1006 and 1007 to determine when it should commence and cease conduction.

In the second phase, MOSFETs 1001, 1002, 1003 and 1008 are turned off and MOSFETs 1004, 1005, 1006, 1077 and 1063 are turned on to connect flying capacitors 1016 and 1017 to inductor 1010, thereby magnetizing inductor 1010. After a prescribed time determined by the PWM controller 1012, converter 1000 reverts to the first phase, alternating according to the duty factor provided by PWM controller 1012.

In another embodiment, synchronous rectifier MOSFET 1008 is never turned off fully but only reduced to low current operation, in the range of a few microamperes to reduce noise as described in the above-referenced application Ser. No. 11/890,947.

While specific embodiments according to the invention are described above, these embodiments are intended to be illustrative and not limiting. Many additional and alternative embodiments within the broad scope of this invention will be apparent to persons of skill in the art.

I claim:

1. A DC/DC voltage converter comprising:
    a pre-converter comprising a switched capacitive circuit, the switched capacitive circuit comprising at least one capacitor, a terminal of the at least one capacitor being coupled through a first switch to an input terminal of the pre-converter and through a second switch to a reference voltage; and
    a post-regulator comprising a switched inductive circuit;
    wherein an output terminal of the pre-converter is coupled to an input terminal of the post-regulator, an input terminal of the DC/DC voltage converter comprises the input terminal of the pre-converter, and an output terminal of the DC/DC voltage converter comprises an output terminal of the post-regulator; and
    wherein the post-regulator is adapted to produce a voltage at the output terminal of the post-regulator that is lower in absolute value than a voltage at the input terminal of the post-regulator.

2. The DC/DC voltage converter of claim 1 further comprising a feedback path, a first terminal of the feedback path being coupled to the pre-converter, a second terminal of the feedback path being coupled to the output terminal of the post-regulator.

3. The DC/DC voltage converter of claim 1 wherein the post-regulator comprises a high-side switch connected in a series path with a low-side switch and an inductor, a first terminal of the inductor being coupled to a point in the series path between the high-side switch and the low-side switch, the series path extending from the input terminal of the post-regulator.

4. The DC/DC voltage converter of claim 3 wherein a second terminal of the inductor is coupled to the output terminal of the post-regulator.

5. The DC/DC voltage converter of claim 3 wherein the high-side switch comprises a high-side MOSFET and the low-side switch comprises a low-side MOSFET.

6. The DC/DC voltage converter of claim 5 wherein the post-regulator comprises a break-before-make unit coupled to a gate of the high-side MOSFET and a gate of the low-side MOSFET.

7. The DC/DC voltage converter of claim 6 wherein the post-regulator comprises a pulse width modulation unit coupled to the break-before-make unit and a clock generator coupled to the pulse width modulation unit.

8. The DC/DC voltage converter of claim 7 wherein the clock generator is coupled to the pre-converter.

9. The DC/DC voltage converter of claim 7 comprising a level shift unit coupled to the pulse width modulation unit.

10. The DC/DC voltage converter of claim 9 comprising a feedback path, a first terminal of the feedback path being coupled to the level shift unit.

11. The DC/DC voltage converter of claim 10 wherein a second terminal of the feedback path is coupled to the output terminal of the post-regulator.

12. A DC/DC voltage converter comprising:
- a pre-converter, the pre-converter comprising a charge pump, the charge pump producing an output voltage equal to a predetermined multiple of an input voltage;
- a post-regulator comprising a switched inductive circuit;
- wherein an output terminal of the pre-converter is coupled to an input terminal of the post-regulator, an input terminal of the DC/DC voltage converter comprises an input terminal of the pre-converter, and an output terminal of the DC/DC voltage converter comprises an output terminal of the post-regulator; and
- wherein the post-regulator is adapted to produce a voltage at the output terminal of the post-regulator that is lower in absolute value than a voltage at the input terminal of the post-regulator.

13. The DC/DC voltage converter of claim 12 wherein the predetermined multiple is a fraction less than one.

14. The DC/DC voltage converter of claim 13 wherein the charge pump produces an output voltage equal to 0.5 times the input voltage.

15. The DC/DC voltage converter of claim 14 wherein the post-regulator comprises a Buck converter.

16. The DC/DC voltage converter of claim 15 wherein the post-regulator comprises a high-side switch connected in a series path with a low-side switch and an inductor, a first terminal of the inductor being coupled to a point in the series path between the high-side switch and the low-side switch, the series path extending from the input terminal of the post-regulator.

17. The DC/DC voltage converter of claim 15 wherein a second terminal of the inductor is coupled to the output terminal of the post-regulator.

18. The DC/DC voltage converter of claim 12 wherein the predetermined multiple is a number greater than one.

19. The DC/DC voltage converter of claim 18 wherein the charge pump produces an output voltage equal to 2 times the input voltage.

20. The DC/DC voltage converter of claim 19 wherein the post-regulator comprises a Buck converter.

21. The DC/DC voltage converter of claim 20 wherein the post-regulator comprises a high-side switch connected in a series path with a low-side switch and an inductor connected to a point in the series path between the high-side switch and the low-side switch, the series path extending from the input terminal of the post-regulator.

22. The DC/DC voltage converter of claim 18 wherein the charge pump produces an output voltage equal to 1.5 times the input voltage.

23. The DC/DC voltage converter of claim 22 wherein the post-regulator comprises a boost converter.

24. The DC/DC voltage converter of claim 23 wherein the post-regulator comprises a high-side switch connected in a series path with a low-side switch and an inductor connected to a point in the series path between the high-side switch and the low-side switch, the series path extending from the input terminal of the post-regulator.

25. The DC/DC voltage converter of claim 12 wherein the predetermined multiple is a negative number.

26. The DC/DC voltage converter of claim 25 wherein the charge pump produces an inverted output voltage equal to −1 times the input voltage.

27. The DC/DC voltage converter of claim 25 wherein the charge pump produces an inverted output voltage equal to −0.5 times the input voltage.

* * * * *